US011230653B2

(12) United States Patent
Sahlin et al.

(10) Patent No.: US 11,230,653 B2
(45) Date of Patent: Jan. 25, 2022

(54) FIXED ABRASIVE ARTICLES AND METHODS OF FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Katherine M. Sahlin, Old Orchard Beach, ME (US); Mark Hampden-Smith, Chelmsford, MA (US); Kristin Breder, Belchertown, MA (US)

(73) Assignees: SAINT-GOBAIN ABRASIVES, INC., Worcester, MA (US); SAINT-GOBAIN ABRASIFS, Conflans-sainte-Honorine (FR)

( * ) Notice: Subject to any disclaimer, the term of this patent is extended or adjusted under 35 U.S.C. 154(b) by 0 days.

(21) Appl. No.: 15/721,649

(22) Filed: Sep. 29, 2017

(65) Prior Publication Data
US 2018/0086957 A1 Mar. 29, 2018

Related U.S. Application Data

(60) Provisional application No. 62/401,769, filed on Sep. 29, 2016.

(51) Int. Cl.
*C09K 3/14* (2006.01)
*C08K 3/22* (2006.01)
(Continued)

(52) U.S. Cl.
CPC ............ *C09K 3/1436* (2013.01); *B24D 3/285* (2013.01); *C08K 3/16* (2013.01); *C08K 3/22* (2013.01);
(Continued)

(58) Field of Classification Search
CPC .... C09K 3/1409; C09K 3/1436; B24D 3/285; C08K 3/16; C08K 3/22; C08K 3/30;
(Continued)

(56) References Cited

U.S. PATENT DOCUMENTS 345,604 A 7/1886 Semper
1,910,444 A 5/1933 Nicholson
(Continued)

FOREIGN PATENT DOCUMENTS

CA 743715 A 10/1966
CA 2423788 A1 7/2002
(Continued)

OTHER PUBLICATIONS

Irwntemational Search Report, International Application No. PCT/US2017/054637, dated Jan. 2, 2018, 1 Page, Korean Intellectual Property Office.
(Continued)

*Primary Examiner* — Pegah Parvini
*Assistant Examiner* — Ross J Christie
(74) *Attorney, Agent, or Firm* — Abel Schillinger, LLP; Joseph P. Sullivan

(57) ABSTRACT

A fixed abrasive article having a body including abrasive particles contained within a bond material, the abrasive particles including shaped abrasive particles or elongated abrasive particles having an aspect ratio of length:width of at least 1.1:1, each of the shaped abrasive particles or elongated abrasive particles having a predetermined position or a predetermined three-axis orientation, including a placement angle ranging from +90 degrees to −90 degrees and a rake angle ranging from +90 degrees to −90 degrees.

19 Claims, 38 Drawing Sheets

(51) Int. Cl.
   *C08K 7/04* (2006.01)
   *C08K 3/16* (2006.01)
   *B24D 3/28* (2006.01)
   *C08K 3/30* (2006.01)

(52) U.S. Cl.
   CPC .............. *C08K 3/30* (2013.01); *C08K 7/04* (2013.01); *C09K 3/1409* (2013.01); *C08K 2003/164* (2013.01); *C08K 2003/2227* (2013.01); *C08K 2003/3009* (2013.01); *C08K 2201/016* (2013.01)

(58) Field of Classification Search
   CPC ............... C08K 7/04; C08K 2003/164; C08K 2003/2227; C08K 2003/3009; C08K 2201/016
   See application file for complete search history.

(56) References Cited

U.S. PATENT DOCUMENTS

| | | |
|---|---|---|
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,808,747 A | 5/1974 | Kenagy |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | Dekok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,000,760 A | 3/1991 | Ohtsubo et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |

(56) References Cited

U.S. PATENT DOCUMENTS

| | | |
|---|---|---|
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,039,775 A | 3/2000 | Ho et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |

(56) References Cited

U.S. PATENT DOCUMENTS

| | | |
|---|---|---|
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,333,360 B1 | 12/2001 | Bessette et al. |
| 6,371,842 B1 | 4/2002 | Romero |
| 6,391,812 B1 | 5/2002 | Araki et al. |
| 6,398,989 B1 | 6/2002 | Bergstrom |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,428,392 B1 | 8/2002 | Sunahara et al. |
| 6,451,076 B1 | 9/2002 | Nevoret et al. |
| 6,475,253 B2 | 11/2002 | Culler et al. |
| 6,511,938 B1 | 1/2003 | Liu |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,750,173 B2 | 6/2004 | Rizkalla |
| 6,755,729 B2 | 6/2004 | Ramanath et al. |
| 6,802,878 B1 | 10/2004 | Monroe |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,112,621 B2 | 9/2006 | Rohrbaugh et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,604 B2 | 9/2007 | Yoshizawa et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,404,832 B2 | 7/2008 | Ohtsubo et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,530,682 B2 | 9/2013 | Sachs |
| 8,568,497 B2 | 10/2013 | Cedric |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,920,527 B2 | 12/2014 | Seider et al. |
| 8,921,687 B1 | 12/2014 | Welser |
| 9,017,439 B2 | 4/2015 | Yener et al. |
| 9,079,154 B2 | 7/2015 | Rosendahl |
| 9,181,477 B2 | 11/2015 | Collins et al. |
| 9,211,634 B2 | 12/2015 | Rehrig et al. |
| 9,259,726 B2 | 2/2016 | Gopal |
| 9,375,826 B2 | 6/2016 | Tian et al. |
| 9,717,674 B1 | 8/2017 | Guskey et al. |
| 9,758,724 B2 | 9/2017 | Collins et al. |
| D849,066 S | 5/2019 | Hanschen et al. |
| D849,067 S | 5/2019 | Hanschen et al. |
| 10,364,383 B2 | 7/2019 | Yener et al. |
| D862,538 S | 10/2019 | Hanschen et al. |
| D870,782 S | 12/2019 | Hanschen et al. |
| 10,556,323 B2 | 2/2020 | Alkhas et al. |
| 10,557,068 B2 | 2/2020 | Oldenkotte et al. |
| 10,655,038 B2 | 5/2020 | Martinez et al. |
| 10,710,211 B2 | 7/2020 | Lehuu et al. |
| 10,717,908 B2 | 7/2020 | Hejtmann et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2003/0228738 A1 | 12/2003 | Beaudoin |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |

(56) References Cited

U.S. PATENT DOCUMENTS

| | | |
|---|---|---|
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0072500 A1* | 3/2008 | Klett ............. B24D 3/342 51/295 |
| 2008/0098659 A1 | 5/2008 | Sung |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0222967 A1 | 9/2008 | Querel et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0098365 A1 | 4/2009 | Moeltgen |
| 2009/0165394 A1 | 7/2009 | Culler et al. |
| 2009/0165661 A1 | 7/2009 | Koenig et al. |
| 2009/0169816 A1 | 7/2009 | Erickson et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0064594 A1 | 3/2010 | Pakalapati et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0081848 A1 | 4/2011 | Chen |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0152548 A1 | 6/2011 | Sachs |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0100366 A1 | 4/2012 | Dumm et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0212952 A1 | 8/2013 | Welygan et al. |
| 2013/0236725 A1 | 9/2013 | Yener et al. |
| 2013/0255162 A1 | 10/2013 | Welygan et al. |
| 2013/0260656 A1 | 10/2013 | Seth et al. |
| 2013/0267150 A1 | 10/2013 | Seider et al. |
| 2013/0283705 A1 | 10/2013 | Fischer et al. |
| 2013/0296587 A1 | 11/2013 | Rosendahl |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0107356 A1 | 4/2014 | Gopal |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0256238 A1 | 9/2014 | Van et al. |
| 2014/0287658 A1 | 9/2014 | Flaschberger et al. |
| 2014/0290147 A1 | 10/2014 | Seth et al. |
| 2014/0345205 A1 | 11/2014 | Kavanaugh et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0004889 A1* | 1/2015 | Seth ............. B24D 11/001 51/298 |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1* | 7/2015 | Iyengar ............. B24D 11/00 51/307 |
| 2015/0209932 A1 | 7/2015 | Lehuu et al. |
| 2015/0218430 A1 | 8/2015 | Yener et al. |
| 2015/0232727 A1 | 8/2015 | Erickson |
| 2015/0267099 A1 | 9/2015 | Panzarella et al. |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |

(56) References Cited

U.S. PATENT DOCUMENTS

| | | |
|---|---|---|
| 2017/0066099 A1 | 3/2017 | Nakamura |
| 2017/0114260 A1 | 4/2017 | Bock et al. |
| 2017/0129075 A1 | 5/2017 | Thurber et al. |
| 2017/0225299 A1 | 8/2017 | Keipert et al. |
| 2017/0335156 A1 | 11/2017 | Bauer et al. |
| 2017/0349797 A1 | 12/2017 | Yener et al. |
| 2018/0086957 A1 | 3/2018 | Sahlin et al. |
| 2018/0161960 A1 | 6/2018 | Wilson et al. |
| 2018/0169837 A1 | 6/2018 | Liu |
| 2018/0215975 A1 | 8/2018 | Marazano et al. |
| 2018/0215976 A1 | 8/2018 | Cotter et al. |
| 2018/0318983 A1 | 11/2018 | Wilson et al. |
| 2019/0022826 A1 | 1/2019 | Franke et al. |
| 2019/0030684 A1 | 1/2019 | Van et al. |
| 2019/0091835 A1 | 3/2019 | Culler et al. |
| 2019/0126436 A1 | 5/2019 | Westberg et al. |
| 2019/0217442 A1 | 7/2019 | Gaeta et al. |
| 2019/0249052 A1 | 8/2019 | Eckel et al. |
| 2019/0270182 A1 | 9/2019 | Eckel et al. |
| 2019/0309201 A1 | 10/2019 | Dumont et al. |
| 2019/0322915 A1 | 10/2019 | Jiwpanich et al. |
| 2019/0330505 A1 | 10/2019 | Bujnowski et al. |
| 2019/0337124 A1 | 11/2019 | Liu et al. |
| 2019/0338172 A1 | 11/2019 | Erickson et al. |
| 2019/0338173 A1 | 11/2019 | Yener et al. |
| 2019/0351531 A1 | 11/2019 | Nelson et al. |
| 2019/0366511 A1 | 12/2019 | Huber |
| 2019/0382637 A1 | 12/2019 | Braun et al. |
| 2020/0139512 A1 | 5/2020 | Culler et al. |
| 2020/0148927 A1 | 5/2020 | Arcona et al. |
| 2020/0156215 A1 | 5/2020 | Jusuf et al. |
| 2020/0157396 A1 | 5/2020 | Cotter et al. |
| 2020/0157397 A1 | 5/2020 | Stevenson et al. |
| 2020/0199426 A1 | 6/2020 | Yener et al. |
| 2020/0262031 A1 | 8/2020 | Seth et al. |

FOREIGN PATENT DOCUMENTS

| | | |
|---|---|---|
| CH | 685051 A5 | 3/1995 |
| CN | 1229007 A | 7/2005 |
| CN | 1774488 A | 5/2006 |
| CN | 101389466 A | 3/2009 |
| CN | 101970347 A | 2/2011 |
| CN | 101980836 A | 2/2011 |
| CN | 102281992 A | 12/2011 |
| CN | 103189164 A | 7/2013 |
| CN | 103842132 A | 6/2014 |
| CN | 102123837 B | 7/2014 |
| CN | 104125875 A | 10/2014 |
| CN | 104994995 A | 10/2015 |
| CN | 105622071 A | 6/2016 |
| CN | 105713568 A | 6/2016 |
| DE | 3923671 C2 | 2/1998 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2242618 A2 | 10/2010 |
| EP | 2390056 A2 | 11/2011 |
| EP | 1800801 B1 | 3/2012 |
| EP | 2445982 A2 | 5/2012 |
| EP | 2507016 A2 | 10/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| EP | 3319758 A1 | 5/2018 |
| EP | 3342839 A1 | 7/2018 |
| EP | 3444313 B1 | 7/2020 |
| EP | 3830211 A1 | 6/2021 |
| FR | 2354373 A1 | 1/1978 |
| GB | 986847 A | 3/1965 |
| GB | 1456765 A | 11/1976 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 1008474 B2 | 2/1995 |
| JP | 3030861 U | 8/1996 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 03194269 B2 | 7/2001 |
| JP | 2001180930 A | 7/2001 |
| JP | 2001207160 A | 7/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006130586 A | 5/2006 |

(56) References Cited

FOREIGN PATENT DOCUMENTS

| | | |
|---|---|---|
| JP | 2006130636 A | 5/2006 |
| JP | 2006159402 A | 6/2006 |
| JP | 2006-192540 A | 7/2006 |
| JP | 2007-537891 A | 12/2007 |
| JP | 2008132560 A | 6/2008 |
| JP | 2008194761 A | 8/2008 |
| JP | 2008531305 A | 8/2008 |
| JP | 2012512046 A | 5/2012 |
| JP | 2012512047 A | 5/2012 |
| JP | 2012512048 A | 5/2012 |
| JP | 2012530615 A | 12/2012 |
| JP | 5238725 B2 | 7/2013 |
| JP | 5238726 B2 | 7/2013 |
| JP | 2014503367 A | 2/2014 |
| JP | 2017518889 A | 7/2017 |
| JP | 2017538588 A | 12/2017 |
| JP | 2018510073 A | 4/2018 |
| KR | 20140106713 A | 9/2014 |
| NL | 171464 B | 11/1982 |
| WO | 1994002559 A1 | 2/1994 |
| WO | 95/03370 | 2/1995 |
| WO | 95/18192 | 7/1995 |
| WO | 1995020469 A1 | 8/1995 |
| WO | 96/27189 A1 | 9/1996 |
| WO | 9711484 A1 | 3/1997 |
| WO | 1997014536 A1 | 4/1997 |
| WO | 1999006500 A1 | 2/1999 |
| WO | 99/38817 A1 | 8/1999 |
| WO | 1999038817 A1 | 8/1999 |
| WO | 9954424 A1 | 10/1999 |
| WO | 01/14494 A1 | 3/2001 |
| WO | 0123323 A1 | 4/2001 |
| WO | 2002097150 | 12/2002 |
| WO | 03/087236 A1 | 10/2003 |
| WO | 2005/080624 A1 | 9/2005 |
| WO | 2005/112601 A2 | 12/2005 |
| WO | 2006/027593 | 3/2006 |
| WO | 2006/062597 A1 | 6/2006 |
| WO | 2007/041538 A1 | 4/2007 |
| WO | 2009/085578 A2 | 7/2009 |
| WO | 2009085578 A2 | 7/2009 |
| WO | 2009085841 A2 | 7/2009 |
| WO | 2009/098017 A1 | 8/2009 |
| WO | 2010/077509 A1 | 7/2010 |
| WO | 2010/085587 A1 | 7/2010 |
| WO | 2010085587 A1 | 7/2010 |
| WO | 2010/151201 | 12/2010 |
| WO | 2011005425 A2 | 1/2011 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011133438 A1 | 10/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2010070294 A1 | 8/2012 |
| WO | 2012/141905 A2 | 10/2012 |
| WO | 2012092590 A3 | 10/2012 |
| WO | 2012140617 A1 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013040423 A2 | 3/2013 |
| WO | 2013/045251 A1 | 4/2013 |
| WO | 2013/049239 A1 | 4/2013 |
| WO | 2013070576 A2 | 5/2013 |
| WO | 2013/101575 A1 | 7/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013149209 A1 | 10/2013 |
| WO | 2013/177446 A1 | 11/2013 |
| WO | 2013/186146 A1 | 12/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/176202 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/048768 A9 | 6/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/102992 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/160854 A1 | 10/2015 |
| WO | 2015/160855 A1 | 10/2015 |
| WO | 2015/160857 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/105469 A1 | 6/2016 |
| WO | 2016/105474 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/187570 A1 | 11/2016 |
| WO | 2016/196795 A1 | 12/2016 |
| WO | 2016/201104 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |
| WO | 2017/083249 A1 | 5/2017 |

(56) References Cited

FOREIGN PATENT DOCUMENTS

| | | |
|---|---|---|
| WO | 2017/083255 A1 | 5/2017 |
| WO | 2016/105543 A9 | 9/2017 |
| WO | 2017/151498 A1 | 9/2017 |
| WO | 2018/010730 A1 | 1/2018 |
| WO | 2018/026669 A1 | 2/2018 |
| WO | 2018/057465 A1 | 3/2018 |
| WO | 2018/057558 A1 | 3/2018 |
| WO | 2018/063902 A1 | 4/2018 |
| WO | 2018/063958 A1 | 4/2018 |
| WO | 2018/063960 A1 | 4/2018 |
| WO | 2018/063962 A1 | 4/2018 |
| WO | 2018/064642 A1 | 4/2018 |
| WO | 2018/080703 A1 | 5/2018 |
| WO | 2018/080704 A1 | 5/2018 |
| WO | 2018/080705 A1 | 5/2018 |
| WO | 2018/080755 A1 | 5/2018 |
| WO | 2018/080756 A1 | 5/2018 |
| WO | 2018/080765 A1 | 5/2018 |
| WO | 2018/080778 A1 | 5/2018 |
| WO | 2018/080784 A1 | 5/2018 |
| WO | 2018/081246 A1 | 5/2018 |
| WO | 2018207145 A1 | 11/2018 |
| WO | 2018236989 A1 | 12/2018 |
| WO | 2019001908 A1 | 1/2019 |
| WO | 2019069157 A1 | 4/2019 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2019167022 A1 | 9/2019 |
| WO | 2019197948 A1 | 10/2019 |
| WO | 2019207415 A1 | 10/2019 |
| WO | 2019207416 A1 | 10/2019 |
| WO | 2019207417 A1 | 10/2019 |
| WO | 2019207423 A1 | 10/2019 |
| WO | 2019215571 A1 | 11/2019 |
| WO | 2020025270 A1 | 2/2020 |
| WO | 2020035764 A1 | 2/2020 |
| WO | 2020075005 A1 | 4/2020 |
| WO | 2020079522 A1 | 4/2020 |
| WO | 2020084382 A1 | 4/2020 |
| WO | 2020084483 A1 | 4/2020 |
| WO | 2020089741 A1 | 5/2020 |
| WO | 2020128708 A1 | 6/2020 |
| WO | 2020128716 A1 | 6/2020 |
| WO | 2020128717 A1 | 6/2020 |
| WO | 2020128719 A1 | 6/2020 |
| WO | 2020128720 A2 | 6/2020 |
| WO | 2020128752 A1 | 6/2020 |
| WO | 2020128779 A2 | 6/2020 |
| WO | 2020128781 A1 | 6/2020 |
| WO | 2020128783 A1 | 6/2020 |
| WO | 2020128787 A1 | 6/2020 |
| WO | 2020128794 A1 | 6/2020 |
| WO | 2020128833 A1 | 6/2020 |
| WO | 2020128838 A1 | 6/2020 |
| WO | 2020128842 A1 | 6/2020 |
| WO | 2020128844 A1 | 6/2020 |
| WO | 2020128845 A1 | 6/2020 |
| WO | 2020128852 A1 | 6/2020 |
| WO | 2020128853 A1 | 6/2020 |
| WO | 2020128856 A1 | 6/2020 |
| WO | 2021009600 A1 | 1/2021 |
| WO | 2021014271 A1 | 1/2021 |
| WO | 2021074756 A1 | 4/2021 |
| WO | 2021074768 A1 | 4/2021 |
| WO | 2021079331 A1 | 4/2021 |
| WO | 2021081571 A1 | 5/2021 |
| WO | 2021105030 A1 | 6/2021 |
| WO | 2021116883 A1 | 6/2021 |
| WO | 2021137092 A1 | 7/2021 |
| WO | 2021161129 A1 | 8/2021 |

OTHER PUBLICATIONS

"Investigation of Shaped Abrasive Particles vol. 1: Review of U.S. Pat. No. 6,054,093 Apr. 25, 2000" © Apr. 2011, 5 pages.
Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, WINTER diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.
Kumar et al., "Composites by rapid prototyping technology", Material & Design, Feb. 2010, vol. 31, Issue 2, pp. 850-856.
Lewis et al., "Direct Ink Writing of Three-Dimensional Ceramic Structures", Journal of the American Ceramic Society, US, Nov. 30, 2006, vol. 89, Issue 12, pp. 3599-3609.
International Search Report with regard to International application No. PCT/US2017/031998, dated Aug. 21, 2017.
International Search Report with regard to International application No. PCT/US2017/031992, dated Aug. 21, 2017.
International Search Report and Written Opinion for Application No. PCT/US2016/036701, dated Sep. 1, 2016, 12 pages.

\* cited by examiner

FIXED ABRASIVE ARTICLES AND METHODS OF FORMING SAME

CROSS REFERENCE TO RELATED APPLICATION(S)

This application claims priority under 35 U.S.C. § 119(e) to U.S. Patent Application No. 62/401,769 entitled "Fixed Abrasive Articles and Methods of Forming Same" by Katherine M. Sahlin et al., filed Sep. 29, 2016, which the application is assigned to the current assignee hereof and incorporated herein by reference in its entirety.

BACKGROUND

Field of the Disclosure

The following is directed to fixed abrasive articles, and more particularly, to fixed abrasive articles including shaped abrasive particles or elongated abrasive particles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041.

The industry continues to demand improved abrasive materials and abrasive articles.

BRIEF DESCRIPTION OF THE DRAWINGS

The present disclosure may be better understood, and its numerous features and advantages made apparent to those skilled in the art by referencing the accompanying drawings.

FIG. 22C includes a graph of orientation for the fixed abrasive articles of FIGS. 22A-22B in accordance with an embodiment.

FIG. 23 includes a graph of cumulative Q-ratio for fixed abrasive articles in accordance with an embodiment.

DETAILED DESCRIPTION

In accordance with an embodiment a fixed abrasive article is disclosed. The fixed abrasive article may be suitable for material removal operations on a variety of workpieces including for example metal or metal alloy materials. Moreover, in certain instances, the fixed abrasive articles of the embodiments herein can include bonded abrasive articles, and more particularly, thin wheels, cut-off wheels, chop saws, roll mill grinding wheels, centerless grinding wheels, and the like. Such products may be particularly suitable for material removal operations including for example, grinding, cutting, dicing, and the like.

Figure 1:
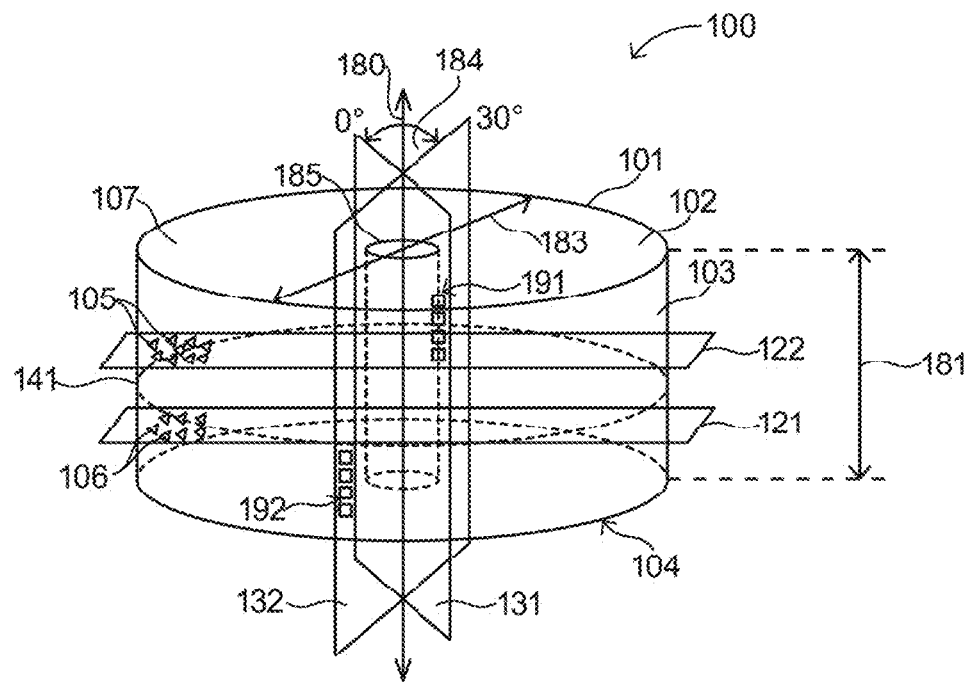
FIG. 1 includes a perspective view illustration of a fixed abrasive article according to an embodiment.

FIG. 1 includes a perspective view illustration of a fixed abrasive article in accordance with an embodiment. As illustrated, the fixed abrasive article 100 can have a body 101 of a generally cylindrical shape including an upper surface 102, a bottom surface 104, and a side surface 103 extending between the upper surface 102 and bottom surface 104. It will be appreciated that the fixed abrasive article of FIG. 1 is a non-limiting example, and other shapes of the body may be utilized including, but not limited to, conical, cup-shaped, depressed center wheels (e.g., T42), and the like. Finally, as further illustrated, the body 101 can include a central opening 185 which may be configured to accept an arbor or shaft for mounting of the body 101 on a machine configured to rotate the body 101 and facilitate a material removal operation.

The fixed abrasive article 100 can have a body 101 including abrasive particles, including for example, the groups of abrasive particles 105 and 106, contained within the volume of the body 101. The abrasive particles may be contained within the three-dimensional volume of the body 101 by a bond material 107 that can extend throughout the three-dimensional volume of the body 101. In accordance with an embodiment, the bond material 107 can include materials such as vitreous, polycrystalline, monocrystalline, organic (e.g., resin), metal, metal alloys, and a combination thereof.

In accordance with an embodiment, the abrasive particles contained within the fixed abrasive 100 can include abrasive materials, including but not limited to oxides, carbides, nitrides, borides, oxycarbides, oxynitrides, oxyborides, superabrasives, diamond, cubic boron nitride, carbon-containing materials, and any combination thereof. In more particular instances, the abrasive particles may include a monocrystalline material, a polycrystalline material, a vitreous material, and any combination thereof. In at least one embodiment, the abrasive particles can include a material such as alumina, zirconia, magnesia, rare-earth oxides, and a combination thereof.

Moreover, it will be appreciated that the fixed abrasive article 100 can include a combination of abrasive particles, including for example one or more types of abrasive particles including for example primary and secondary types of abrasive particles. Primary and secondary types may refer to the content of the abrasive particles within the body of the fixed abrasive article, wherein the primary type abrasive particles are present in a higher content than the secondary type of abrasive particles. In other instances, the distinction between primary and secondary types of abrasive particles may be based upon the position of the abrasive particle within the body, wherein the primary abrasive particles may be positioned to conduct an initial stage of material removal or conduct the majority of material removal compared to the secondary abrasive particles. In still other instances, the distinction between primary and secondary abrasive particles may pertain to the abrasive nature (e.g., hardness, friability, fracture mechanics, etc.) of the abrasive particles, wherein the abrasive nature of the primary particles is typically more robust as compared to the secondary type of abrasive particles. Some suitable examples of abrasive particles that may be considered as a secondary type of abrasive particle include diluent particles, agglomerated particles, unagglomerated particles, naturally occurring materials (e.g., minerals), synthetic materials, and a combination thereof.

In certain instances, the fixed abrasive article 100 can include a particular content of abrasive particles within the body 101 that may facilitate suitable material removal operations. For example, the body 101 can include a content of abrasive particles of at least 0.5 vol % for a total volume of the body 101. In other instances, the content of abrasive particles within the body 101 may be greater, such as at least 1 vol %, at least 5 vol %, at least 10 vol %, at least 15 vol %, at least 20 vol %, at least 25 vol %, at least 30 vol %, at least 35 vol %, at least 40 vol %, or even at least 45 vol %. Still, in another non-limiting embodiment, the content of abrasive particles within the body 101 can be not greater than 60 vol %, such as not greater than 55 vol %, not greater than 50 vol %, not greater than 45 vol %, not greater than 40 vol %, not greater than 35 vol %, not greater than 30 vol %, not greater than 25 vol %, not greater than 20 vol %, not greater than 15 vol %, or even not greater than 10 vol %. It will be appreciated that the content of abrasive particles within the body 101 can be within a range including any of the minimum and maximum percentages noted above, including but not limited to, at least 0.5 vol % to not greater than 50 vol %, such as at least 1 vol % and not greater than 45 vol %, or even within a range of at least 5 vol % and not greater than 40 vol %.

Furthermore, the body 101 of the fixed abrasive 100 can include a particular content of bond material 107 that may facilitate suitable operation of the fixed abrasive article 100. For example, the body 101 can include a content of bond material 107 of at least 0.5 vol % for a total volume of the body 101. In other embodiments, the content of bond material 107 can be greater, such as at least 1 vol %, at least 5 vol %, at least 10 vol %, at least 20 vol %, at least 30 vol %, at least 40 vol %, at least 50 vol %, at least 60 vol %, or even at least 70 vol %. Still, in a non-limiting embodiment, the body 101 can have a content of bond material 107 of not greater than about 90 vol %, such as not greater than 80 vol %, not greater than 70 vol %, not greater than 60 vol %, not greater than 50 vol %, not greater than 40 vol %, not greater than 30 vol %, not greater than 20 vol %, or even not greater than 10 vol %. It will be appreciated that the content of bond material 107 within the body 101 can be within a range including any of the minimum and maximum percentages noted above, including for example within a range including at least 0.5 vol % and not greater than 80 vol %, with a range of at least 0.5 vol % and not greater than 50 vol %, or even with a range of at least 1 vol % to not greater than 40 vol %.

In certain instances, the fixed abrasive article can have a body 101 including a content of porosity. The porosity can extend throughout at least a portion of the entire volume of the body 101, and in certain instances, may extend substantially uniformly throughout the entire volume of the body 101. For example, the porosity can include closed porosity or open porosity. The closed porosity can be in the form of discrete pores that are isolated from each other by bond material and/or abrasive particles. Such closed porosity may be formed by use of pore formers. In other instances, the porosity may be open porosity, defining an interconnected network of channels extending throughout at least a portion of the three-dimensional volume of the body 101. It will be appreciated that the body 101 may include a combination of closed porosity and open porosity.

In accordance with an embodiment, the fixed abrasive article can have a body 101 including a particular content of porosity that can facilitate suitable material removal operations. For example, the body 101 can have a porosity of at least 0.5 vol % for a total volume of the body 101. In other instances, the content of porosity may be greater, such as at least 1 vol %, at least 5 vol %, at least 8 vol %, at least 10 vol %, at least 15 vol %, at least 20 vol %, at least 25 vol %, at least 30 vol %, at least 35 vol %, at least 40 vol %, at least 45 vol %, at least 50 vol %, at least 55 vol %, at least 60 vol %, or even at least 65 vol %. Still, in another non-limiting embodiment, the body 101 can include a content of porosity that is not greater than 80 vol %, such as not greater than 75 vol %, not greater than 70 vol %, not greater than 65 vol %, not greater than 60 vol %, not greater than 55 vol %, not greater than 50 vol %, not greater than 45 vol %, not greater than 40 vol %, not greater 35 vol %, not greater than 30 vol %, not greater than 25 vol %, not greater than 20 vol %, not greater than 15 vol %, not greater than 10 vol %, or even not greater than 5 vol %. It will be appreciated that the body 101 can have a content of porosity within a range including any of the minimum and maximum percentages noted above. For example, the body can have a content of porosity within a range including at least 0.5 vol % and not greater than 80 vol %, such as at least 1 vol % and not greater than 70 vol %, or even at least 5 vol % and not greater than 50 vol %.

In accordance with another embodiment, it will be appreciated that the fixed abrasive article 100 can include a body 101 including certain additives that may facilitate certain grinding operations. For example, the body 101 can include additives such as fillers, grinding aids, pore inducers, hollow materials, catalysts, coupling agents, curants, antistatic agents, suspending agents, anti-loading agents, lubricants, wetting agents, dyes, fillers, viscosity modifiers, dispersants, defoamers, and a combination thereof.

As further illustrated in FIG. 1, the body 101 can have a diameter 183, which may be varied according to the desired material removal operation. The diameter can refer to the maximum diameter of the body, particularly in those cases where the body 101 has a conical or cup-shaped contour. In accordance with an embodiment, the body 101 can have a diameter 183 of at least 20 mm, such as at least 50 mm, at least 80 mm, at least 100 mm, at least 120 mm, at least 150 mm, at least 200 mm, at least 400 mm, at least 800 mm, at least 100 cm, at least 200 cm, at least 400 cm, or even at least 800 cm. In another embodiment, the diameter 183 of the body can be not greater than 4 m, such as not greater than 2 m. It will be appreciated the body 101 can have a diameter 183 within a range including any of the minimum and maximum values noted above.

Moreover, the body can have a particular thickness as defined by the axis 181 extending along the side surface 103 between the upper surface 102 and the bottom surface 104 along the axial axis 180. The body 101 can have a thickness 181, which may be an average thickness of the body 101, which can be not greater than 1 m, such as not greater than 500 cm, not greater than 200 cm, not greater than 100 cm, not greater than 800 mm, not greater than 500 mm, not greater than 200 mm, not greater than 100 mm, not greater than 80 mm, not greater than 50 mm, not greater than 30 mm, or even not greater than 10 mm. It will be appreciated that the body may have a thickness 181, including an average thickness, of at least 1 mm, at least 2 mm, at least 4 mm, at least 8 mm, or even at least 10 mm. It will be appreciated the body 101 can have a thickness 181 within a range including any of the minimum and maximum values noted above.

In accordance with an embodiment, the body 101 may have a particular relationship between the diameter 183 and thickness 181, defining a ratio of diameter:thickness that may be suitable for certain material removal operations. For example, the body 101 can have a ratio of diameter:thickness of at least 10:1, such as at least 15:1, at least 20:1, at least 50:1, or even at least 100:1. It will be appreciated that the body may have a ratio of diameter:thickness of not greater than 10,000:1 or not greater than 1000:1.

In certain instances the abrasive particles may have a certain average particle size relative to one or more dimensions of the body 101 of the fixed abrasive article, including but not limited to the thickness 181 of the body 101. For example, the average particle size (D50), which may be measured by the longest dimension of the particles, can be less than the thickness 181 of the body 101. In particular instances, the abrasive particles can have an average particle size that is not greater than 95% of the average thickness of the body, such as not greater than 90%, not greater than 80%, not greater than 70%, not greater than 60%, not greater than 50%, not greater than 40%, not greater than 30%, not greater than 20%, not greater than 10%, not greater than 9%, not greater than 8%, not greater than 7%, not greater than 6%, not greater than 5%, not greater than 4%, not greater than 3%, not greater than 2%, or even not greater than 1% of the average thickness 181 of the body 101. Still, in another non-limiting embodiment, the abrasive particles can have an average particle size that is at least 0.001% of the average thickness of the body 101, such as at least 0.01%, at least 0.1%, at least 1%, at least 2%, at least 3%, at least 4%, at least 5%, at least 6%, at least 7%, at least 8%, at least 9%, at least 10%, at least 11%, at least 12%, at least 15%, at least 20%, or even at least 30% of the average thickness of the body 101. It will be appreciated that the abrasive particles can have a relative average particle size based on the average thickness of the body within a range including any of the minimum and maximum percentages noted above, including for example, within a range including at least 0.001% and not greater than 95%, within a range including at least 0.01% and not greater than 50%, or even within a range including at least 0.1% and not greater than 20%.

In accordance with an embodiment herein, the fixed abrasive article 100 can be a bonded abrasive article including abrasive particles contained within the three-dimensional volume of the bond material 107, which can be distinct from certain other fixed abrasive articles including, for example, coated abrasive articles, which generally include a single layer of abrasive particles contained within a binder, such as a make coat and/or size coat. Furthermore, coated abrasive articles generally include a backing as a support for the layer of abrasive particles and binder. By contrast, bonded abrasive articles are generally self-supporting articles including a three-dimensional volume of abrasive particles, bond material, and optionally some porosity. Bonded abrasive articles may not necessarily include a substrate, and can be essentially free of a substrate.

The fixed abrasive article 100 may include at least one reinforcing member 141. In particular instances, the reinforcing material 141 can extend for a majority of the entire width (e.g., the diameter 183) of the body 101. However, in other instances, the reinforcing member 141 may extend for only a fraction of the entire width (e.g., diameter 183) of the body 101. In certain instances, the reinforcing member 141 may be included to add suitable stability to the body for certain material removal operations. In accordance with an embodiment, the reinforcing member 141 can include a material such as a woven material, a nonwoven material, a composite material, a laminated material, a monolithic material, a natural material, a synthetic material, and a combination thereof. More particularly, in certain instances, the reinforcing material 141 can include a material such as a monocrystalline material, a polycrystalline material, a vitreous material, an amorphous material, a glass (e.g., a glass fiber), a ceramic, a metal, an organic material, an inorganic material, and a combination thereof. In particular instances, the reinforcing material 141 may include fiberglass, and may be formed essentially from fiberglass.

In particular instances, the reinforcing material 141 can be substantially contained within the three-dimensional volume of the body 101, more particularly, within the three-dimensional volume of the bond material 107. In certain instances, the reinforcing material 141 may intersect an exterior surface of the body 101, including, but not limited to, the upper surface 102, side surface 103, and/or bottom surface 104. For example, the reinforcing material 141 can intersect the upper surface 102 or bottom surface 104. In at least one embodiment, the reinforcing material 141 may define the upper surface 101 or bottom surface 104 of the body 101, such that the bond material 107 is disposed between one or more reinforcing materials. It will be appreciated that while a single reinforcing member 141 is illustrated in the embodiment of FIG. 1, a plurality of reinforcing members may be provided within the body 101 in a variety of arrangements and orientations suitable for the intended material removal application.

As further illustrated, the body 101 can include certain axes and planes defining the three-dimensional volume of the body 101. For example, the body 101 of the fixed abrasive 100 can include an axial axis 180. As further illustrated along the axial axis 180, the body 101 can include a first axial plane 131 extending along the axial axis 180 and through a particular diameter of the body 101 at a particular angular orientation, as designated herein as 0°. As further illustrated, the body 101 can include a second axial plane 132 distinct from the first axial plane 131. The second axial plane 132 can extend along the axial axis 180 and through a diameter of the body 101 at an angular position, as designated by example herein as 30°. The first and second axial planes 131 and 132 of the body 101 may define particular axial collections of abrasive particles within the body 101, including for example the axial collection of abrasive particles 191 associated with the axial plane 131 and the axial collection of abrasive particles 192 associated with the axial plane 132. Furthermore, the axial planes of the body 101 may define sectors there between, including for example, sector 184 defined as the region between the axial planes 131 and 132 within the body 101. The sector can include a particular group of abrasive particles that may facilitate improved material removal operations. Reference herein to features of portions of abrasive particles within the body, including abrasive particles within axial planes, will also be relevant to groups of abrasive particles contained within one or more sectors of the body.

As further illustrated, the body 101 can include a first radial plane 121 extending along a plane that is substantially parallel to the upper surface 102 and/or bottom surface 104 at a particular axial location along the axial axis 180. The body can further include a second radial plane 122, which can extend in a substantially parallel manner to the upper surface 102 and/or bottom surface 104 at a particular axial location along the axial axis 180. The first radial plane 121 and second radial plane 122 can be separated from each other within the body 101, and more particularly, the first radial plane 121 and second radial plane 122 can be axially separated from each other. As further illustrated, in certain instances, one or more reinforcing members 141 may be disposed between the first and second radial planes 121 and 122. As will be described in more detail herein, the first and second radial planes 121 and 122 may include one or more particular groups of abrasive particles, including for example, the group of abrasive particles 106 of the first radial plane 121 and the group of abrasive particles 105 of the second radial plane 122, which may have certain features relative to each other that may facilitate improved grinding performance.

The abrasive particles of the embodiments herein can include particular types of abrasive particles. For example, the abrasive particles may include shaped abrasive particles and/or elongated abrasive particles, wherein the elongated abrasive particles may include an aspect ratio of length: width or length:height of at least 1.1:1. Various methods may be utilized to obtain shaped abrasive particles. The particles may be obtained from a commercial source or fabricated. Some suitable processes used to fabricate the shaped abrasive particles can include, but is not limited to, depositing, printing (e.g., screen-printing), molding, pressing, casting, sectioning, cutting, dicing, punching, pressing, drying, curing, coating, extruding, rolling, and a combination thereof. Similar processes may be utilized to obtain elongated abrasive particles. Elongated un-shaped abrasive particles may be formed through crushing and sieving techniques.

Figure 2:
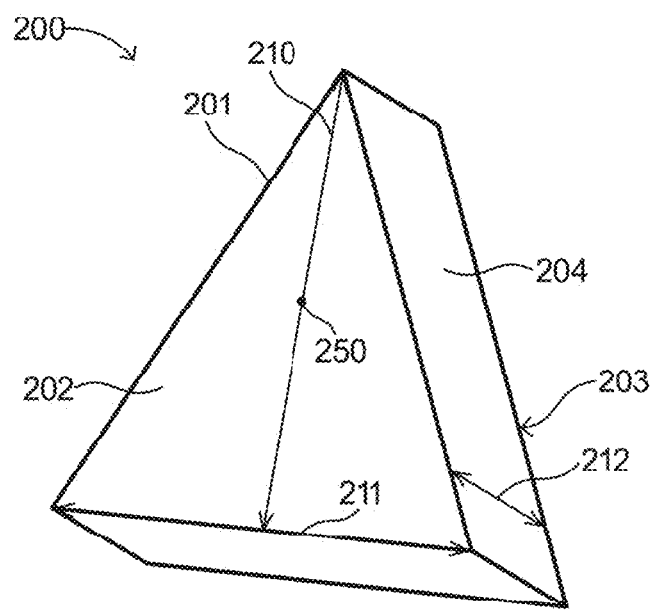
FIG. 2 includes a perspective view illustration of a shaped abrasive particle according to an embodiment.

FIG. 2 includes a perspective view illustration of a shaped abrasive particle in accordance with an embodiment. The shaped abrasive particle 200 can include a body 201 including a major surface 202, a major surface 203, and a side surface 204 extending between the major surfaces 202 and 203. As illustrated in FIG. 2, the body 201 of the shaped abrasive particle 200 is a thin-shaped body, wherein the major surfaces 202 and 203 are larger than the side surface 204. Moreover, the body 201 can include a longitudinal axis 210 extending from a point or corner of the shaped abrasive particle 200 to a base (e.g., an edge of the shaped abrasive particle 200 opposite the point or corner) and through the midpoint 250 on the major surface 202. The longitudinal axis 210 can define the longest dimension of a major surface while also extending through the midpoint 250 of the major surface. The body 201 can further include a lateral axis 211 defining a width of the body 201 extending generally perpendicular to the longitudinal axis 210 on the same major surface 202. Finally, as illustrated, the body 201 can include a vertical axis 212, which in the context of thin shaped bodies can define a height (or thickness) of the body 201. For thin-shaped bodies, the length of the longitudinal axis 210 is equal to or greater than the vertical axis 212. As illustrated, the thickness 212 can extend along the side surface 204 between the major surfaces 202 and 203 and perpendicular to the plane defined by the longitudinal axis 210 and lateral axis 211. It will be appreciated that reference herein to length, width, and height of the abrasive particles may be referenced to average values taken from a suitable sampling size of abrasive particles of a batch.

The shaped abrasive particles can include any of the features of the abrasive particles of the embodiments herein. For example, the shaped abrasive particles can include a crystalline material, and more particularly, a polycrystalline material. Notably, the polycrystalline material can include abrasive grains. In one embodiment, the body of the abrasive particle, including for example, the body of a shaped abrasive particle can be essentially free of an organic material, including for example, a binder. In at least one embodiment, the abrasive particles can consist essentially of a polycrystalline material.

Some suitable materials for use as abrasive particles can include nitrides, oxides, carbides, borides, oxynitrides, oxyborides, diamond, carbon-containing materials, and a combination thereof. In particular instances, the abrasive particles can include an oxide compound or complex, such as aluminum oxide, zirconium oxide, titanium oxide, yttrium oxide, chromium oxide, strontium oxide, silicon oxide, magnesium oxide, rare-earth oxides, and a combination thereof. In one particular embodiment, the abrasive particles can include at least 95 wt % alumina for the total weight of the body. In at least one embodiment, the abrasive particles can consist essentially of alumina. Still, in certain instances, the abrasive particles can include not greater than 99.5 wt % alumina for the total weight of the body. Moreover, in particular instances, the shaped abrasive particles can be formed from a seeded sol-gel. In at least one embodiment, the abrasive particles of the embodiments herein may be essentially free of iron, rare-earth oxides, and a combination thereof.

The abrasive grains (i.e., crystallites) contained within the body of the abrasive particles may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, not greater than about 1 micron, not greater than about 0.9 microns, not greater than about 0.8 microns, not greater than about 0.7 microns, or even not greater than about 0.6 microns. Still, the average grain size of the abrasive grains contained within the body of the abrasive particles can be at least about 0.01 microns, such as at least about 0.05 microns, at least about 0.06 microns, at least about 0.07 microns, at least about 0.08 microns, at least about 0.09 microns, at least about 0.1 microns, at least about 0.12 microns, at least about 0.15 microns, at least about 0.17 microns, at least about 0.2 microns, or even at least about 0.5 microns. It will be appreciated that the abrasive grains can have an average grain size within a range between any of the minimum and maximum values noted above.

In accordance with certain embodiments, certain abrasive particles can be composite articles including at least two different types of grains within the body of the abrasive particle. It will be appreciated that different types of grains are grains having different compositions, different crystallite sizes, and/or different grit sizes with regard to each other. For example, the body of the abrasive particle can be formed such that is includes at least two different types of grains, wherein the two different types of grains can be nitrides, oxides, carbides, borides, oxynitrides, oxyborides, diamond, and a combination thereof.

In accordance with an embodiment, the abrasive particles can have an average particle size, as measured by the largest dimension (i.e., length) of at least about 100 microns. In fact, the abrasive particles can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the abrasive particles of the embodiments herein can have an average particle size that is not greater than about 5 mm, such as not greater than about 3 mm, not greater than about 2 mm, or even not greater than about 1.5 mm. It will be appreciated that the abrasive particles can have an average particle size within a range between any of the minimum and maximum values noted above.

FIG. 2 includes an illustration of a shaped abrasive particle having a two-dimensional shape as defined by the planes of the major surfaces 202 or 203, each of which has a generally triangular two-dimensional shape. It will be appreciated that the shaped abrasive particles of the embodiments herein are not so limited and can include other two-dimensional shapes. For example, the shaped abrasive particles of the embodiment herein can include particles having a body with a two-dimensional shape as defined by a major surface of the body from the group of shapes including polygons, irregular polygons, irregular polygons including arcuate or curved sides or portions of sides, ellipsoids, numerals, Greek alphabet characters, Latin alphabet characters, Russian alphabet characters, Kanji characters, complex shapes having a combination of polygons shapes, star shapes, and a combination thereof.

Figure 3A:
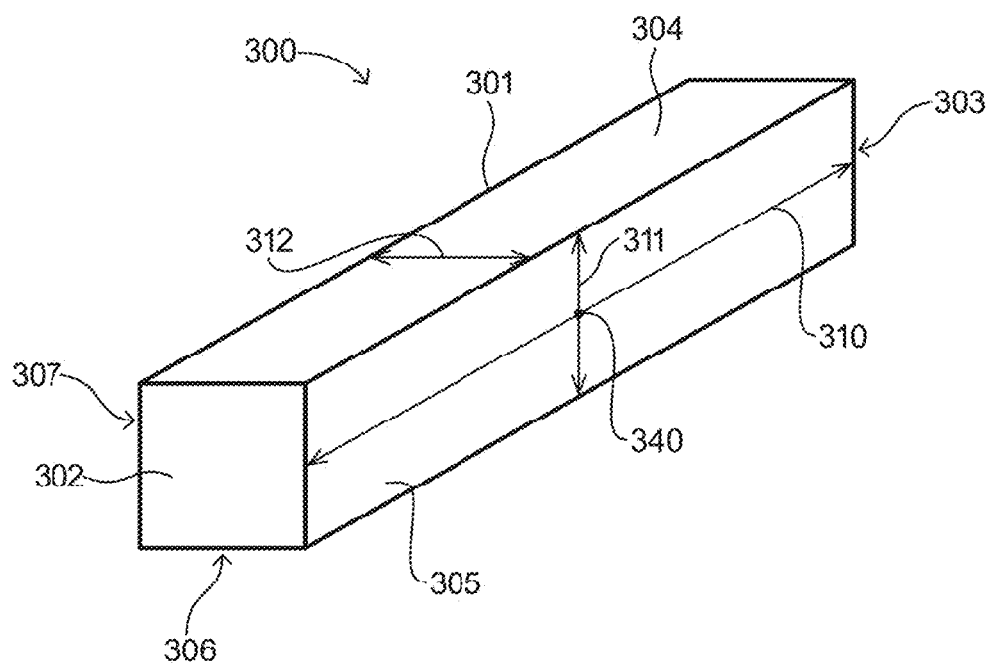
FIG. 3A includes a perspective view illustration of a shaped abrasive particle in accordance with an embodiment.

FIG. 3A includes a perspective view illustration of a shaped abrasive particle according to an embodiment. Notably, the shaped abrasive particle 300 can include a body 301 including a surface 302 and a surface 303, which may be referred to as end surfaces 302 and 303. The body can further include surfaces 304, 305, 306, 307 extending between and coupled to the end surfaces 302 and 303. The shaped abrasive particle of FIG. 3A is an elongated shaped abrasive particle having a longitudinal axis 310 that extends along the surface 305 and through the midpoint 340 between the end surfaces 302 and 303. It will be appreciated that the surface 305 is selected for illustrating the longitudinal axis 310, because the body 301 has a generally square cross-sectional contour as defined by the end surfaces 302 and 303. As such, the surfaces 304, 305, 306, and 307 have approximately the same size relative to each other. However, in the context of other elongated abrasive particles wherein the surfaces 302 and 303 define a different shape, for example a rectangular shape, wherein one of the surfaces 304, 305, 306, and 307 may be larger relative to the others, the largest of those surfaces defines the major surface and, therefore, the longitudinal axis would extend along the largest of those surfaces. As further illustrated, the body 301 can include a lateral axis 311 extending perpendicular to the longitudinal axis 310 within the same plane defined by the surface 305. As further illustrated, the body 301 can further include a vertical axis 312 defining a height of the abrasive particle, wherein the vertical axis 312 extends in a direction perpendicular to the plane defined by the longitudinal axis 310 and lateral axis 311 of the surface 305.

It will be appreciated that, like the thin shaped abrasive particle of FIG. 2, the elongated shaped abrasive particle of FIG. 3A can have various two-dimensional shapes such as those defined with respect to the shaped abrasive particle of FIG. 2. The two-dimensional shape of the body 301 can be defined by the shape of the perimeter of the end surfaces 302 and 303. The elongated shaped abrasive particle 300 can have any of the attributes of the shaped abrasive particles of the embodiments herein.

Figure 3B:
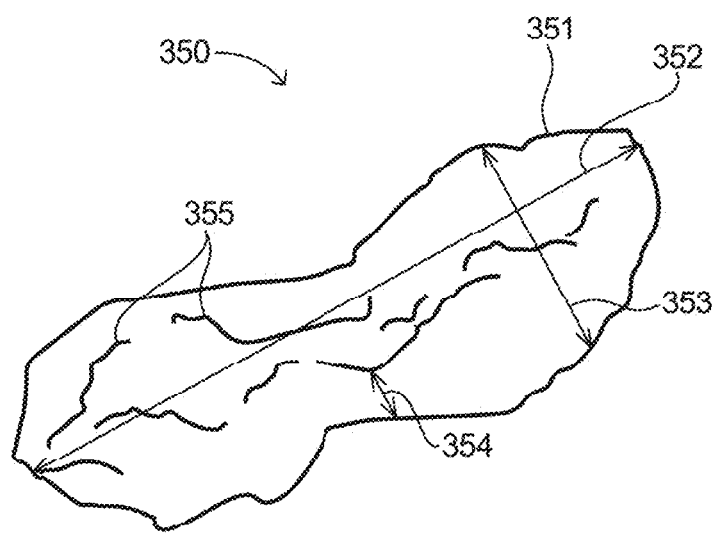
FIG. 3B includes a perspective view illustration of an elongated abrasive particle according to an embodiment.

FIG. 3B includes an illustration of an elongated particle, which is not a shaped abrasive particle. Shaped abrasive particles may be formed through particular processes, including molding, printing, casting, extrusion, and the like. Shaped abrasive particles are formed such that each particle has substantially the same arrangement of surfaces and edges relative to each other. For example, a group of shaped abrasive particles generally have the same arrangement and orientation and or two-dimensional shape of the surfaces and edges relative to each other. As such, the shaped abrasive particles have a high shape fidelity and consistency in the arrangement and orientation of the surfaces and edges relative to each other. By contrast, non-shaped abrasive particles can be formed through different processes and have different shape attributes. For example, crushed grains are typically formed by a comminution process wherein a mass of material is formed and then crushed and sieved to obtain abrasive particles of a certain size. However, a non-shaped abrasive particle will have a generally random arrangement of the surfaces and edges, and generally will lack any recognizable two-dimensional or three-dimensional shape in the arrangement of the surfaces and edges. Moreover, the non-shaped abrasive particles do not necessarily have a consistent shape with respect to each other and therefore have a significantly lower shape fidelity compared to shaped abrasive particles. The non-shaped abrasive particles generally are defined by a random arrangement of surfaces and edges with respect to each other.

As further illustrated in FIG. 3B, the elongated abrasive article can be a non-shaped abrasive particle having a body 351 and a longitudinal axis 352 defining the longest dimension of the particle, a lateral axis 353 extending perpendicular to the longitudinal axis 352 and defining a width of the particle. Furthermore, the elongated abrasive particle may have a height (or thickness) as defined by the vertical axis 354 which can extend generally perpendicular to a plane defined by the combination of the longitudinal axis 352 and lateral axis 353. As further illustrated, the body 351 of the elongated, non-shaped abrasive particle can have a generally random arrangement of edges 355 extending along the exterior surface of the body 351.

As will be appreciated, the elongated abrasive particle can have a length defined by longitudinal axis 352, a width defined by the lateral axis 353, and a vertical axis 354 defining a height. As will be appreciated, the body 351 can have a primary aspect ratio of length:width such that the length is greater than the width. Furthermore, the length of the body 351 can be greater than or equal to the height. Finally, the width of the body 351 can be greater than or equal to the height 354. In accordance with an embodiment, the primary aspect ratio of length:width can be at least 1.1:1, at least 1.2:1, at least 1.5:1, at least 1.8:1, at least 2:1, at least 3:1, at least 4:1, at least 5:1, at least 6:1, or even at least 10:1. In another non-limiting embodiment, the body 351 of the elongated abrasive particle can have a primary aspect ratio of length:width of not greater than 100:1, not greater than 50:1, not greater than 10:1, not greater than 6:1, not greater than 5:1, not greater than 4:1, not greater than 3:1, or even not greater than 2:1. It will be appreciated that the primary aspect ratio of the body 351 can be with a range including any of the minimum and maximum ratios noted above.

Furthermore, the body 351 of the elongated abrasive particle 350 can include a secondary aspect ratio of width:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the secondary aspect ratio width:height of the body 351 can be not greater than 100:1, such as not greater than 50:1, not greater than 10:1, not greater than 8:1, not greater than 6:1, not greater than 5:1, not greater than 4:1, not greater than 3:1, or even not greater than 2:1. It will be appreciated the secondary aspect ratio of width:height can be with a range including any of the minimum and maximum ratios of above.

In another embodiment, the body 351 of the elongated abrasive particle 350 can have a tertiary aspect ratio of length:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the tertiary aspect ratio length:height of the body 351 can be not greater than 100:1, such as not greater than 50:1, not greater than 10:1, not greater than 8:1, not greater than 6:1, not greater than 5:1, not greater than 4:1, or even not greater than 3:1. It will be appreciated that the tertiary aspect ratio of the body 351 can be within a range including any of the minimum and maximum ratios and above.

The elongated abrasive particle 350 can have certain attributes of the other abrasive particles described in the embodiments herein including, but not limited to, composition, microstructural features (e.g., average grain size), hardness, porosity, and the like.

Figure 4A:
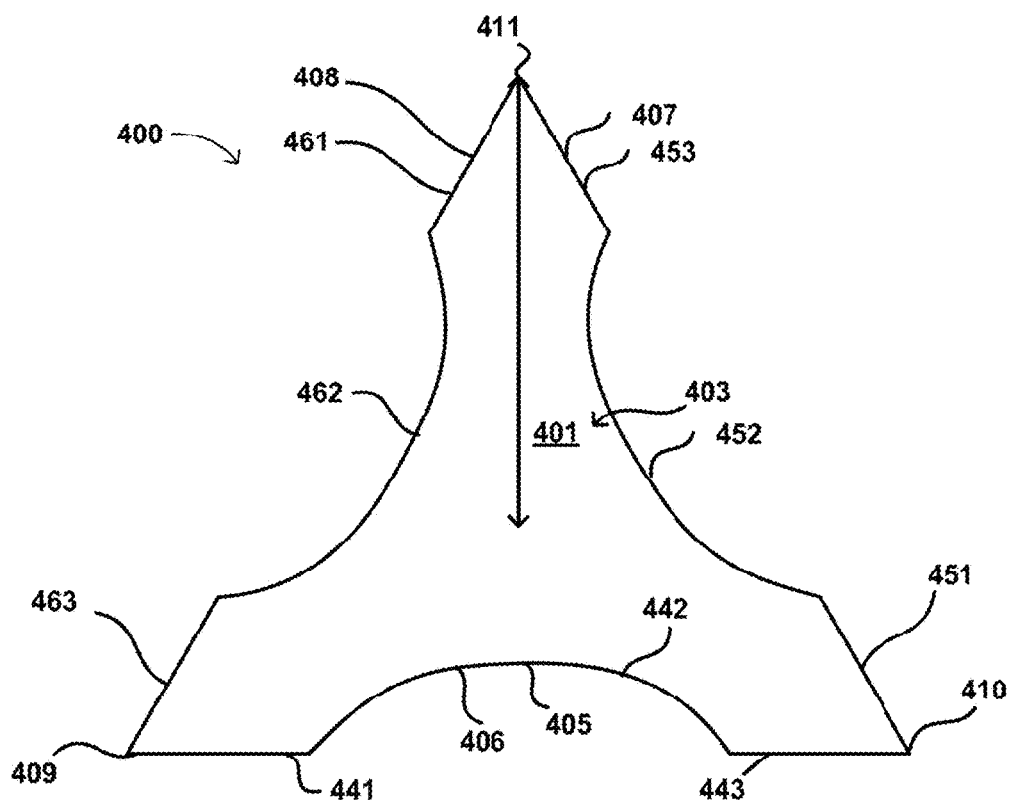
FIG. 4A includes an illustration of a shaped abrasive particle according to an embodiment.

FIG. 4A includes a top view illustration of a shaped abrasive particle according to an embodiment. In particular, the shaped abrasive particle 400 can include a body 401 having the features of other shaped abrasive particles of embodiments herein, including an upper major surface 403 and a bottom major surface (not shown) opposite the upper major surface 403. The upper major surface 403 and the bottom major surface can be separated from each other by at least one side surface 405, which may include one or more discrete side surface portions, including for example, a first portion 406 of the side surface 405, a second portion 407 of the side surface 405, and a third portion 408 of the side surface 405. In particular, the first portion 406 of the side surface 405 can extend between a first corner 409 and a second corner 410. The second portion 407 of the side surface 405 can extend between the second corner 410 and a third corner 411. Notably, the second corner 410 can be an external corner joining two portions of the side surface 405. The second corner 410 and a third corner 411, which is also an external corner, are adjacent to each other and have no other external corners disposed between them. Also, the third portion 408 of the side surface 405 can extend between the third corner 411 and the first corner 409, both of which are external corners that are adjacent to each other and have no other external corners disposed between them.

As illustrated, the body 401 can include a first portion 406 including a first curved section 442 disposed between a first linear section 441 and a second linear section 443 and between the external corners 409 and 410. The second portion 407 is separated from the first portion 406 of the side surface 405 by the external corner 410. The second portion 407 of the side surface 405 can include a second curved section 452 joining a third linear section 451 and a fourth linear section 453. Furthermore, the body 401 can include a third portion 408 separated from the first portion 406 of the side surface 405 by the external corner 409 and separated from the second portion 407 by the external corner 411. The third portion 408 of the side surface 405 can include a third curved section 462 joining a fifth linear section 461 and a sixth linear section 463.

Figure 4B:
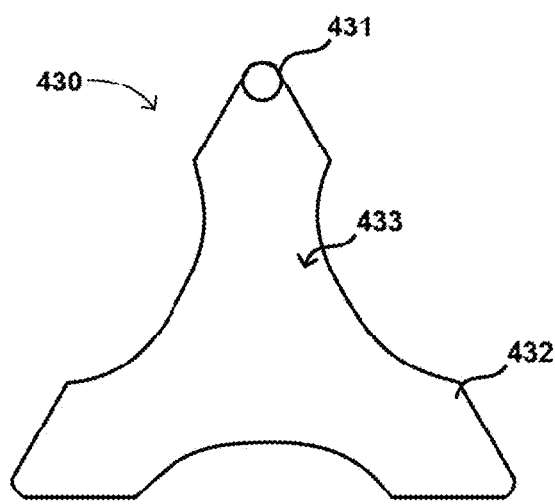
FIG. 4B includes an illustration of a shaped abrasive particle in accordance with an embodiment.

FIG. 4B includes a top view of a shaped abrasive particle 430 according to an embodiment. The tip sharpness of a shaped abrasive particle, which may be an average tip sharpness, may be measured by determining the radius of a best fit circle on an external corner 431 of the body 432. For example, a top view of the upper major surface 433 of the body 432 is provided. At an external corner 431, a best fit circle is overlaid on the image of the body 432 of the shaped abrasive particle 430, and the radius of the best fit circle relative to the curvature of the external corner 431 defines the value of tip sharpness for the external corner 431. The measurement may be recreated for each external corner of the body 432 to determine the average individual tip sharpness for a single shaped abrasive particle 430. Moreover, the measurement may be recreated on a suitable sample size of shaped abrasive particles of a batch of shaped abrasive particles to derive the average batch tip sharpness. Any suitable computer program, such as ImageJ may be used in conjunction with an image (e.g., SEM image or light microscope image) of suitable magnification to accurately measure the best fit circle and the tip sharpness.

The shaped abrasive particles of the embodiments herein may have a particular tip sharpness that may facilitate suitable performance in the fixed abrasive articles of the embodiments herein. For example, the body of a shaped abrasive particle can have a tip sharpness of not greater than 80 microns, such as not greater than 70 microns, not greater than 60 microns, not greater than 50 microns, not greater than 40 microns, not greater than 30 microns, not greater than 20 microns, or even not greater than 10 microns. In yet another non-limiting embodiment, the tip sharpness can be at least 2 microns, such as at least 4 microns, at least 10 microns, at least 20 microns, at least 30 microns, at least 40 microns, at least 50 microns, at least 60 microns, or even at least 70 microns. It will be appreciated that the body can have a tip sharpness within a range between any of the minimum and maximum values noted above.

Another grain feature of shaped abrasive particles is the Shape Index. The Shape Index of a body of a shaped abrasive particle can be described as a value of an outer radius of a best-fit outer circle superimposed on the body, as viewed in two dimensions of a plane of length and width of the body (e.g., the upper major surface or the bottom major surface), compared to an inner radius of the largest best-fit inner circle that fits entirely within the body, as viewed in the same plane of length and width. For example, turning to FIG. 4C, a shaped abrasive particle is provided with two circles superimposed on the illustration to demonstrate the calculation of Shape Index. A first circle is superimposed on the body 470 of the shaped abrasive particle, which is a best-fit outer circle representing the smallest circle that can be used to fit the entire perimeter of the body 470 within its boundaries. The outer circle has a radius (Ro). For shapes such as that illustrated in FIG. 4C, the outer circle may intersect the perimeter of the body at each of the three external corners. However, it will be appreciated that for certain irregular or complex shapes, the body may not fit uniformly within the circle such that each of the corners intersect the circle at equal intervals, but a best-fit, outer circle still may be formed. Any suitable computer program, such as ImageJ, may be used in conjunction with an image of suitable magnification (e.g., SEM image or light microscope image) to create the outer circle and measure the radius (Ro).

Figure 4C:
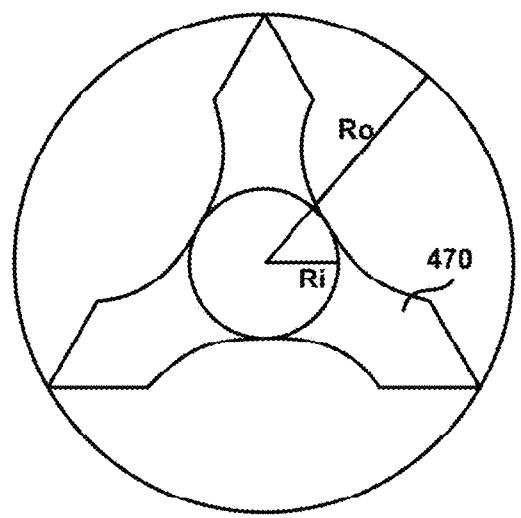
FIG. 4C includes an illustration of a shaped abrasive particle in accordance with an embodiment.

A second, inner circle can be superimposed on the body 470, as illustrated in FIG. 4C, which is a best fit circle representing the largest circle that can be placed entirely within the perimeter of the body 470 as viewed in the plane of the length and width of the body 470. The inner circle can have a radius (Ri). It will be appreciated that for certain irregular or complex shapes, the inner circle may not fit uniformly within the body such that the perimeter of the circle contacts portions of the body at equal intervals, such as shown for the shape of FIG. 4C. However, a best-fit, inner circle still may be formed. Any suitable computer program, such as ImageJ, may be used in conjunction with an image of suitable magnification (e.g., SEM image or light microscope image) to create the inner circle and measure the radius (Ri).

The Shape Index can be calculated by dividing the outer radius by the inner radius (i.e., Shape Index=Ri/Ro). For example, the body 470 of the shaped abrasive particle has a Shape Index of approximately 0.35. Moreover, an equilateral triangle generally has a Shape Index of approximately 0.5, while other polygons, such as a hexagon or pentagon, have Shape Index values greater than 0.5. In accordance with an embodiment, the shaped abrasive particles herein can have a Shape Index of at least 0.02, such as at least 0.05, at least 0.10, at least 0.15, at least 0.20, at least 0.25, at least 0.30, at least 0.35, at least 0.40, at least 0.45, at least about 0.5, at least about 0.55, at least 0.60, at least 0.65, at least 0.70, at least 0.75, at least 0.80, at least 0.85, at least 0.90, or at least 0.95. Still, in another non-limiting embodiment, the shaped abrasive particle can have a Shape Index of not greater than 1, such as not greater than 0.98, not greater than 0.95, not greater than 0.90, not greater than 0.85, not greater than 0.80, not greater than 0.75, not greater than 0.70, not greater than 0.65, not greater than 0.60, not greater than 0.55, not greater than 0.50, not greater than 0.45, not greater than 0.40, not greater than 0.35, not greater than 0.30, not greater than 0.25, not greater than 0.20, not greater than 0.15, not greater than 0.10, not greater than 0.05, or not greater than 0.02. It will be appreciated that the shaped abrasive particles can have a Shape Index within a range between any of the minimum and maximum values noted above.

Figure 4D:
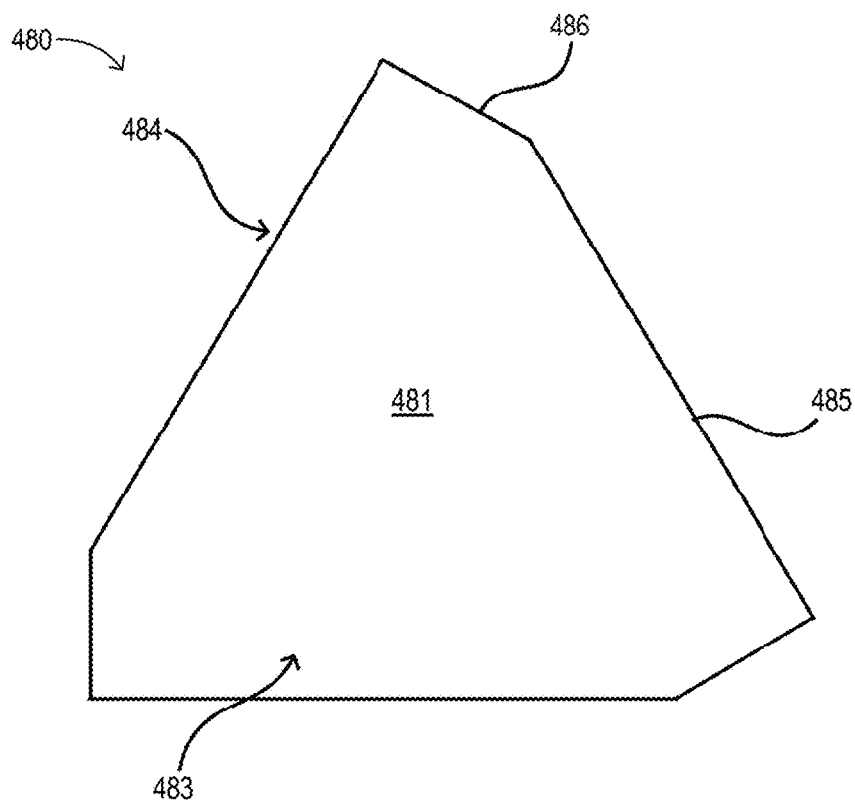
FIG. 4D includes an illustration of a shaped abrasive particle in accordance with an embodiment.

FIG. 4D includes a top view of a shaped abrasive particle according to another embodiment. The shaped abrasive particle 480 can have a body 481 having the features of other shaped abrasive particles of embodiments herein, including an upper major surface 483 and a bottom major surface (not shown) opposite the upper major surface 483. The upper major surface 483 and the bottom major surface can be separated from each other by at least one side surface 484, which may include one or more discrete side surface sections. According to one embodiment, the body 481 can be defined as an irregular hexagon, wherein the body has a hexagonal (i.e., six-sided) two dimensional shape as viewed in the plane of a length and a width of the body 481, and wherein at least two of the sides, such as sides 485 and 486, have a different length with respect to each other. Notably, the length of the sides is understood herein to refer to the width of the body 481 and the length of the body is the greatest dimension extending through the midpoint of the body 481. Moreover, as illustrated, none of the sides are parallel to each other. And furthermore, while not illustrated, any of the sides may have a curvature to them, including a concave curvature wherein the sides may curve inwards toward the interior of the body 481.

Figure 5A:
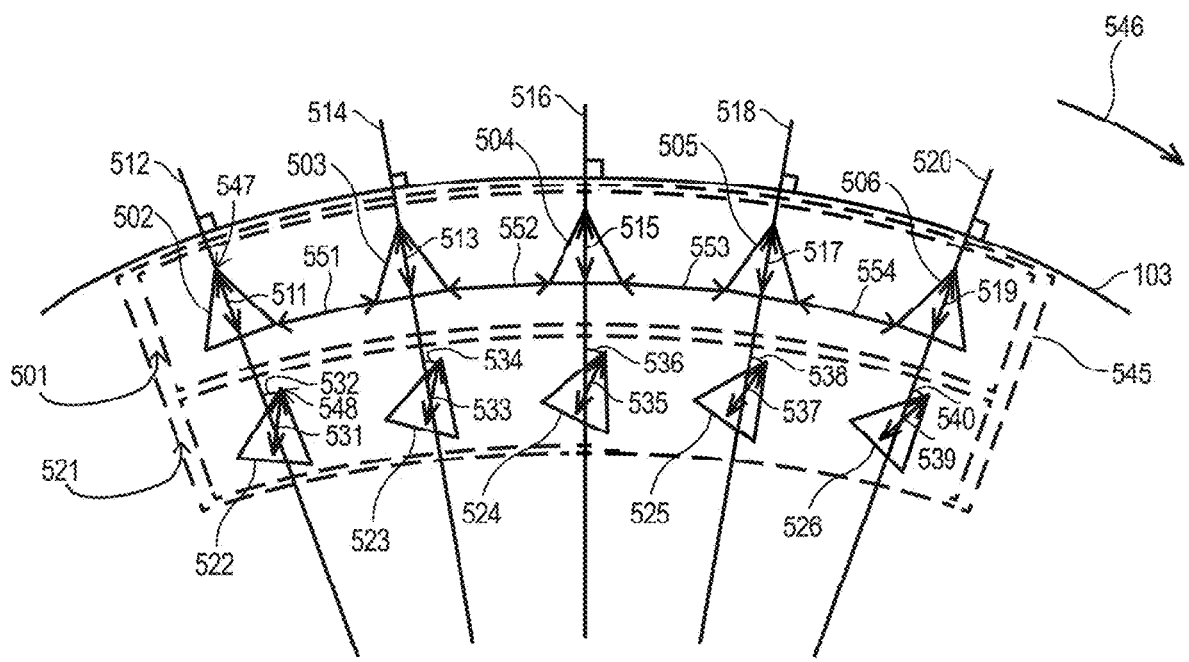
FIG. 5A includes an illustration of a portion of a fixed abrasive article including abrasive particles in accordance with an embodiment.

In accordance with an embodiment, the abrasive particles, which can include shaped abrasive particles and/or elongated abrasive particles, can be placed within the body 101 of the fixed abrasive article 100 depicted in FIG. 1 such that the abrasive particles have a predetermined position and/or predetermined three-axis orientation. FIG. 5A includes a top-down illustration of a first group of abrasive particles 545 within a radial plane of the body 101 (as depicted in FIG. 1). As illustrated, the first group 545 can include a plurality of abrasive particles, including abrasive particles 502, 503, 504, 505, and 506 (502-506). The first group 545 may further include abrasive particles 522, 523, 524, 525, 526 (522-526). Unlike conventional fixed abrasive articles, including conventional bonded abrasive articles, where the abrasive particles are randomly positioned and randomly oriented within the volume of the body, the fixed abrasive articles of the embodiments herein include abrasive particles in a predetermined position within the three-dimensional volume of the body 101. Furthermore, the abrasive particles of the embodiments herein can be placed within the three-dimensional volume of the body with a predetermined three-axis orientation. The provision of the abrasive particles in a predetermined position and/or predetermined three-axis orientation may facilitate improved material removal performance of the fixed abrasive article compared to conventional fixed abrasive articles having abrasive particles randomly positioned and oriented within the body.

The first group of abrasive particles 545 within a radial plane (e.g., the radial plane 122 depicted in FIG. 1) can each have a predetermined three-axis orientation, including a predetermined rotational orientation, relative to the side surface 103 of the body 101. For example, the shaped abrasive particle 502 can have a longitudinal axis 511. The longitudinal axis 511 extends from a point or corner of the shaped abrasive particle 502 through the midpoint of a major surface of the shaped abrasive particle 502. In an embodiment and as shown in FIG. 5A, the longitudinal axis 511 can be substantially aligned with a radial axis 512 of the body 101. The radial axis 512 is a radius of the body 101 within the radial plane 122 that also extends through the midpoint of the major surface of the particle defining the longitudinal axis 511 of the particle. Furthermore, the radial axis 512 is substantially perpendicular to the side surface 103 to which the abrasive particle is most closely positioned. A predetermined rotational orientation angle is the angle between the longitudinal axis 511 of the shaped abrasive particle (or elongated particle) and the radial axis 512 in a plane defined by a length and a width of the shaped abrasive particle 502. More specifically, the predetermined rotational orientation angle is measured at the point along the longitudinal axis 511 closest to the side surface 103. Therefore, the predetermined rotational orientation angle of the shaped abrasive particle 502 relative to the side surface 103 in FIG. 5A is substantially 0°. In accordance with an embodiment, at least a portion of the abrasive particles within the fixed abrasive article 100 can have a predetermined rotational orientation angle that is less than 90°. For example, the average predetermined rotational orientation angle for a portion of the abrasive particles can be not greater than 90°, such as not greater than 80°, not greater than 70°, not greater than 60°, not greater than 50°, not greater than 40°, not greater than 30°, not greater than 20°, not greater than 10°, or not greater than 5°. Still, in another non-limiting embodiment, the average predetermined rotational orientation angle for a portion of the abrasive particles within the body 101 can be at least 0.1°, such as at least 1°, at least 3°, at least 5°, at least 10°, at least 20°, at least 30°, at least 40°, or even at least 50°. It will be appreciated that the average predetermined rotational orientation angle may be controlled to facilitate improved grinding performance of the fixed abrasive article. Furthermore, the average predetermined rotational orientation angle for a portion of the abrasive particles in the body 101 can be within a range including any of the minimum and maximum angles noted above.

For any of the embodiments herein, reference to a portion of the abrasive particles having a predetermined rotational orientation angle can include at least a content of abrasive particles, particularly shaped abrasive particles and/or elongated abrasive particles, which can be distinct from conventional articles having a random orientation of the abrasive particles. For example, a portion of abrasive particles in the body can include at least 10%, such as at least 20%, at least 30%, at least 40%, at least 50%, at least 60%, at least 70%, at least 80%, or even at least 90% of the total abrasive particles within the body 101. In accordance with a particular embodiment, essentially all of the abrasive particles, including only the shaped abrasive particles and/or elongated abrasive particles, can have a predetermined rotational orientation angle within a range including any of the minimum and maximum values noted above. Moreover, as will be understood in light of the entire disclosure and embodiments herein, a portion of abrasive particles within the body 101 can include a group of abrasive particles (e.g., a first group of abrasive particles in a radial plane or in a sector), a radial set of abrasive particles, an axial collection of abrasive particles, and a combination thereof.

Furthermore, at least a portion of the abrasive particles, including the shaped abrasive particles and/or elongated abrasive particles within the body 101, may have a standard deviation of predetermined rotational orientation angle. A low standard deviation indicates a high degree of control of the predetermined rotational orientation angle for that portion of the abrasive particles having the predetermined rotational orientation angle within the body 101. For example, in accordance with an embodiment, the portion of abrasive particles within the body 101 having a predetermined rotational orientation angle can have a standard deviation of that predetermined rotational orientation angle of not greater than 20 degrees, not greater than 18 degrees, not greater than 16 degrees, not greater than 14 degrees, not greater than 12 degrees, not greater than 10 degrees, not greater than 9 degrees, not greater than 8 degrees, not greater than 7 degrees, or even not greater than 6 degrees. Still, in at least one non-limiting embodiment, the portion of the abrasive particles in the body having a predetermined rotational orientation angle can have a standard deviation of that same predetermined rotational orientation angle of at least 0.01 degrees, such as at least 0.1 degrees, or even at least 1 degree. It will be appreciated that the standard deviation of the predetermined rotational orientation angle can be within a range including any of the minimum maximum values noted above. Reference herein to a portion of the abrasive particles within the body 101 having a standard deviation predetermined rotation orientation angle can be reference to a portion as described herein.

Figure 5B:
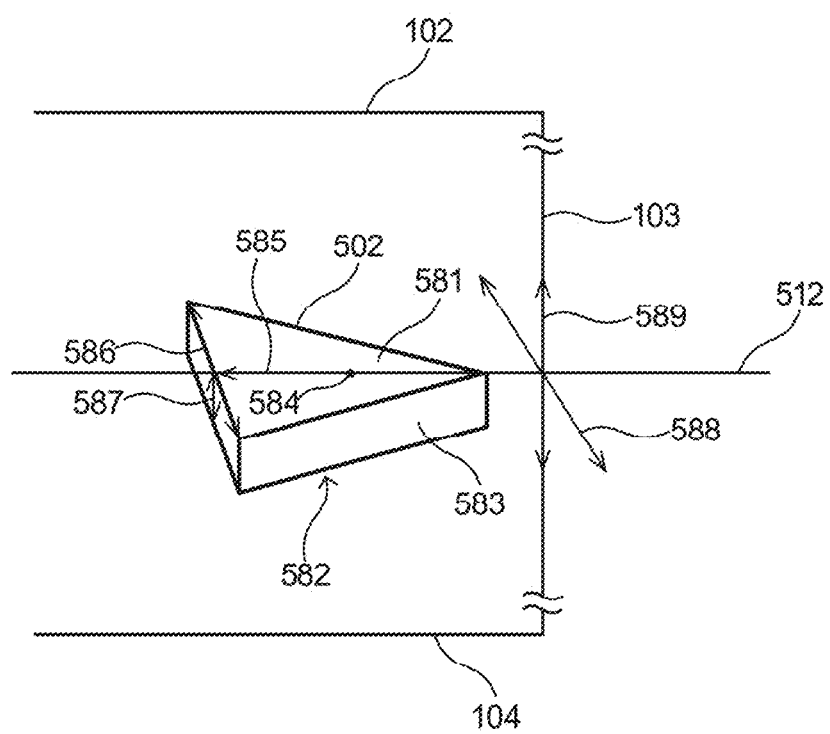
FIG. 5B includes an illustration of an abrasive particle within a fixed abrasive article in accordance with an embodiment.

Referring briefly to FIG. 5B, an illustration of a shaped abrasive particle contained in a body of a fixed abrasive in a predetermined three-axis orientation is provided. Reference to a predetermined three-axis orientation includes the control of the three axes defining the shaped abrasive particle 502 (including the longitudinal axis 585 extending through a midpoint 584 of a first major surface 581, the lateral axis 586, and the vertical axis 587) within the body 101 and, more particularly, relative to a side surface 103 of the body 101. In particular, the shaped abrasive particle 502 can be lying flat within the body relative to a major surface of the body 101. That is, the shaped abrasive particle 502 can have the first major surface 581, a second major surface 582, and a side surface 583 extending between the first and second major surfaces 581 and 582. The longitudinal axis 585, extending between a tip or corner of the shaped abrasive particle 502 and a base or edge opposite that tip/corner and also extending through the midpoint 584, can extend substantially parallel to a major surface of the body 101, such as the upper surface 102 and/or bottom surface 104. Moreover, the longitudinal axis 585 can extend substantially perpendicular to the side surface 103 of the body 101 such that, at the point where the radial axis 512 intersects the side surface 103, the angle formed by the longitudinal axis 585 and the side surface 103 is substantially orthogonal when viewed top-down in the plane of a major surface of the body 101. This may be particularly advantageous for fixed abrasive articles where the side surface 103 is configured to conduct the primary material removal operations. As such, it may be particularly suitable for the shaped abrasive particles and/or elongated abrasive particles to have a three-axis orientation, including a predetermined rotational orientation, relative to the side surface 103 of the body 101.

As further illustrated in FIG. 5B, the lateral axis 586 defining a width of the shaped abrasive particle 502 also can extend substantially parallel to a major surface of the body 101, such as the upper surface 102 and/or bottom surface 104. Moreover, in some embodiments, the lateral axis 586 can extend substantially parallel to a tangent 588 of the side surface 103 of the body 101 at the point where the radial axis 512 intersects the side surface 103.

As further illustrated in FIG. 5B, the vertical axis 587 defining a height of the shaped abrasive particle 502 can extend substantially perpendicular to a major surface of the body 101, such as the upper surface 102 and/or bottom surface 104. Moreover, in some embodiments, the vertical axis 587 can extend substantially parallel to a tangent 589 of the side surface 103 of the body 101 at the point where the radial axis 512 intersects the side surface 103.

Referring again to FIG. 5A, the first group of abrasive particles 545 can include a first portion of abrasive particles having substantially the same predetermined three-axis orientation relative to the side surface 103 of the body 101. For example, the abrasive particles 502-506, which are shaped abrasive particles whose major surfaces have a triangular two-dimensional shape, can have substantially the same three-axis orientation relative to the side surface 103. More particularly, the abrasive particles 502-506 can have substantially the same predetermined rotational orientation angle relative to the side surface 103. As illustrated in the embodiment of FIG. 5A, the abrasive particle 502 has a longitudinal axis 511 that is substantially aligned with the radial axis 512, thereby defining a predetermined rotational orientation angle of approximately 0° at the point where the longitudinal axis 511 is closest to the side surface 103. Likewise, the abrasive particle 503 includes a longitudinal axis 513 that is substantially aligned with the radial axis 514. Therefore, the abrasive particle 503 also has a predetermined rotational orientation angle of approximately 0° at the point where the longitudinal axis 513 is closest to the side surface 103. Furthermore, abrasive particle 504 has a longitudinal axis 515 that is substantially aligned with radial axis 516. Therefore, the abrasive particle 504 has a predetermined rotational orientation angle of approximately 0° at the point where the longitudinal axis 515 is closest to the side surface 103. The abrasive particle 505 has a longitudinal axis 517 that is substantially aligned with the radial axis 518, also defining a predetermined rotational orientation angle of approximately 0°. Moreover, the abrasive particle 506 has a longitudinal axis 519 substantially aligned with the radial axis 520, thereby defining a predetermined rotational orientation angle of approximately 0°. Accordingly, the abrasive particles 502-506 can have substantially the same predetermined rotational orientation relative to the side surface 103 as defined by the respective predetermined rotational orientation angles associated with each of the abrasive particles 502-506. Moreover, it will be appreciated that each of the abrasive particles 502-506 have substantially the same orientation of their lateral axes and vertical axes relative to the corresponding radial axes 512, 514, 516, 518, and 520 and the side surface 103. Moreover, while the shaped abrasive particles of FIG. 5A are illustrated as having generally triangular two-dimensional shapes, other types of shaped abrasive particles and/or elongated abrasive particles may be utilized.

As further illustrated in FIG. 5A, at least a portion of the abrasive particles within the body 101 can be arranged in a controlled distribution relative to each other. A controlled distribution can be defined by a combination of predetermined positions within the body that are purposefully selected to be occupied by the abrasive particles. A controlled distribution can include a pattern, such that the predetermined positions can define a two-dimensional array. An array can include have short range order defined by a unit of abrasive particles. An array may also be a pattern having long range order, including regular and repetitive units linked together, such that the arrangement may be symmetrical and/or predictable. An array may have an order that can be predicted by a mathematical formula. It will be appreciated that two-dimensional arrays can be formed in the shape of polygons, ellipsis, ornamental indicia, product indicia, or other designs. A controlled or predetermined distribution can also include a non-shadowing arrangement. A non-shadowing arrangement may include a controlled, non-uniform distribution, a controlled uniform distribution, and a combination thereof. In particular instances, a non-shadowing arrangement may include a radial pattern, a spiral pattern, a phyllotactic pattern, an asymmetric pattern, a self-avoiding random distribution, and a combination thereof. In other instances, a non-shadowing arrangement can include an intentional staggering of two or more particles relative to one another (i.e., an intentional staggering of two or more predetermined positions and/or predetermined rotational orientations), as discussed more fully with respect to FIG. 8.

According to one embodiment, the first group 545 of abrasive particles are arranged in a controlled distribution relative to each other within a radial plane (e.g., the radial plane 122 depicted in FIG. 1). As will be appreciated, each of the abrasive particles within the first group 545 can have substantially the same axial position within the body 101 such that each of the abrasive particles are positioned within the radial plane 122. The abrasive particles contained within the first group 545 may have different radial positions with respect to each other. For example, the abrasive particles 522-526 can have the same axial position relative to one another and a different radial position relative to the abrasive particles 502-506. It will be appreciated that reference to the radial position can be referenced to the position of the abrasive particles along a radial axis including, for example, radial axes 512-520.

Figure 5C:
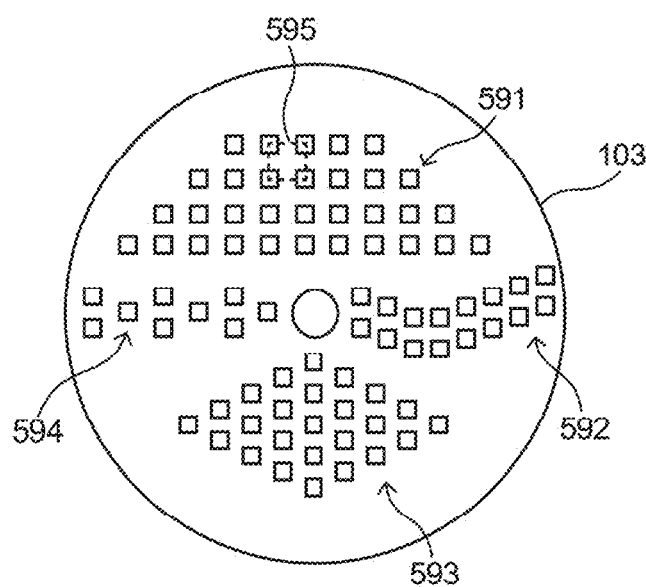
FIG. 5C includes an illustration of a plurality of abrasive particles within a fixed abrasive article according to an embodiment.

Referring to FIG. 5C, a top-down view of a radial plane of abrasive particles within a body of a fixed abrasive article is illustrated. As shown, the abrasive particles within the radial plane of the body can be arranged in various controlled distributions with respect to each other. For example, the abrasive particles of the first group 591 can be arranged in a controlled distribution that has a generally rectangular pattern, such that the smallest unit 595 of abrasive particles defines a rectangle. As will be appreciated and as illustrated, other types of controlled distributions may be utilized. In certain instances, different groups of abrasive particles within the radial plane can define different controlled distributions. For example, as illustrated, the abrasive particles of the group 592 may be arranged in a different controlled distribution relative to those abrasive particles of the first group 591. Likewise, the abrasive particles of the group 593 can be arranged in yet another controlled distribution relative to groups 591 and 592. Finally, the abrasive particles of the group 594 may have a different controlled distribution relative to the abrasive particles of the groups 593, 592, and 591. The controlled distributions provided in FIG. 5C are merely illustrative and are non-limiting. Various controlled distributions may be utilized to improve the grinding performance of the fixed abrasive article.

The predetermined position of the abrasive particles relative to each other can define the controlled distribution. For example, referring again to FIG. 5A, the abrasive particles 502-506 can be spaced apart from each other in a predetermined manner, which may facilitate improved material removal operations. For example, as illustrated, the abrasive particle 502 is spaced apart from the abrasive particle 503 by a spacing distance 551 defined as the smallest distance between the abrasive particles 502 and 503. Moreover, the abrasive particle 503 is spaced apart from the abrasive particle 504 by a spacing distance 552, the abrasive particle 504 is spaced apart from the abrasive particle 505 by a spacing distance 553, and the abrasive particle 505 is spaced apart from the abrasive particle 506 by a spacing distance 554. According to an embodiment, at least a portion of the abrasive particles within the body can have substantially the same spacing distance, including for example, the spacing distances 551-554 between the abrasive particles 502-504. The portion can include any portion of abrasive particles as described in embodiments herein.

Furthermore, a suitable spacing distance between particles may be based on the average particle size (PSa) of the portion of abrasive particles, wherein the average particle size of shaped abrasive particles is based on the length of the particles and the spacing distance can be an average spacing distance between the abrasive particles of the portion. For example, the spacing distance between a portion of the abrasive particles within the body can be not greater than 10 (PSa), such as not greater than 9 (PSa), not greater than 8 (PSa), not greater than 7 (PSa), such as not greater than 6 (PSa), not greater than 5 (PSa), not greater than 4 (PSa), such as not greater than 3 (PSa), not greater than 2 (PSa), not greater than 1 (PSa), such as not greater than 0.8 (PSa), not greater than 0.5 (PSa), not greater than 0.4 (PSa), or even not greater than 0.2 (PSa). In at least one embodiment, the spacing distance for a portion of abrasive particles can be 0, such that the abrasive particles are in contact with each other, which may be particularly desirable for certain material removal operations. Still, in another non-limiting embodiment, the spacing distance can be at least 0.1 (PSa), at least about 0.2 (PSa), at least 0.5 (PSa), at least 0.8 (PSa), at least 1 (PSa), at least 2 (PSa), or even at least 3 (PSa). It will be appreciated that the spacing distance can be within a range including any of the minimum and maximum values noted above.

In still another embodiment, the portion of abrasive particles can have a particularly low standard deviation of spacing distance, which can demonstrate the level of control in the predetermined positioning of the abrasive particles within the body. For example, the standard deviation of the spacing distance can be not greater than 2 (PSa), such as not greater than 1.8 (PSa), not greater than 1.5 (PSa), not greater than 1.2 (PSa), such as not greater than 1 (PSa), not greater than 0.8 (PSa), not greater than 0.7 (PSa), not greater than 0.6 (PSa), not greater than 0.5 (PSa), not greater than 0.4 (PSa), not greater than 0.3 (PSa), not greater than 0.2 (PSa), not greater than 0.1 (PSa), not greater than 0.08 (PSa), not greater than 0.06 (PSa), not greater than 0.04 (PSa), not greater than 0.03 (PSa), or even not greater than 0.02 (PSa). Still, in at least one non-limiting embodiment, the standard deviation of the spacing distance for a portion of the abrasive particles in the body can be at least 0.0001 (PSa), such as at least 0.001 (PSa) or even at least 0.01 (PSa). It will be appreciated that the standard deviation of spacing distance can be within a range including any of the minimum and maximum values noted above.

Reference herein to the spacing distance and standard deviation of spacing distance can include reference to the spacing between abrasive particles in the same radial plane, the spacing between abrasive particles in different radial planes, the spacing between abrasive particles in the same axial collection (i.e., within the same axial plane), the spacing between abrasive particles in different axial collections (i.e., within different axial planes), the spacing between abrasive particles in a radial set, the spacing between abrasive particles between different radial sets, the spacing between abrasive particles within a sector, and the spacing between abrasive particles in different sectors.

According to an embodiment, the abrasive particles of the first group 545 can have at least one abrasive characteristic that is substantially the same with respect to each other. Abrasive characteristics can include hardness, composition, average particle size, average grain size, fracture toughness, two-dimensional shape, tip sharpness, tip angle, aspect ratio, and a combination thereof. For example, as illustrated in FIG. 5A, the abrasive particles of the first group 545 can have substantially the same two-dimensional shape (i.e., triangular two-dimensional shape) with respect to each other. However, it will also be appreciated that at least a portion of the abrasive particles within the first group 545 may have at least one abrasive characteristic that is distinct from each other. Moreover, as also illustrated in FIG. 5A, the abrasive particles of the first group 545 may have at least one characteristic such as an orientation (e.g., a predetermined rotational orientation) and/or position that is distinct from each other. For example, in the illustrated embodiment of FIG. 5A, each of the abrasive particles 502-506 have a substantially different predetermined rotational rotation angle relative to each of the abrasive particles 522-526. As will be appreciated, this need not necessarily be the case, and at least a portion of the shaped abrasive particles of the first group, such as the abrasive articles 502-506, can have substantially the same orientation characteristics with respect to each other, including for example, substantially the same predetermined rotational orientation angle.

As further illustrated in FIG. 5A, the first group of abrasive particles 545 may include a first radial set 501 of abrasive particles spaced at a first radial distance from the center of the body 101 (e.g., from the axial axis 180). That is, the abrasive particles 502-506 may define a first radial set 501 of abrasive particles having substantially the same radial distance along their respective radial axes 512-520 within the body 101. Accordingly, each of the abrasive particles of the first radial set 501 may also be substantially the same distance from the side surface 103. As noted herein, the abrasive particles 502-506 of the first radial set 501 can have substantially the same predetermined rotational orientation relative to each other. Moreover, each of the abrasive particles 502-506 of the first radial set 501 can have substantially the same predetermined rotational orientation relative to the side surface 103 of the body 101, including a predetermined three-axis orientation and a predetermined rotational orientation relative to the side surface 103 of the body 101. In accordance with an embodiment, the abrasive particles 502-506 of the first radial set 501 may have substantially the same axial position with respect to each other within the body, such that they are within the same radial plane 122. Furthermore, it will be appreciated that each of the abrasive particles 502-506 of the first radial set 501 may have at least one abrasive characteristic that is substantially the same with respect to each other, including for example abrasive characteristic of hardness, composition, average particle size, average grain size, fracture toughness, two-dimensional shape, tip sharpness, tip angle, aspect ratio, and a combination thereof.

As further illustrated, the first group of abrasive particles 545 can include a second radial set 521 of abrasive particles 522-526 that can be spaced at a particular radial distance from the center of the body (e.g., from the axial axis 180). That is, the abrasive particles 522-526 may define a second radial set 502 of abrasive particles having substantially the same radial distance along their respective radial axes 512-520 within the body 101. Notably, the radial distance of the abrasive particles 522-526 can be measured as the distance from the center of body along their respective radial axes 512-520. Moreover, each of the abrasive particles 522-526 of the second radial set 521 may be spaced at substantially the same distance from the side surface 103 of the body 101. Moreover, the abrasive particles 522-526 of the second radial set can be spaced at a second radial distance from the center of the body that is different than the first radial distance of the abrasive particles 502-506 of the first radial set 501. For example, as illustrated in FIG. 5A, the abrasive particles 502-506 of the first radial set 501 can be spaced at a distance further from the center of the body and closer to the side surface 103 of the body 101 along their respective radial axes 512-520 as compared to the abrasive particles 522-526 of the second radial set 521, which are closer to the center of the body 101 as compared to the abrasive particles 502-506. Moreover, as provided in the illustrated embodiment, the abrasive particles 522-526 of the second radial set 521 are further away from the side surface 103 as compared to the abrasive particles 502-506 of the first radial set 501.

In accordance with an embodiment, and as illustrated in FIG. 5A, the abrasive particles 522-526 can have substantially the same predetermined rotational orientation relative to each other. For example, the abrasive particle 522 can have a longitudinal axis 531 that defines the predetermined rotational orientation angle 532 relative to the radial axis 512. Notably, the predetermined rotational orientation angle 532 is measured at the point where the longitudinal axis 531 is closest to the side surface 103. Moreover, the abrasive particle 523 can have a longitudinal axis 533 that defines a predetermined rotational orientation angle 534 relative to the radial axis 514. The abrasive particle 524 can have a longitudinal axis 535 defining a predetermined rotational orientation angle 536 relative to the radial axis 516. The abrasive particle 525 can have a longitudinal axis 537 defining a predetermined rotational orientation angle 538 relative to the radial axis 518. Furthermore, the abrasive particle 526 can have a longitudinal axis 539 defining a predetermined rotational orientation angle 540 relative to the radial axis 520. In accordance with an embodiment, each of the predetermined rotational orientation angles 532, 534, 536, 538, and 540 can be the same. Still, in an alternative embodiment, the abrasive particles of a radial set, including for example abrasive particles 522-526 of the second radial set 521, may have a different predetermined rotational orientation angle with respect to each other.

In yet another embodiment, such as illustrated in FIG. 5A, the abrasive particles 502-506 of the first radial set 501 may be positioned closer to the side surface 103 and configured to conduct an initial material removal operation. The abrasive particles 522-526 of the second radial set 521 can be spaced at a greater distance from the side surface 103 than the abrasive particles 502-506 of the first radial set 501. As such, the abrasive particles 522-526 can be positioned as backup abrasive elements configured to conduct material removal operations after some portion of the abrasive particles 502-506 of the first radial set 501 is worn.

The abrasive particles 522-526 of the second radial set 521 can have substantially the same axial position with respect to each other, such that the abrasive particles 522-526 are positioned within the same radial plane 122. Furthermore, as will be appreciated, the abrasive particles 522-526 of the second radial set 521 can have at least one abrasive characteristic that is substantially the same with respect to each other. Suitable abrasive characteristics can include but are not limited to, hardness, composition, average particle size, average grain size, fracture toughness, two-dimensional shape, tip sharpness, typical, aspect ratio, and a combination thereof. Still, in at least one non-limiting embodiment, the abrasive particles 522-526 of the second radial set 521 can have at least one abrasive characteristic that is distinct from each other. Moreover, it will be appreciated that the abrasive particles 502-506 of the first radial set 501 and the abrasive particles 522-526 and the second axial set 521 may have at least one abrasive characteristic that can be substantially the same with regard to each other, including for example two-dimensional shape. Still, in another alternative embodiment, the abrasive particles 502-506 of the first radial set 501 may have at least one abrasive characteristic that is distinct from the abrasive particles 522-526 of the second radial set 521.

As further illustrated in FIG. 5A, at least a portion of the abrasive particles of the first group 545 can have a particular cutting tip or cutting edge having a predetermined orientation relative to the side surface 103. For example, the abrasive particle 502 can have a cutting tip 547 that has a particular orientation relative to the side surface 103. Notably, the orientation of the cutting tip 547 may be defined by the predetermined rotational orientation angle of the abrasive particle 502.

In another embodiment, at least a portion of the abrasive particles in the body may have a predetermined rotational orientation relative to an intended grinding direction 546 of the abrasive article. For example, the shaped abrasive particle 522 can have a cutting tip 548 having a particular rotational orientation relative to the side surface 103, which in some embodiments includes the predetermined rotational orientation angle 532. In certain instances, the predetermined rotational orientation angle 532 can also define a placement angle relative to the intended grinding direction 546 of the abrasive article 100. In the instance of the shaped abrasive particle 502, the placement angle has a zero value because the shaped abrasive particle 502 has a predetermined rotational orientation angle that orients the cutting tip 547 substantially perpendicular to the intended grinding direction 546. In the instance of the shaped abrasive particle 522, the placement angle has a positive value because the shaped abrasive particle 522 has a predetermined rotational orientation angle 532 that inclines the cutting tip 548 in the same direction as the intended grinding direction 546. In another embodiment, a shaped abrasive particle can include a placement angle with a negative value, where a shaped abrasive particle has a predetermined rotational orientation angle that inclines a cutting tip in a direction opposite to the intended grinding direction 546. As such, it will be appreciated that the abrasive particles and the orientation of their cutting tips or cutting surfaces relative to the side surface may be controlled such that a suitable placement angle is created relative to an intended grinding direction 546 of the abrasive article 100, which may facilitate improved material removal performance.

Referring again to FIG. 1, in accordance with an embodiment, the body 101 of the fixed abrasive article 100 can include multiple axial planes, including for example, the first axial plane 131 and the second axial plane 132. Furthermore, each axial plane may have one or more groups of abrasive particles, including for example, the groups of abrasive particles 191 and 192. The groups of abrasive particles 191 and 192 can be axial collections and/or axial sets in the respective axial planes 131 and 132. Moreover, the abrasive particles of each group of abrasive particles 191 and 192 can have at least one abrasive characteristic and/or at least one orientation characteristic that is substantially the same with respect to the other abrasive particles within the group, including (a) a predetermined rotational orientation angle, or a rotational orientation in a plane defined by the length and the width of the particle; (b) a predetermined tilt angle, or a rotational orientation in the plane defined by the length and the thickness of the particle; and/or (c) a predetermined lateral axis rotational orientation angle, or a rotational orientation in the plane defined by the width and the thickness of the particle. It should also be noted that certain particles may utilize a combination of more than one type of rotational orientation. In one embodiment, the abrasive particles of the group of abrasive particles 191 can have at least one abrasive characteristic that is substantially the same and/or at least one orientation characteristic (e.g., predetermined rotational orientation, predetermined rotational orientation angle, predetermined tilt angle, and/or predetermined lateral rotational orientation angle) that is substantially the same with respect to the other abrasive particles within the group 191. Still, in another embodiment, at least one abrasive particle within the group of abrasive particles 191 can have at least one abrasive characteristic and/or at least one orientation characteristic (e.g., predetermined rotational orientation, predetermined rotational orientation angle, predetermined tilt angle, and/or predetermined lateral rotational orientation angle) that is different compared to at least one other abrasive particle within the group of abrasive particles 191. For yet another embodiment, at least one abrasive particle within the group of abrasive particles 191 can have at least one abrasive characteristic and/or at least one orientation characteristic (e.g., predetermined rotational orientation, predetermined rotational orientation angle, predetermined tilt angle, and/or predetermined lateral rotational orientation angle) that is different compared to at least one other abrasive particle within the group of abrasive particles 192 associated with the axial plane 132.

As further illustrated in FIG. 1, the body 101 of the fixed abrasive article 100 can include multiple radial planes, including for example, the first radial plane 121 and the second radial plane 122. Furthermore, each radial plane may have one or more groups of abrasive particles, such as the groups of abrasive particles 105 and 106, which can be in the form of radial groups and/or radial sets of abrasive particles. In at least one embodiment, the abrasive particles of each group of abrasive particles 105 and 106 can have at least one abrasive characteristic and/or at least one orientation characteristic (e.g., predetermined rotational orientation and/or predetermined lateral rotational orientation) that is substantially the same with respect to the other abrasive particles of the groups of abrasive particles 105 and 106. In one embodiment, the abrasive particles of the group of abrasive particles 105 can have at least one abrasive characteristic and/or at least one orientation characteristic (e.g., predetermined rotational orientation and/or predetermined lateral rotational orientation) that is substantially the same with respect to the other abrasive particles within the group 105. Still, in another embodiment, at least one abrasive particle within the group of abrasive particles 105 can have at least one abrasive characteristic and/or at least one orientation characteristic (e.g., predetermined rotational orientation and/or predetermined lateral rotational orientation) that is different compared to at least one other abrasive particle within the group of abrasive particles 105. For yet another embodiment, at least one abrasive particle within the group of abrasive particles 105 can have at least one abrasive characteristic and/or at least one orientation characteristic (e.g., predetermined rotational orientation and/or predetermined lateral rotational orientation) that is different compared to at least one other abrasive particle within the group of abrasive particles 106 associated with the radial plane 121.

In accordance with an embodiment, the body 101 can include a first group of abrasive particles 106 in the first radial plane 121 and a second group of abrasive particles 105 within a second radial plane 122. As illustrated, the first group of abrasive particles 106 in the first radial plane 121 can be spaced apart axially from the second group of abrasive particles 105 in the second radial plane 122. The second group of abrasive particles 105 within the radial plane 122 can have any of the attributes of the abrasive particles described herein, including for example, the first group of abrasive particles 545. For example, the second group of abrasive particles 105 can include shaped abrasive particles or elongated abrasive particles. In another embodiment, the second group of abrasive particles 105 can be arranged in a controlled distribution relative to each other. As will be appreciated, the second group of abrasive particles 105 in the second radial plane 122 can have a predetermined position within the radial plane 122 and have substantially the same axial position within the radial plane 122 with respect to each other. Still, in other embodiments, the abrasive particles in the second group 105 can have a different radial position with respect to each other within the radial plane 122. In at least one embodiment, the second group of abrasive particles 105 within the second radial plane 122 can have a predetermined rotational orientation relative to the side surface 103 of the body 101. Moreover, the first group of abrasive particles 106 can have a first predetermined rotational orientation and the second group of abrasive particles 105 can have a second predetermined rotational orientation that may be different than the predetermined rotational orientation of the first group of abrasive particles 106.

The abrasive particles of the second group 105 can have at least one abrasive characteristic that is the same with respect to each other, including for example abrasive characteristics such as hardness, composition, average particle size, average grain size, fracture toughness, two-dimensional shape, tip sharpness, tip angle, aspect ratio, and a combination thereof. Moreover, the abrasive particles of the second group 105 can have at least one abrasive characteristic that is substantially the same as the abrasive particles of the first group 106. Still, in another embodiment, the abrasive particles of the second group 105 can have at least one abrasive characteristic that is distinct from the abrasive characteristic of the abrasive particles of the first group 106.

The body 101 of the fixed abrasive 100 can include a plurality of groups of abrasive particles, including the first group of abrasive particles 106 in the radial plane 121 and second group of abrasive particles 105 in the radial plane 122. Moreover, each of the groups of abrasive particles can include a plurality of radial sets of abrasive particles wherein each of the radial sets is spaced at different radial distances from the center of the body and the side surface 103 relative to each other. For example, the first group of abrasive particles 106 can include a plurality of radial sets and the second group of abrasive particles 105 can include a plurality of radial sets. In certain embodiments, the radial sets may establish concentric rings of abrasive particles around the central opening 185. However, it will be appreciated that a radial set may extend for a portion of an entire circumference of the body 101. In at least one instance, a radial set may extend for an entire circumference of the body at a given radial distance from the center of the body 101.

Figure 6:
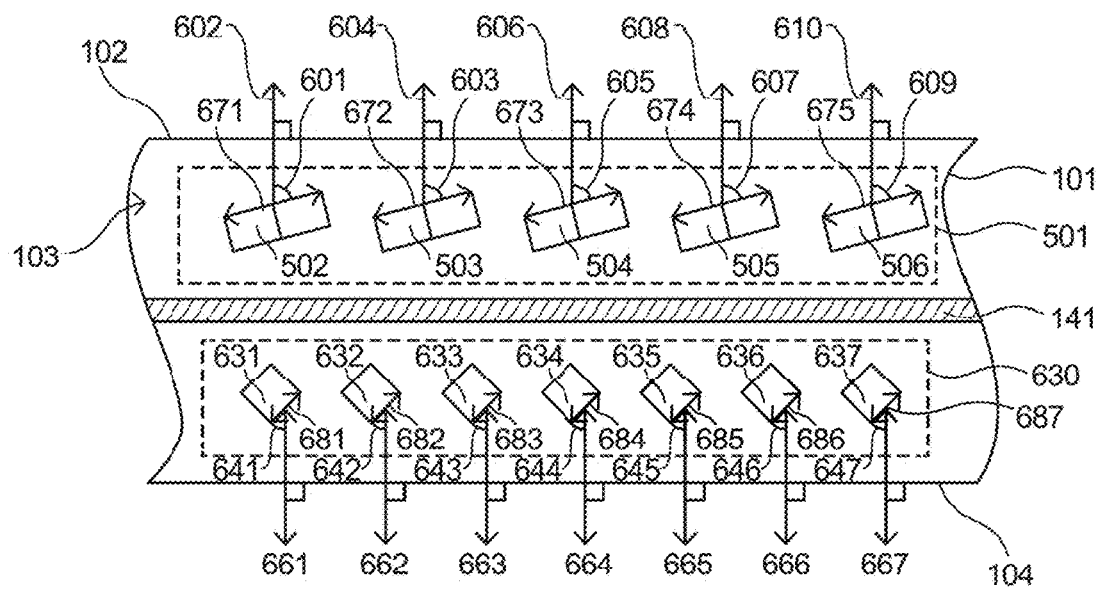
FIG. 6 includes an illustration of a portion of a fixed abrasive article including abrasive particles in accordance with an embodiment.

FIG. 6 includes an illustration of a portion of a fixed abrasive article including abrasive particles as viewed from a side surface in accordance with an embodiment. As illustrated, and as referenced in FIG. 5A, the body 101 can include abrasive particles 502, 503, 504, 505, and 506 (502-506) as part of the first group 501. The body can include the reinforcing member 141. Furthermore, the body can include a second group of abrasive particles 630 including abrasive particles 631, 632, 633, 634, 635, 636, and 637 (631-637). In accordance with an embodiment, at least a portion of the abrasive particles in the body 101, including shaped abrasive particles and/or elongated abrasive particles, can have a predetermined rotational orientation including a predetermined lateral axis rotational orientation angle. For example, the abrasive particle 502 can have a lateral axis 671 that defines a width of the abrasive particle 502. The lateral axis 671, along with a normal axis 602 that extends from the particle 502 (as viewed from the side surface 103) and is normal to one of the major surfaces of the body 101 (e.g., the upper surface 102) further define a predetermined lateral axis rotation orientation angle 601. A portion of abrasive particles in the body 101 may have a predetermined lateral axis rotational orientation angle to facilitate improved material removal operations. In accordance with an embodiment, the group of abrasive particles 501 including abrasive particles 502-506 can be placed within the body 101 such that each of the abrasive particles 502-506 can have substantially the same predetermined lateral axis rotational orientation angle. For example, the abrasive particle 503 can have a lateral axis 672 that, along with a normal axis 604, define a predetermined lateral axis rotational orientation angle 603. Additionally, the abrasive particle 504 can have a lateral axis 673 that is used to define a predetermined lateral axis rotational orientation angle 605 relative to a normal axis 606. The abrasive particle 505 can have a lateral axis 674 defining a predetermined lateral axis rotational orientation angle 607 relative to a normal axis 608. Moreover, the abrasive particle 506 can have a lateral axis 675 defining a predetermined lateral axis rotational orientation angle 609 relative to a normal axis 610. In accordance with an embodiment, each of the predetermined lateral axis rotational orientation angles 601, 603, 605, 607, and 609 of the abrasive particles 502-506 can have substantially the same value. Still, in at least one embodiment, one or more of the abrasive particles 502-506 of the first group 501 can have a predetermined lateral axis rotational orientation angle 601, 603, 605, 607, 609 that can be distinct from each other.

In accordance with an embodiment, the fixed abrasive article can be formed such that at least a portion of the abrasive particles in the body, including shaped abrasive particles and/or elongated abrasive particles, can be placed within the body to have a predetermined lateral axis rotational orientation angle of not greater than 90°, such as not greater than 80°, not greater than 70°, not greater than 60°, not greater than 50°, not greater than 40°, not greater than 30°, not greater than 20°, not greater than 10°, or even not greater than 5°. Still, in another embodiment, the average predetermined lateral axis rotational orientation angle for the portion of abrasive particles can be at least 0.1°, such as at least 1°, at least 3°, at least 5°, at least 10°, at least 20°, at least 30°, at least 40°, or even at least 50°. It will be appreciated that the portion of the abrasive particles can have a predetermined lateral axis rotational orientation angle within a range including any of the minimum and maximum values noted above. Moreover, reference to the predetermined lateral axis rotational orientation angle for a portion of abrasive particles can include reference to an average value of the predetermined lateral axis rotational orientation angle.

In accordance with another embodiment, at least a portion of the abrasive particles within the body 101, including shaped abrasive particles and/or elongated abrasive particles, can have a particular standard deviation of the predetermined lateral axis rotational orientation angle that may facilitate improved performance. For example, the portion of abrasive particles can have a standard deviation of the predetermined lateral axis rotational orientation angle of not greater than 20 degrees, such as not greater than 18 degrees, not greater than 16 degrees, not greater than 14 degrees, not greater than 12 degrees, not greater than 10 degrees, not greater than 9 degrees, not greater than 8 degrees, not greater than 7 degrees, or even not greater than 6 degrees. Still, in at least one non-limiting embodiment, a portion of the abrasive particles can have a standard deviation of the predetermined lateral axis rotational orientation angle of at least 0.1 degrees, such as at least 0.5 degrees, or even at least 1 degree. It will be appreciated that the standard deviation of the predetermined lateral axis rotational orientation angle can be with a range including any of the minimum and maximum values noted above.

As further illustrated in FIG. 6, each of the abrasive particles 631-637 of the second group 630 can have a particular predetermined lateral axis rotational orientation angle with respect to the bottom surface 104 of the body. For example, the abrasive particle 631 can have a lateral axis 681 that defines a width of the abrasive particle 631. The lateral axis 681, along with a normal axis 661 that extends from the particle 631 (as viewed from the side surface 103) and is normal to one of the major surfaces (e.g., the bottom surface 104) of the body 101, define a predetermined lateral axis rotational orientation angle 641. The abrasive particle 632 can have a lateral axis 682 defining a predetermined lateral axis rotational orientation angle 642 relative to the normal axis 662. Additionally, the abrasive particle 633 can have a lateral axis 683 defining a predetermined lateral axis rotation orientation angle 643 relative to the normal axis 663. The abrasive particle 634 can have a lateral axis 684 defining a predetermined lateral axis rotational orientation angle 644 relative to the normal axis 664. The abrasive particle 635 can have a lateral axis 685 defining a predetermined lateral axis rotational orientation angle 645 relative to the normal axis 665. The abrasive particle 636 can have a lateral axis 686 defining a predetermined lateral axis rotational orientation angle 646 relative to the normal axis 666. Finally, the abrasive particle 637 can have a lateral axis 687 defining a predetermined lateral axis rotational orientation angle 647 relative to the normal axis 667. It will be appreciated that each of the abrasive particles 631-637 can have the same attributes as the abrasive particles 502-506 of the first group 501.

According to another aspect, the body 101 can include groups of abrasive particles, including shaped abrasive particles and/or elongated abrasive particles, contained within axial planes (i.e., axial collections of abrasive particles), including for example axial planes 131 and 132. Moreover, there may be groups of abrasive particles contained within sectors, including for example sector 184 extending between axial planes 131 and 132. In one embodiment, the body 101 can include a plurality of axial collections of abrasive particles, wherein each axial collection includes a plurality of abrasive particles contained within an axial plane within the body. For example, the axial plane 131 can include the axial collection of abrasive particles 191. Furthermore, the axial plane 132 can include the axial collection of abrasive particles 192.

Figure 7:
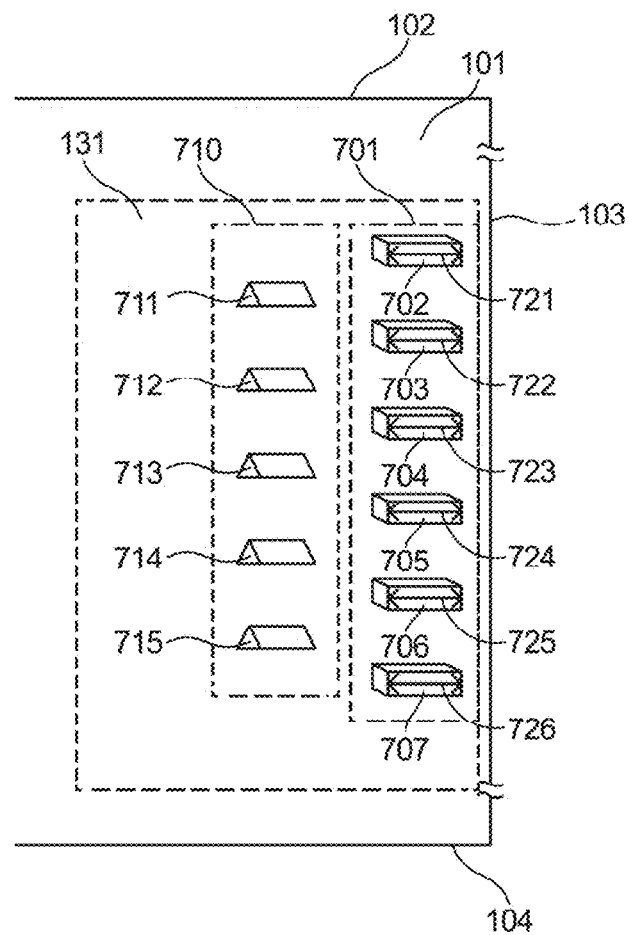
FIG. 7 includes an illustration of a portion of a fixed abrasive article including abrasive particles in accordance with an embodiment.

FIG. 7 includes a cross-sectional view of a portion of a body of a fixed abrasive article in accordance with an embodiment. A first axial collection of abrasive particles 701 can include abrasive particles 702, 703, 704, 705, 706, and 707 (702-707) within a first axial plane 131 of the body 101. The abrasive particles 702-707 can include shaped abrasive particles and/or elongated shaped abrasive particles. In accordance with an embodiment, each of the abrasive particles 702-707 of the first axial collection 701 are in a predetermined position and are substantially lying flat with respect to the major surfaces 102 and 104, such that the longitudinal axes 721, 722, 723, 724, 725, and 726 of each of the abrasive particle 702-707 are extending substantially perpendicular to the side surface 103 of the body 101 and substantially parallel to the major surfaces 102 and 104 of the body 101. It will be appreciated that the axial collection of abrasive particles 701 can include any of the features described in accordance with other groups of abrasive particles of the environment here including, for example, groups of abrasive particles in a radial set and or a first group abrasive particles in a radial plane.

In accordance with an embodiment, each of the abrasive particles 702-707 of the first axial collection 701 can have a predetermined rotational orientation relative to the side surface 103 of the body 101. The predetermined rotational orientation can be defined by a predetermined rotational orientation angle as defined in other embodiments herein. The abrasive particles 702-707 can have the same positive, zero, or negative values of predetermined rotational orientation angle as described in other embodiments herein. Moreover, it will be appreciated that each of the abrasive particles 702-707 of the first axial collection 701 can have substantially the same predetermined rotational orientation relative to each other. Still, in other instances, the predetermined rotational orientation of at least two of the abrasive particles 702-707 of the first axial collection may be different with respect to each other.

According to one embodiment, the abrasive particles 702-707 of the first axial collection 701 can be arranged in a controlled distribution relative to each other. That is, the abrasive particles 702-707 can be spaced at a particular distance relative to each other that can define a particular distribution, such as a pattern.

In accordance with another embodiment, the abrasive particles 702-707 of the first axial collection 701 can have at least one abrasive characteristic that is substantially the same including, but not limited to, hardness, composition, average particle size, average grain size, fracture toughness, two-dimensional shape, tip sharpness, tip angle, aspect ratio, and a combination thereof. Still, it will be appreciated that, in certain instances, at least two of the abrasive particles 702-707 of the first axial collection 701 may have at least one abrasive characteristic that is different as compared to each other.

As further illustrated in FIG. 7, the group of abrasive particles within the axial plane 131 can include a second axial collection 710 of abrasive particles 711, 712, 713, 714, 715, (711-715). The abrasive particles 711-715 can include shaped abrasive particles and/or elongated shaped abrasive particles. In accordance with an embodiment, each of the abrasive particles 711-715 of the second axial collection 710 can have a predetermined position and can be substantially lying flat with respect to the major surfaces 102 and 104 like the abrasive particles 702-707.

The abrasive particles 711-715 can have any of the attributes of the abrasive particles 702-707 of the first axial collection 701. For example, each of the abrasive particles 711-715 of the second axial collection 710 can have substantially the same predetermined rotational orientation with respect to each other and with respect to the side surface 103 of the body 101. In addition, the abrasive particles 711-715 of the second axial collection 710 can be arranged in a controlled distribution relative to each other or relative to the abrasive particles 702-707 of the first axial collection 701. For example, the controlled distribution can include an ordered distribution of the abrasive particles 711-715 of the second axial collection 710 relative to each other. In one embodiment, the abrasive particles 711-715 of the second axial collection 710 can have a different axial position, radial position, and/or predetermined rotational orientation compared to the abrasive particles 702-707 of the first axial collection 701. In another embodiment, the group of abrasive particles within the axial plane 131 can be in a controlled, non-shadowing arrangement. For example, two or more particles within the axial plane 131 (e.g., particles 702, 711, 703, and 712) can be intentionally staggered relative to one another, such that each of the particles occupies a position in a different radial plane. It has been noted that it may be particularly advantageous to stagger the particles relative to each other, such that particles in the same axial plane (e.g. the group of abrasive particles within the axial plane 131) can occupy different axial and radial positions relative to each other. Moreover, it is contemplated that abrasive particles within the same axial plane may be spaced at different distances relative to the side surface 103, such that during use and wear of the abrasive article, new and fresh cutting tips are continuously exposed to facilitate suitable grinding operations. Moreover, it will be appreciated that position and rotational orientation of abrasive particles within different groups (e.g., different radial groups) may be controlled relative to each other.

It will be appreciated that the abrasive particles 711-715 of the axial collection 710 can have at least one abrasive characteristic that is substantially the same relative to each other. Suitable examples of abrasive characteristics include hardness, composition, average particle size, average grain size, fracture toughness, two-dimensional shape, tip sharpness, tip angle, aspect ratio, and a combination thereof. Moreover, it will be appreciated that various different abrasive particles of different axial collections may have substantially the same abrasive characteristic relative to each other. However, in an alternative embodiment, different abrasive particles of different axial collections can have at least one abrasive characteristic that is different with respect to each other. For example, the abrasive particles 702-707 of the axial collection 701 can have at least one abrasive characteristic that is different than the abrasive particles 711-715 of the axial collection 710.

It will be appreciated that different axial planes can include different axial collections of abrasive particles. For example, the axial plane 131 can include a first axial collection including for example abrasive particles 702-707 of the first axial collection 701 and the axial plane 132 can include a second collection, including for example, the second axial collection 710 of abrasive particles 711-715. The abrasive particles of an axial collection can have substantially the same angular position within the body with respect to each other. Moreover, in certain instances, the abrasive particles of an axial collection can have substantially the same radial position within the body with respect to each other. For example, the abrasive particles 711-715 of the second axial collection 710 can have substantially the same radial position with respect to each other. As further illustrated, the abrasive particles 711-715 of the second axial collection 710 can have a different axial position relative to each other, such that the abrasive particle 711 may be closer to the upper surface 102 relative to the abrasive particle 715. Still, in certain instances, the abrasive particles of any of the axial collections including, for example, abrasive particles 711-715 may be formed to have a different radial position with respect to each other. For example, in certain instances the abrasive particle 702-707 and abrasive particle 711-715 may be part of the same axial collection. In certain in such instances, the abrasive particle 702 can have a different radial position relative to the abrasive particle 711. That is, the abrasive particle 702 can be positioned at a different radial distance from the center of the body 101 and closer to the side surface 103 relative to the position of the abrasive particle 711.

Figure 8:
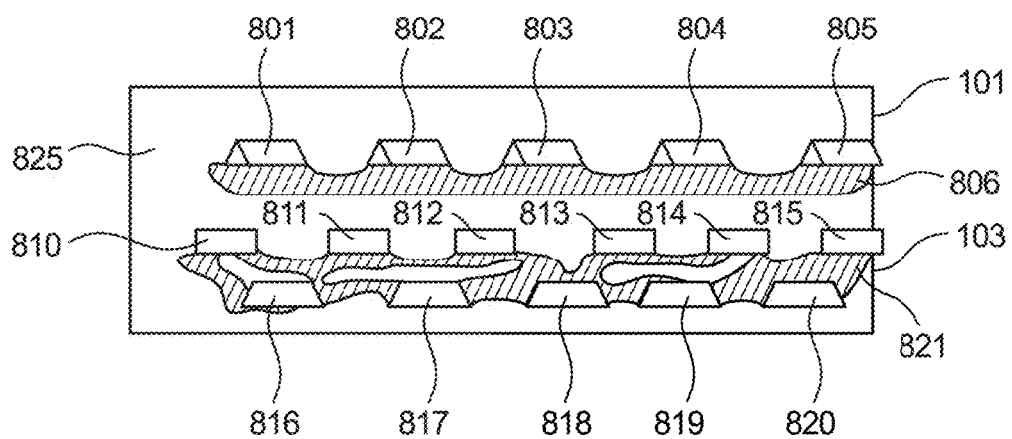
FIG. 8 includes an illustration of a portion of a fixed abrasive article including abrasive particles in accordance with an embodiment.

FIG. 8 includes an illustration of a portion of a fixed abrasive article, as viewed in a cross-sectional plane that is parallel to an axial plane of the article, in accordance with an embodiment. The body 101 (FIG. 1) can include abrasive particles 801, 802, 803, 804, and 805 (801-805), which may be coupled to each other by an orientation structure 806. As illustrated, the abrasive particle 805 can intersect the side surface 103 of the body 101 and may be at least partially protruding from the volume of the body 101 and extending radially beyond the side surface 103. In accordance with an embodiment, the orientation structure 806 can define a structure coupling at least a portion of the abrasive particles to each other within the body 101. In certain instances, the orientation structure 806 can be coupled to a majority of the abrasive particles, which may include shaped abrasive particles and/or elongated abrasive particles.

In at least one embodiment, the orientation structure 806 can be a separate phase from the bond material 825. In accordance with an embodiment, at least a portion of the abrasive particles, including for example, abrasive particles 801-805 may be coupled to the orientation structure 806 that extends throughout a portion of the bond material 825 within the body 101. In certain instances, the orientation structure 806 can have a different composition compared to the bond material 825. Notably, the orientation structure 806 can be a material that defines a separate phase from the bond material 825. In accordance with an embodiment, the orientation structure 806 can include a material such as a metal, ceramic, glass, an organic material, a polymer, and a combination thereof.

In certain instances, the orientation structure 806 may extend throughout the entire volume of the body 101. In other instances, the orientation structure 806 may extend for at least a majority of the total volume of the body 801. In still another embodiment, the orientation structure 806 may extend throughout at least a portion of the body 801, which may be greater or less than a majority of the entire volume of the body 101. In particular instances, the orientation structure 806 can be coupled to the abrasive particles and configured to control three-axis position, including for example, the predetermined position and/or predetermined rotational orientation of the abrasive particles within the body 101. For example, the orientation structure 806 can be coupled to the abrasive particles 801-805 and configured to control the predetermined position and predetermined rotational orientation, including the predetermined rotational orientation angle, of the abrasive particles 801-805 relative to the side surface 103.

In accordance with an embodiment, the orientation structure 806 may have a particular hardness relative to the hardness of the bond material 825, which may facilitate certain material removal operations. For example, the orientation structure 806 can have a hardness that is less than a hardness of the bond material 825. Still, in accordance with another embodiment, the orientation structure 806 can have a hardness that is greater than a hardness of the bond material 825. In yet another embodiment, the orientation structure 806 can have a hardness that is substantially the same as a hardness of the bond material 825. As used herein, substantially the same is reference to two values that are within 5% of each other based on the larger value.

In another embodiment, the orientation structure 806 may have a particular hardness with respect to the abrasive particles, including abrasive particles 801-805. For example, in at least one embodiment, the orientation structure 806 can have a hardness is less than a hardness of the abrasive particles 801-805. The relative hardness of the orientation structure 806 to the abrasive particles 801-805 may be suited to facilitate improved grinding performance Still, in certain instances, the orientation structure 806 can have a hardness that is substantially the same as the hardness of the abrasive particles.

The orientation structure 806 can be coupled to the abrasive particles and configured to control the predetermined position of the abrasive particles within the volume of the body 101 including a radial position, an axial position, and an angular position of the abrasive particles in the body 101. In another embodiment, the orientation structure 806 can be coupled to each of the abrasive particles including shaped abrasive particles and/or elongated abrasive particles throughout the body 101.

In accordance with another embodiment, the orientation structure 821 can be coupled to various groups of abrasive particles including a first group of abrasive particles 810, 811, 812, 813, 814, and 815 (810-815) and a second group of abrasive particles 816, 817, 818, 819, and 820 (816-820). As illustrated, the first group of abrasive particles 810-815 can include abrasive particles positioned in a first radial plane and the second group of abrasive particle 816-820 can include abrasive particles positioned in a second radial plane. As illustrated herein, the orientation structure 821 can extend between groups of abrasive particles including abrasive particles 810-815 and 816-820 and bind them to each other. In accordance with an embodiment, the orientation structure 821 can have various shapes and constructions, including for example, a web, woven material, a nonwoven material, paper, fabric, a spun woven material, a film, a laminate, a composite, and a preform having regions sized and shaped to contain one or more abrasive particles, including a shaped abrasive particle and/or elongated abrasive particle.

In another embodiment, the body 101 may include a first orientation structure, such as orientation structure 806 coupled to a first group of abrasive particles 801-805, and a second orientation structure, such as orientation structure 821, different than the first orientation structure 806 and coupled to the second group of abrasive particles 810-820. In accordance with an embodiment, the first orientation structure 806 can be coupled to the first group of abrasive particles 801-805 positioned in a first radial plane within the body 101 and the second orientation structure 821 can be coupled to a second group of abrasive particles 810-820 positioned in a second radial plane within the body 101. More particularly, it will be appreciated that the first orientation structure may be coupled to a first radial set of abrasive particles within a radial plane and the second orientation structure can be coupled to a second radial set of abrasive particles within a second radial plane of the body. It will be appreciated that the first and second radial planes can be distinct from each other as described herein.

In an alternative embodiment, various orientation structures may be used and coupled to abrasive particles of different portions of abrasive particles within the body including, for example, different axial collections of abrasive particles and/or different axial sets of abrasive particles. For example, in an embodiment, a first orientation structure may be coupled to a group of abrasive particles in a first axial plane associated with a first axial collection and a second orientation structure can be coupled to a second axial collection of abrasive particles within a second axial plane. Still, a single axial plane may utilize a plurality of orientation structures to couple one or more axial collections of abrasive particles therein.

In a further embodiment, the abrasive particles within the axial plane depicted in FIG. 8, namely particles 801-805, 811-815, and 816-820, can be arranged in a controlled distribution relative to each other. For example, the controlled distribution can include (a) an ordered distribution of the abrasive particles 801-805 relative to each other; (b) an ordered distribution of the abrasive particles 811-815 relative to each other; and/or (c) an ordered distribution of the abrasive particles 816-820 relative to each other. In another embodiment, the abrasive particles 801-805, 811-815, and 816-820 within the axial plane can be in a controlled, non-shadowing arrangement. For example, each of the depicted particles in FIG. 8 can be intentionally staggered relative to one another, such that each of the particles within the axial plane occupies a different radial position (e.g., a different distance from the center of the body 101). That is, when the particles are viewed top down in the body 101 (e.g., viewed from a plane parallel to the major surfaces 102 or 104), the particles in one radial plane of the body 101 (e.g., the particles 801-805) do not directly overlie the particles in another radial plane of the body 101 (e.g., either the particles 811-815 or the particles 816-820). Furthermore, the particles in one radial plane of the body 101 also may have different rotational orientations (e.g., different predetermined rotational orientation angles, different predetermined tilt angles, different predetermined lateral axis rotational orientation angles, and/or different placement angles) relative to one another or relative to the particles in another radial plane of the body 101.

Figure 9:
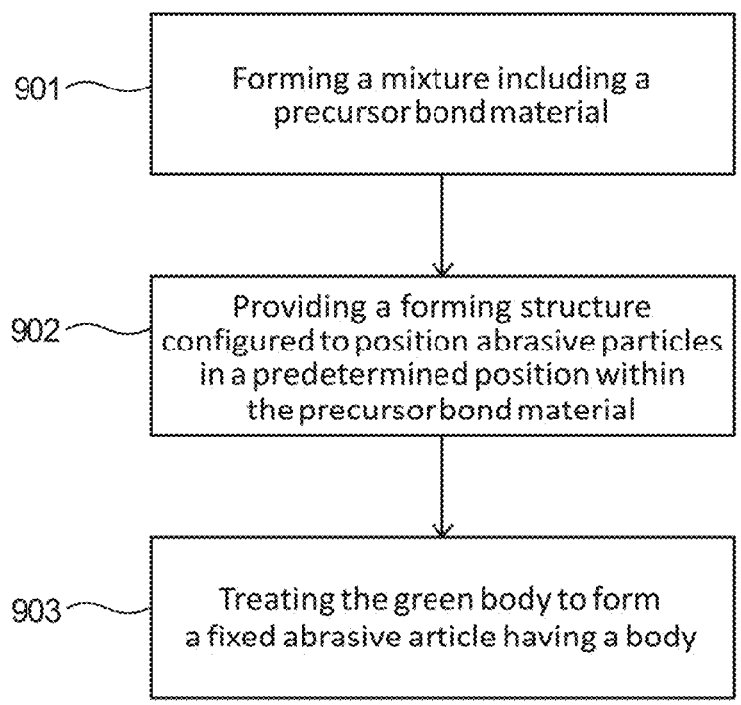
FIG. 9 includes a flowchart illustrating a method of forming a fixed abrasive article in accordance with an embodiment.

FIG. 9 includes a flowchart providing a method of forming a fixed abrasive article according to an embodiment. As illustrated, the process may be initiated at step 901 by forming a mixture including a precursor bond material. The precursor bond material can include material such as a ceramic, glass, frit, an organic material, a polymer, a resin, a metal, and a combination thereof. In certain instances, the precursor bond material may include a powder material. Still in another instance, the precursor bond material may include a liquid material. It will be appreciated that the precursor bond material may include a combination of phases, including both solid and liquid materials, which can be processed later to form the finally-formed bond material of the fixed abrasive article.

Figure 10A:
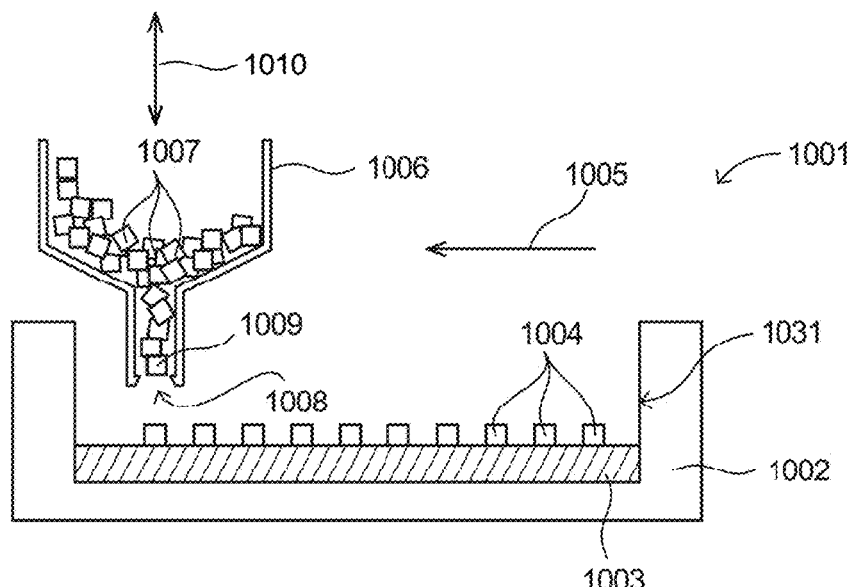
FIGS. 10A-10C include illustrations of a system for forming a fixed abrasive article in accordance with an embodiment.

As further illustrated in FIG. 9, the process can continue at step 902 by providing a forming structure configured to position abrasive particles in a predetermined position within the precursor bond material. More particularly, FIGS. 10A-10C include illustrations of a system for forming a fixed abrasive article according to an embodiment. FIG. 10A includes a system 1001 including a production tool 1002 in which the green body of the fixed abrasive article can be formed and processed to form the finally-formed fixed abrasive article. In accordance with one embodiment, the system 1001 includes a forming structure 1006 having at least one opening 1008, in which the abrasive particles, such as shaped abrasive particles and/or elongated abrasive particles, are configured to pass through for deposition onto the precursor bond material 1003 in a predetermined position and/or predetermined rotational orientation. In at least one embodiment as illustrated in FIG. 10A, the abrasive particles 1007 can be deposited in a predetermined position on the precursor bond material 1003, such as the abrasive particles 1004. As further illustrated, the forming structure 1006 can include a container (e.g., a hopper) configured to contain a plurality of abrasive particles 1007 and deposit them through a channel region 1009 ending in the opening 1008. The abrasive particles may be fed though the forming structure by gravity, vibration, or by the application of another force. It will be appreciated that control of the deposition process of the abrasive particles 1004 on the precursor bond material 1003 can facilitate formation of a fixed abrasive article where the abrasive particles have a predetermined position and/or predetermined rotational orientation.

Furthermore, the forming structure 1006 can be moved in the directions 1005 and 1010 to facilitate controlled placement and orientation of the abrasive particles 1004 on the precursor bond material 1003. In accordance with another embodiment, the abrasive particles 1007 are configured to pass through the at least one opening 1008 for deposition on or within the precursor bond material 1003 with a predetermined rotational orientation relative to a side surface of the body of the fixed abrasive article, which can be defined by a side surface 1031 of the production tool 1002. The forming structure 1006 can be configured to move and control the predetermined position of a single abrasive particle by controlling the position of the forming structure 1006 relative to the precursor bond material 1003. That is, the forming structure 1006 can move in directions 1005 and 1010 and place individual abrasive particles 1004 on the precursor bond material 1003 thus controlling the predetermined position and/or predetermined rotational orientation of the abrasive particles 1004 on the precursor bond material 1003, and thus control the predetermined position and/or predetermined rotational orientation of the abrasive particles 1004 in the finally-formed abrasive article.

Figure 10B:
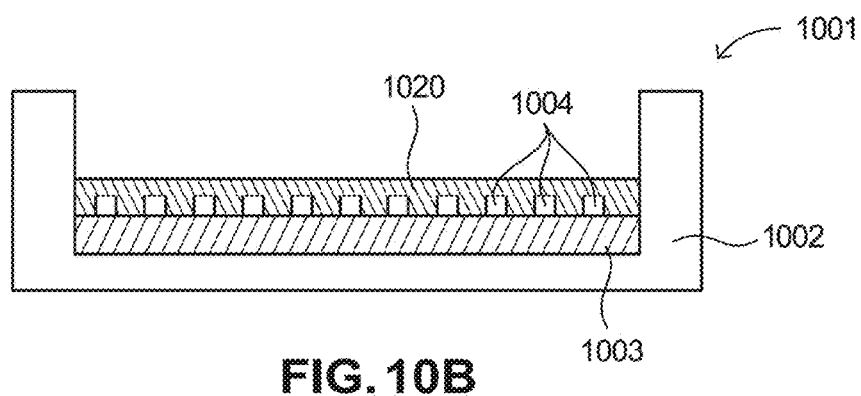
Figure 10C:
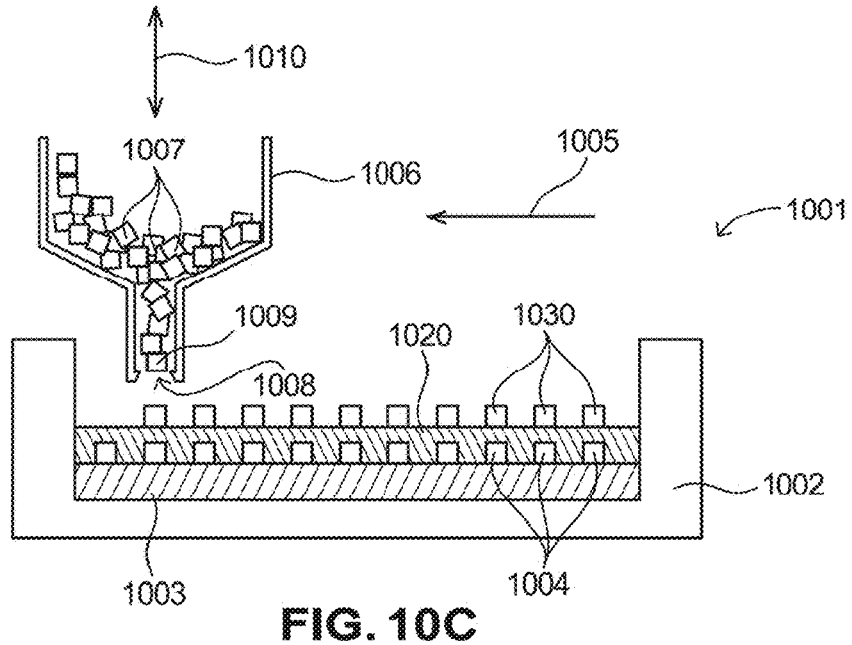

As further illustrated, FIG. 10B includes a second step in the forming process, which can include the deposition of a second layer of precursor bond material 1020 over the abrasive particles 1004. After deposition of the second layer of precursor bond material 1020, the process may continue by further deposition of abrasive particles 1007 from the forming structure 1006 on the second layer of precursor bond material 1020, as illustrated in FIG. 10C. In at least one embodiment, the second layer of abrasive particles 1030 may be deposited in the same manner as the abrasive particles 1004, such that they are placed on the second layer of precursor bond material 1020 with a predetermined position and/or predetermined rotational orientation, which facilitates the formation of a fixed abrasive article wherein the second layer of abrasive particles 1030 have a predetermined position and/or predetermined rotational orientation. The abrasive particles 1004 and 1030 can include shaped abrasive particles and/or elongated abrasive particles.

In particular instances, the process of forming the fixed abrasive article can include placing a first group of abrasive particles in a first radial plane within the precursor bond material, such as illustrated in FIG. 10A, wherein the abrasive particles 1004 are placed on or overlying a first layer of precursor bond material 1003. The process can further include depositing a precursor bond material over the first group of abrasive particles 1004 in the first radial plane, such as illustrated in FIG. 10B. As will be appreciated and as further illustrated in FIG. 10C, the process can further include depositing a second group of abrasive particles 1030 that may be associated with a second radial plane overlying the first group of abrasive particles 1004 the first radial plane. While reference has been made herein to the deposition of abrasive particles in layers, such as radial planes, it will be appreciated that the abrasive particles may be deposited in groups, which can be associated with a group in a radial plane, a radial set, an axial collection, a portion of an axial collection, a sector, and a combination thereof.

It will be appreciated that one or more reinforcing members may also be provided at any point within the forming process, such as before or after the deposition of any of the precursor bond material layers and before or after the deposition of any of the abrasive particles. Moreover, the forming process may include one or more processing steps between the deposition of any one of the components (e.g., abrasive particles, layer of precursor bond material, reinforcing member, additives, etc.) used to form the fixed abrasive article. Such processes can include treatment or partial treatment of the bond material. For example, in at least one embodiment, the precursor bond material 1003 can be cured or partially cured before the deposition of further components used to form the fixed abrasive article. Moreover, it will be appreciated that while certain abrasive particles may be deposited using the forming structure, further processing may be utilized for deposition of one or more other components, including for example, other particulate matter (e.g., diluent grains, fillers, pore formers, etc.). Deposition of the one or more other components can be conducted using the forming structure 1006 or a separate forming structure to control the predetermined position and/or predetermined rotational orientation of the one or more other components (e.g., diluent grains, fillers, pore formers, etc.). Still, in certain other instances, the process of deposition of the one or more other components can include deposition of the materials in a generally random manner.

It will be further appreciated that controlling one or more processing variables can facilitate the formation of a fixed abrasive article where the abrasive particles have a predetermined position and/or predetermined rotational orientation. For example, certain processing variables related to the bond and the abrasive particles being used, including the composition of the precursor bond material and the average size of the abrasive particles, can impact the final predetermined position and/or predetermined rotational orientation of the abrasive particles within the fixed article. Certain processing conditions related to curing of the green body can also contribute to the final positioning of the abrasive particles. For example, without wishing to be bound by a particular theory, it is believed that by controlling certain curing conditions (e.g., curing pressures, temperatures, and other conditions that prevent the precursor bond material from curing before the placement of the particles within the precursor bond material is completed), the placement of the abrasive particles in their predetermined positions and/or predetermined rotational orientations also can be better controlled.

Figure 11:
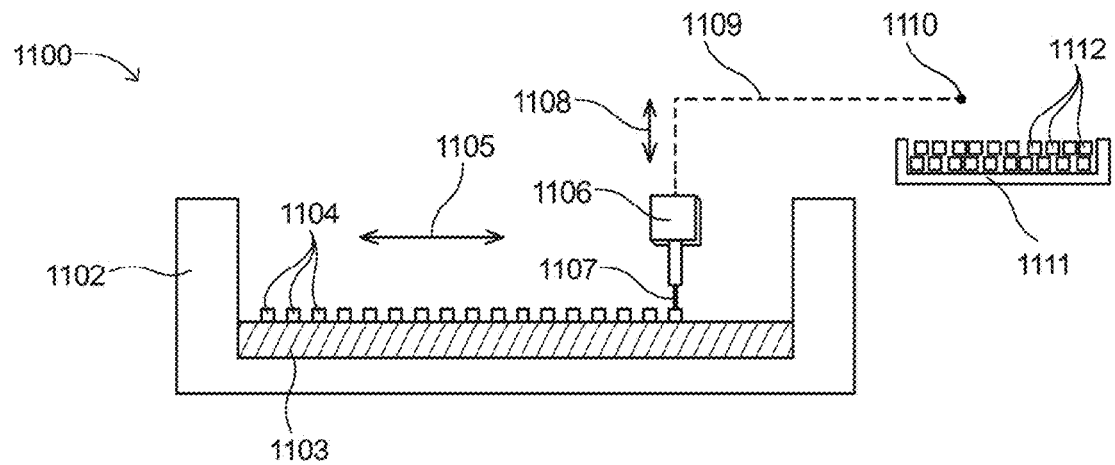
FIG. 11 includes an illustration of a system for forming a fixed abrasive article in accordance with an embodiment.

FIG. 11 includes a system for forming a fixed abrasive article according to an embodiment. As illustrated, the system 1100 can include a production tool 1102 having a first layer of precursor bond material 1103 formed therein. Additionally, a group of abrasive particles 1104 have been deposited on the first layer of precursor bond material 1103. Notably, the abrasive particles 1104 which are deposited can be selected from a group of abrasive particles 1112 contained in a hopper 1111. During processing, a forming structure 1106 can select a single abrasive particle from the group 1112 at position 1110 and move from the position 1110 to a position near the precursor bond material 1103 for deposition of an abrasive particle on or within the precursor bond material 1103 in a predetermined position and/or a predetermined rotational orientation. In accordance with an embodiment, the forming structure 1106 may be an optical pick-and-place machine capable of rapidly selecting and controlling the predetermined position and/or predetermined rotational orientation of a single abrasive particle at a time. For example, as illustrated, the forming structure 1106 can be moved from position 1110 along the path 1109 with a single abrasive particle of the group of abrasive particles 1112, and may further have complete three-space movement capabilities including, but not limited to, movement in a vertical direction 1108 and horizontal direction 1105. The forming structure 1106 can have at least one control head 1107 configured to hold and deposit a single abrasive particle. It will be appreciated that the process may employ a forming structure having a plurality of control heads, each of which are configured to facilitate controlled deposition of an individual grain on or within the precursor bond material 1103 with a predetermined position and/or a predetermined rotational orientation.

Figure 12A:
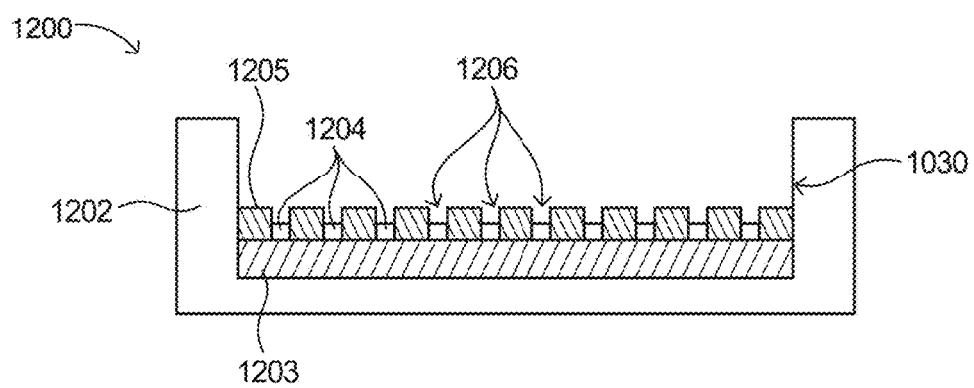
FIG. 12A includes an illustration of a system for forming a fixed abrasive article in accordance with an embodiment.

In accordance with another embodiment, a forming structure utilized to facilitate controlled deposition of one or more abrasive particles with a predetermined position and/or predetermined rotational orientation can have a plurality of openings. FIG. 12A includes an illustration of a system for forming a fixed abrasive article according to an embodiment. The system 1200 includes a production tool 1202 and a forming structure 1205 that can have a plurality of openings 1206 configured to allow the passage of the abrasive particles 1204 through the openings 1206 in the forming structure 1205 for deposition of the abrasive particles 1204 on or within the precursor bond material 1203 with a predetermined position and/or predetermined rotational orientation relative to a side surface 1030 of the production tool and, ultimately, a side surface of the finally-formed fixed abrasive article. Utilizing a forming structure 1205 with a plurality of openings 1206 can facilitate rapid and simultaneous placement of a plurality of abrasive particles 1204, such as shaped abrasive particles and/or elongated abrasive particles, on or within the precursor bond material 1203 with a predetermined position and/or predetermined rotational orientation.

Figure 21A:
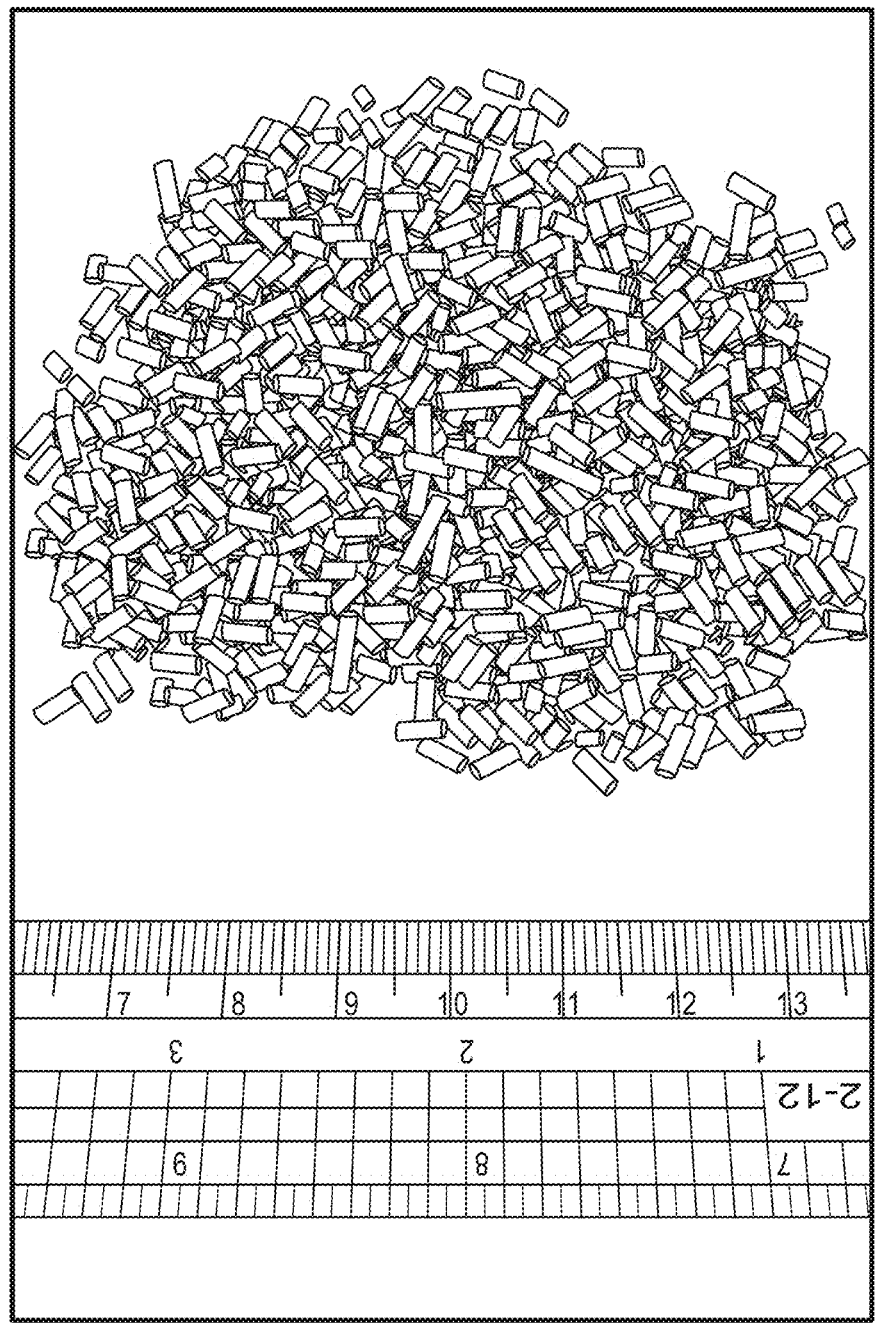
FIG. 21A includes an image of elongated abrasive particles in accordance with an embodiment.
Figure 21B:
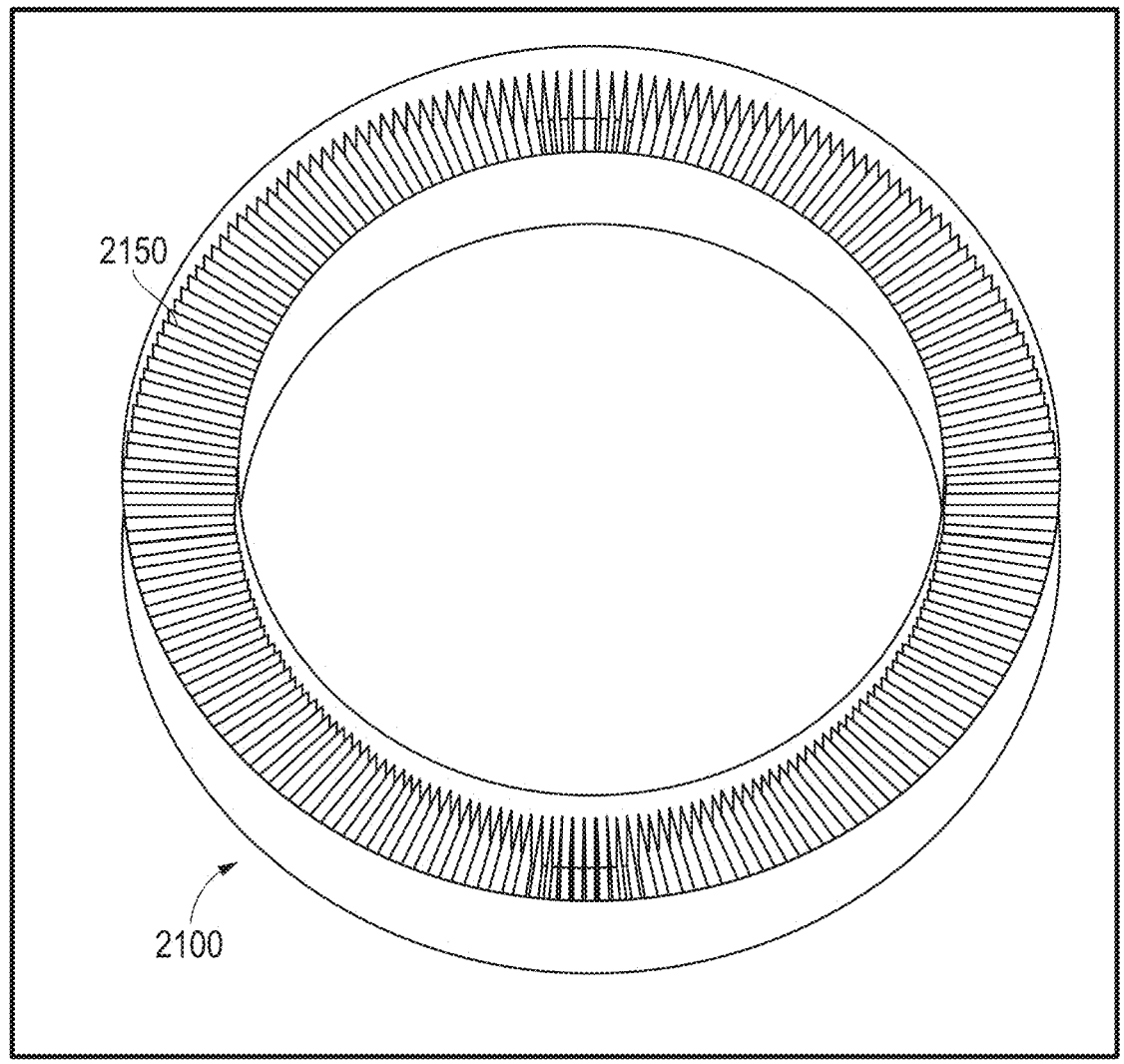
FIGS. 21B-21C include illustrations of a forming structure in accordance with an embodiment.

Turning briefly to FIG. 21B and in accordance with an embodiment, a forming structure 2100 is depicted from a top-down perspective. The forming structure 2100 includes a plurality of portions, such as portions 2150, positioned within the production tool 2100. The portions 2150 can be permanently affixed in any suitable configuration to the forming structure 2100 or, alternatively, can be adjusted by any suitable means to create any suitable configuration within the forming structure 2100. As shown in FIG. 21B, the plurality of portions 2150 are positioned so as to be parallel with a plurality of radial axes radiating from the center of the forming structure 2100.

The plurality of portions 2150 can be positioned not only to be parallel with radial axes radiating from the center of the forming structure 2100, but each portion 2150 also is spaced apart from adjacent portions 2150. In an embodiment, the average width (W) of an opening between adjacent portions 2150 can be selected to facilitate placement of abrasive particles in predetermined positions and/or predetermined rotational orientations within the final fixed abrasive article. For example, the average width W of the openings between adjacent portions 2150 can be adjusted to correspond to a physical dimension of the abrasive particles (e.g., their average length, width, or thickness).

In an embodiment, the average width W can be controlled relative to a largest dimension of an abrasive particle (i.e., the average width W between adjacent portions 2150 can correspond to a largest dimension of a shaped abrasive particle or elongated abrasive particle). For example, the portions 2150 can be placed such that there is an average width W between adjacent portions 2150, where the average width W corresponds to, for example, an average length of the shaped and/or elongated abrasive particles. In an embodiment, the width of the opening between adjacent portions 2150 can vary from a central axis or inner diameter of the forming structure 2100 to a side surface or outer diameter of the forming structure 2100. More particularly, the width of the opening between adjacent portions 2150 can increase from a width at the inner diameter of the forming structure 2100 to a greater width at the outer diameter of the forming structure 2100. In one example, the width of the opening between adjacent portions 2150 can be approximately 4 millimeters at the inner diameter of the forming structure 2100. The width of the opening between adjacent portions 2150 can vary between approximately 5.23 millimeters (for one configuration of the portions 2150 within the forming structure 2100) and 6.17 millimeters (for another configuration of the portions 2150 within the forming structure 2100) at the outer diameter of the forming structure. Thus, the average width W between adjacent portions could be approximately 4.615 millimeters in one embodiment (i.e., for one configuration of the portions 2150 within the forming structure 2100) or the average width W could be approximately 5.085 millimeters in another embodiment (i.e., for another configuration of the portions 2150 within the forming structure 2100).

Then the mixture including the abrasive particles can be deposited into the forming structure 2100. The portions 2150 can facilitate not only the positioning of the abrasive particles (i.e., by positioning the abrasive particles between the portions 2150), but also can facilitate the orientation of the abrasive particles, by positioning the abrasive particles in a lying flat configuration, such that the longest dimension of the abrasive particles is substantially parallel to a major surface of the forming structure 2100 and, ultimately, a major surface of the final fixed abrasive article. In such a configuration, the abrasive particles can be positioned between the portions 2150 with a major surface of the abrasive particle lying parallel to a major surface of the final fixed abrasive article. In an embodiment, the average width W of the openings between adjacent portions 2150 can be not greater than the average length of the abrasive particles, such as not greater than 95%, not greater than 90%, not greater than 85%, not greater than 80%, not greater than 75%, or even not greater than 50% of the average length of the abrasive particles. In another embodiment, the average width W between adjacent portions 2150 can be not greater than the average thickness of the abrasive particles, such as not greater than 95%, not greater than 90%, not greater than 85%, not greater than 80%, not greater than 75%, or even not greater than 50% of the average thickness of the abrasive particles. In another embodiment, the average width W between adjacent portions 2150 can be not greater than the average width of the abrasive particles, such as not greater than 95%, not greater than 90%, not greater than 85%, not greater than 80%, not greater than 75%, or even not greater than 50% of the average width of the abrasive particles.

Figure 21C:
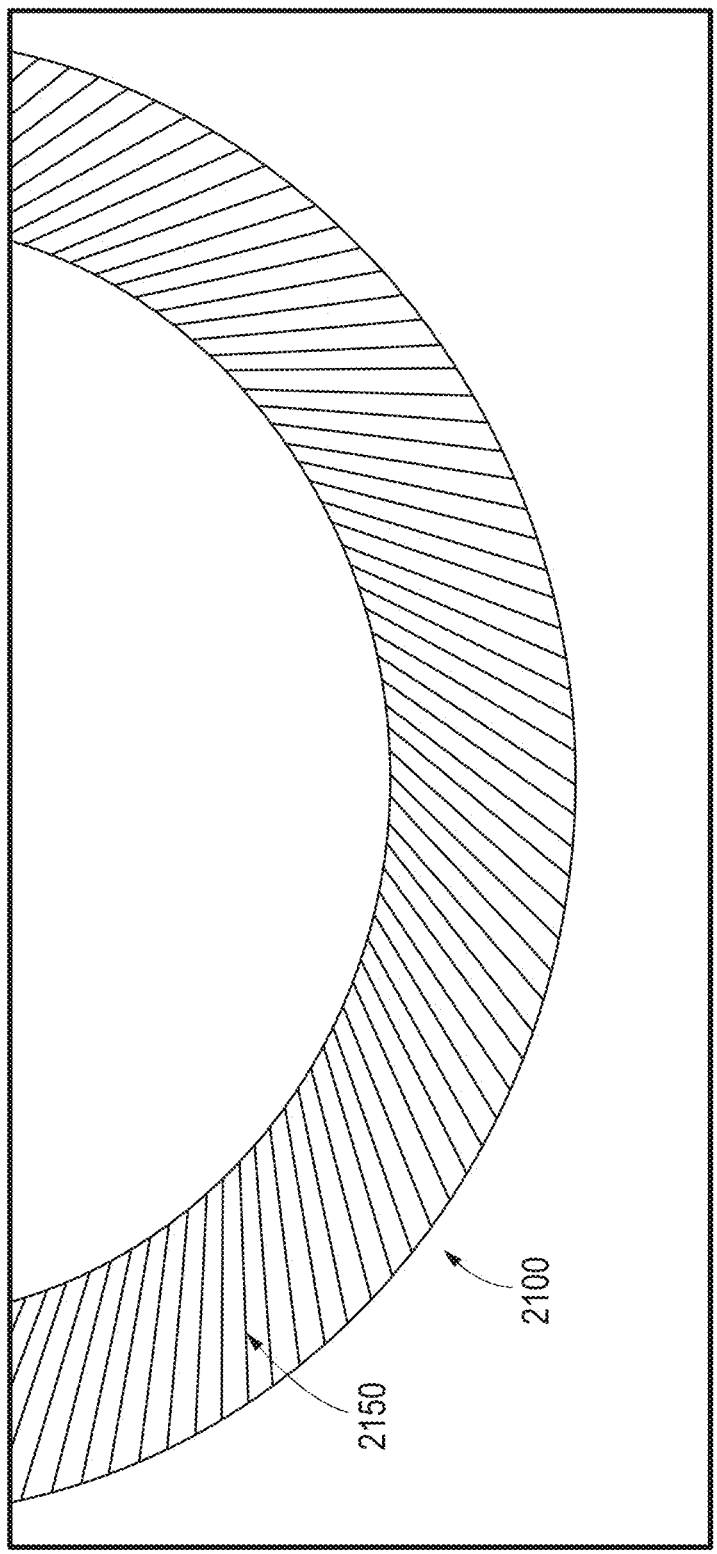
Figure 21D:
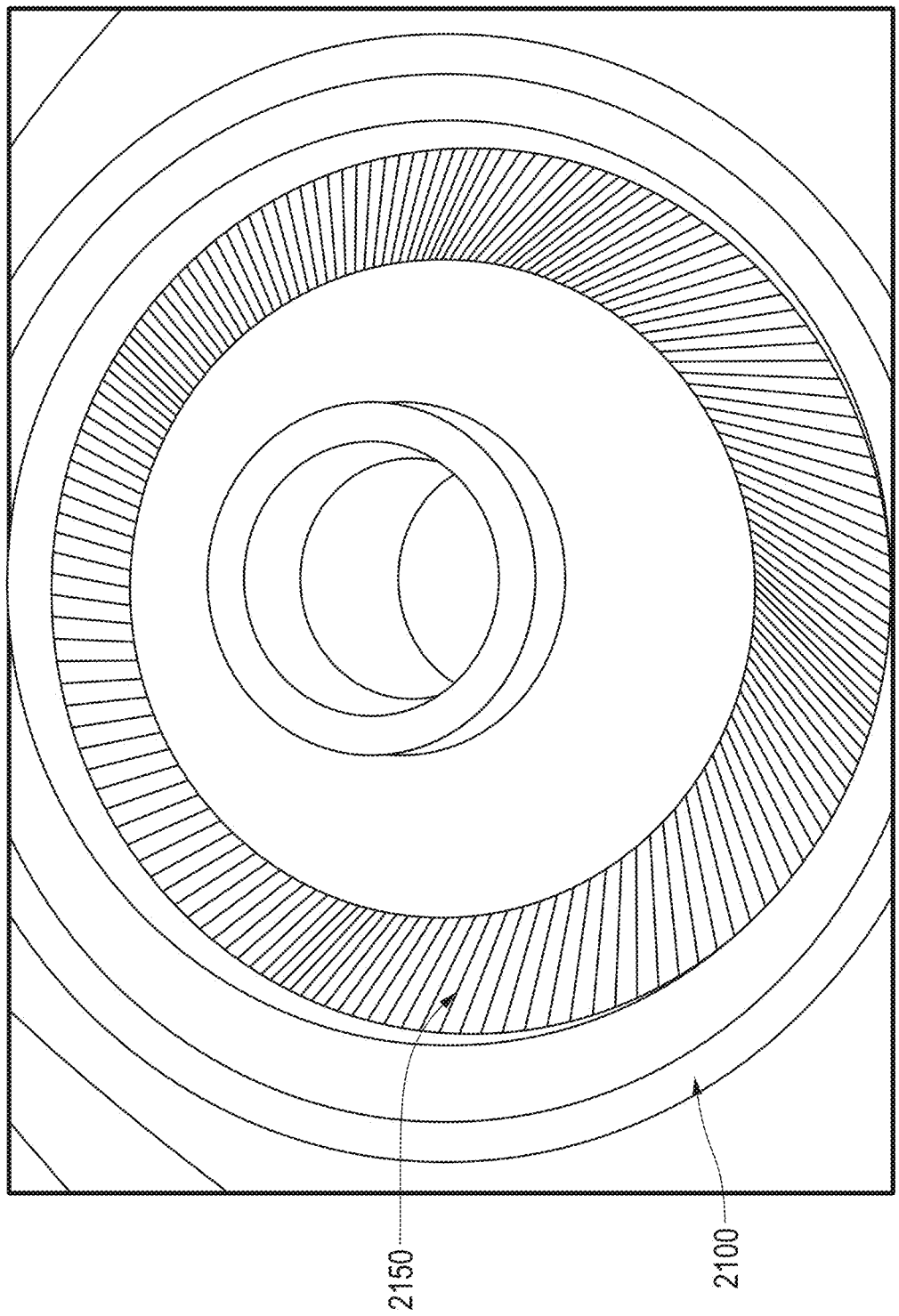
FIG. 21D includes an image of a forming structure in accordance with an embodiment.

Turning briefly to FIG. 21C, a portion of the forming structure 2100 is illustrated from a top-down perspective with another configuration of the portions 2150. The portions 2150 can be positioned at any suitable angle relative to a radial axis of the forming structure 2100. For example, in FIG. 21C, the portions 2150 are positioned at a 45° angle to a radial axis of the forming structure 2100. As discussed above, the openings between adjacent portions 2150 can include an average width W. That average width W can correspond to a physical dimension (e.g., an average length, width, or thickness) of the abrasive particles being used in the mixture. When the mixture is deposited into the forming structure 2100, the portions 2150 not only facilitate the placement of the abrasive particles between the portions 2150, but the portions 2150 also facilitate the orientation of the abrasive particles, by positioning the abrasive particles in a lying flat configuration with a major surface of the abrasive particles lying parallel to a major surface of the final fixed abrasive article. The portions 2150 also facilitate the orientation of the abrasive particles such that a longest dimension of the abrasive particles and/or a major surface of the abrasive particles is positioned at a 45° angle to a side surface of the forming structure 2100 and, ultimately, a side surface of the final fixed abrasive article. An exemplary image of a mixture of precursor bond material and abrasive particles residing in the forming structure 2100 between the portions 2150 positioned at a 45° angle is depicted in FIG. 21D.

Furthermore, depending on the intended grinding direction of the final fixed abrasive article, the abrasive particles being positioned at a 45° angle to a side surface of the abrasive article also can have a positive placement angle (e.g., +45° angle) or a negative placement angle (e.g., −45° angle). For example, if the abrasive particles are positioned at a 45° angle, and the angle inclines the abrasive particles in the intended grinding direction, then the abrasive particles have a positive placement angle. If the abrasive particles are positioned at a 45° angle, and the angle inclines the abrasive particles opposite to the intended grinding direction, then the abrasive particles have a negative placement angle.

Figure 12B:
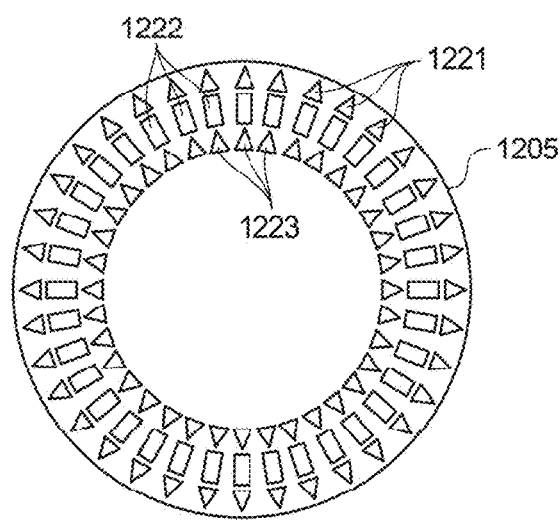
FIG. 12B includes an illustration of a forming structure for forming a fixed abrasive article in accordance with an embodiment.

FIG. 12B includes a top-down illustration of a forming structure 1205 according to an embodiment. As illustrated, the forming structure 1205 can have a plurality of openings 1221, 1222 and 1223 having various shapes and sizes relative to each other. Moreover, as illustrated, the forming structure 1205 can have a variety of different orientations of the openings 1221-1223 relative to each other. It will be appreciated that the openings 1221-1223 may have a particular shape to control the predetermined position and/or predetermined rotational orientation of the abrasive particles as the abrasive particles pass through the openings 1221-1223. In more particular terms, for example, the openings 1221 and 1223 may allow only abrasive particles having a triangular two-dimensional shape of a particular size range to pass through the forming structure 1205 in those particular locations, and thus control the predetermined position and/or predetermined rotational orientation of the abrasive particles passing therethrough on or within the precursor bond material 1203. The openings 1222 may be sized and shaped to allow passage of certain types of abrasive particles therethrough including, for example, shaped abrasive particles having a rectangular two-dimensional shape of a particular size range.

In accordance with an embodiment, the openings 1221-1223 within the forming structure 1205 can have a particular two-dimensional shape selected from the group consisting of a polygon, ellipsoids, irregular polygons, Greek alphabet characters, Latin alphabet characters, Russian alphabet characters, complex shapes having a combination of polygonal shapes, shapes with a combination of linear and arcuate sections, and a combination thereof. Notably, the openings 1221-1223 can have substantially the same two-dimensional shape as a two-dimensional shape of the shaped abrasive particles and/or elongated abrasive particles passing there through. In addition, the two-dimensional shape of the openings 1221-1223 can facilitate selective passage of only shaped abrasive particles of the desired shape and size through the openings and thus selectively controlling the predetermined position, predetermined rotational orientation, type and size of the abrasive particle placed on or within the precursor bond material 1203.

Moreover, the placement of the openings 1221-1223 within the forming structure 1205 can facilitate placement of the abrasive particles in a controlled distribution on or within the precursor bond material 1203, and therefore, in the finally-formed fixed abrasive article. As, further illustrated in FIG. 12C, the openings 1221-1223 can be arranged in various configurations including a controlled distribution. Moreover, it will be appreciated that the openings 1221-1223 can be arranged within a particular distribution that can further define the distribution of abrasive particles on the precursor bond material 1203. As will be appreciated, the distribution of the openings 1221-1223 can correspond to and define the controlled distribution of at least a portion of the abrasive particles within the precursor bond material 1203 and the finally-formed fixed abrasive article. In one embodiment, the openings 1221-1223 can be staggered relative to each other and relative to a given radial axis. That is, the openings 1221-1223 can be placed in concentric rings, but at different radial distances, from the center of the forming structure 1205, as is shown in FIG. 12C. At least some of the openings in one concentric ring (e.g., the openings 1221 positioned at one radial distance from the center of the body) also can be staggered (not shown) relative to at least some of the openings in the other concentric rings (e.g., the openings 1222 and 1223 positioned at lesser radial distances from the center of the body). As a result, the staggered openings 1221-1223 would occupy different positions along different radial axes of the body or be staggered in their positions relative to each radial axis. The abrasive particles which pass through the staggered openings 1221-1223 of the forming structure 1205 can define a controlled, non-shadowing arrangement in the final fixed abrasive article.

In an alternative embodiment, the openings 1221-1223 can be blind openings or pockets defining a space within the body of the forming structure 1205, which do not extend completely through the thickness of the forming structure 1205. Still, each of the openings 1221-1223 can be arranged, sized, and shaped to contain a shaped abrasive particle and/or elongated abrasive particle and selectively control the predetermined position, predetermined rotational orientation, type and size of the abrasive particle placed on or within the precursor bond material 1203. Notably, in the instance where the forming structure 1205 utilizes openings 1221-1223 in the form of pockets, the openings 1221-1223 can first be filled with a suitable number of shaped abrasive particles and/or elongated abrasive particles. The forming structure 1205 can then be delivered to a precursor bond material 1203 and inverted such that at least one surface of the shaped abrasive particles and/or elongated abrasive particles contained within the openings 1221-1223 contacts a surface of the precursor bond material 1203. The forming structure 1205 may then be lifted leaving the shaped abrasive particles and/or elongated abrasive particles on the precursor bond material 1203, and the abrasive particles may have a predetermined position, predetermined rotational orientation, and/or controlled distribution on the precursor bond material 1203 as provided by the openings 1221-1223 in the forming structure. The single layer of a plurality of abrasive particles (e.g., shaped abrasive particles and/or elongated abrasive particles) overlying the precursor bond material 1203 can define a fixed abrasive preform. One or more preforms can be made separately and then combined to form a green body of an abrasive article. The green bond can be treated according to any one of the methods herein, including for example, pressing (e.g., cold pressing, warm pressing, hot pressing, etc.) to change the green body to a finally formed abrasive article.

Referring to FIG. 9, the process can further include step 903, during which the green body formed in step 902 is treated to form a fixed abrasive article. The process of treating can include treating the precursor bond material to form a finally-formed bond material. Treating may be selected from the group of processes including, but not limited to, heating, curing, sintering, melting, oxidizing, reducing, radiating, cooling, freezing, and a combination thereof. Moreover, as noted herein, any of the foregoing treating processes may be conducted completely or partially at any point during the forming process to facilitate the formation of a fixed abrasive article of the embodiments herein.

In an embodiment, the forming structure may be a temporary structure that is not part of the finally-formed fixed abrasive article. For example, referring again to the forming structure 1205 of FIG. 12A, the forming structure 1205 may be in the form of a plate configured to control the predetermined position and/or predetermined rotational orientation of the abrasive particles as they are placed on the precursor bond material 1203. The forming structure 1205 is removed prior to final treatment of the bond material to form the finally-formed fixed abrasive article. In such instances, the abrasive particles may be temporarily in contact with the forming structure 1205 during the forming process, but the forming structure may be removed prior to final processing. In accordance with an embodiment, the forming structure 1205 can include a material such as a metal, organic material, resin, polymer, glass, ceramic, monocrystalline material, polycrystalline material, natural material such as mineral, synthetic material, and a combination thereof.

Figure 13:
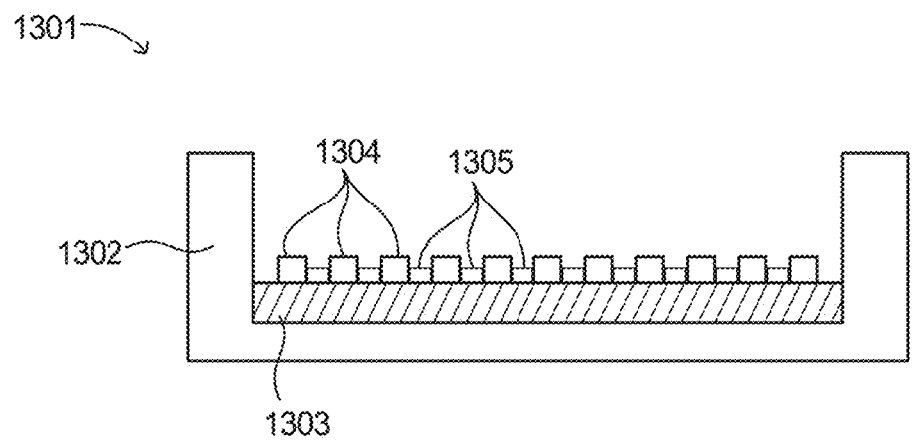
FIG. 13 includes an illustration of a system for forming a fixed abrasive article in accordance with an embodiment.

In yet another embodiment, the forming structure can be an integrated structure contained within the finally-formed fixed abrasive article. For example, referring to FIG. 13, a system 1301 for forming a fixed abrasive article using a forming structure is provided in accordance with an embodiment. The system 1301 can include a production tool 1302, a precursor bond material 1303, and abrasive particles 1304 connected to each other via a forming structure 1305. In such instances, the forming structure 1305 can be a permanent structure configured to connect and couple at least a portion of the abrasive particles 1304 to each other. In such instances, the forming structure 1305 may be referred to as an orientation structure in the finally-formed fixed abrasive, wherein the abrasive particles 1304 can be permanently attached to the forming structure 1305 and have a predetermined position and/or predetermined rotational orientation based on their attachment to the forming structure 1305. As such, further processing may include deposition of precursor bond material over the abrasive particles 1304 and forming structure 1305 such that the forming structure 1305 is integrated within the finally-formed fixed abrasive article.

In accordance with an embodiment, the forming structure 1305 can include a material such as a metal, an organic material, a resin, a polymer, a glass, a ceramic, a monocrystalline material, a polycrystalline material, a natural material such as a mineral, a synthetic material, and a combination thereof.

In one embodiment, the forming structure 1305 can be a network structure including abrasive particles coupled to each other. For example, the forming structure can include bridges 1305 which, in one embodiment, can be akin to the orientation structure 821 depicted in FIG. 8. As noted herein, in certain instances, the bridges 1305 of the forming structure 1305 can be a permanent part of the fixed abrasive article. However, in an alternative embodiment, the bridges 1305 of the forming structure 1305 may be temporary and the finally-formed fixed abrasive article can be essentially free of the bridges 1305 of the forming structure 1305. In such instances, the bridges 1305 may be consumed or removed during processing to form the fixed abrasive article. For example, the bridges 1305 of the forming section 1305 connecting the abrasive particles 1304 may be removed during treating of the green body, such as during a heating process. For example, one process may include volatilization of the bridges 1305, such that the bridges 1306 are evolved as a gas or form porosity within the finally-formed fixed abrasive article.

In other instances, the forming structure 1305 including the bridges 1305 coupling the abrasive particles to each other, may be made of a material that is similar to the precursor bond material 1303. In some embodiments, this may facilitate absorption of at least a portion of the forming structure 1305, such as the bridges 1305, during treatment. As such, at least a portion of the forming structure 1305 can be integrated into the precursor bond material and become part of the fixed abrasive article during the treating process. In one particular embodiment, at least a portion of the forming structure 1305, such as the bridges 1305, can be dissociated or absorbed during treatment of the precursor bond material 1303 to form the finally-formed bond material and the finally-formed fixed abrasive article.

Figure 14:
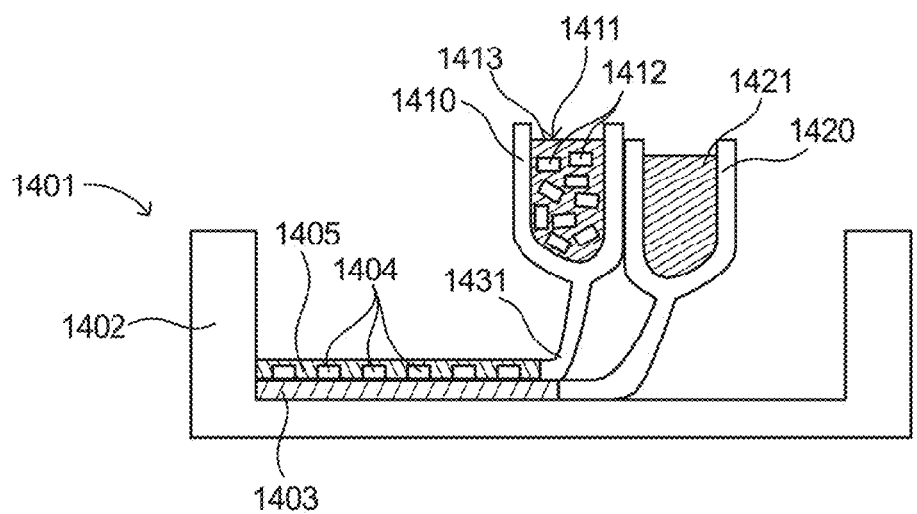
FIG. 14 includes an illustration of a system for forming a fixed abrasive article in accordance with an embodiment.

In yet another embodiment, the forming structure may include at least one structure configured to allow the flow of a mixture including the precursor bond material and abrasive particles through one or more openings in the forming structure to control the deposition of the precursor bond material and abrasive particles. For example, FIG. 14 includes an illustration of a system for forming a fixed abrasive article according to an embodiment. As illustrated, the system 1401 can include a production tool 1402 and deposition of a precursor bond material 1403 within the production tool 1402. In certain instances, the system may utilize multiple forming structures, including a first forming structure 1420, which may have a reservoir for holding the precursor bond material 1421 therein until it is deposited as a layer of precursor bond material 1403.

As further illustrated, a forming structure 1410 can also be utilized and facilitate deposition of a mixture 1413 including abrasive particles 1412 and precursor bond material 1411 that may be deposited through an opening of a nozzle 1431 of the forming structure 1410 in a manner to control the predetermined position and/or predetermined rotational orientation of the abrasive particles 1404. The opening of the nozzle 1431 can be sized and shaped to facilitate suitable deposition of the abrasive particles 1412 and precursor bond material 1411 in the desired manner. According to one embodiment, the mixture 1413 can be a wet mixture that is poured through at least one opening in the forming structure 1410. In another embodiment, one or more forces may be applied to the mixture 1413 within the forming structure 1410 to facilitate deposition of the mixture 1413. The mixture 1413 can be deposited as a layer of precursor bond material 1405 and abrasive particles 1404, wherein the abrasive particles 1404 can have a predetermined rotational orientation relative to a side surface of the production tool 1402 and, ultimately, the finally-formed fixed abrasive article.

The forming structures of the embodiments herein also can be configured to control the predetermined tilt angle of at least a portion of the abrasive particles in the finally-formed fixed abrasive article. As such, the forming structure can be configured to control the average predetermined tilt angle and standard deviation of the predetermined tilt angle of a portion of the abrasive particles as described in embodiments herein.

Figure 15:
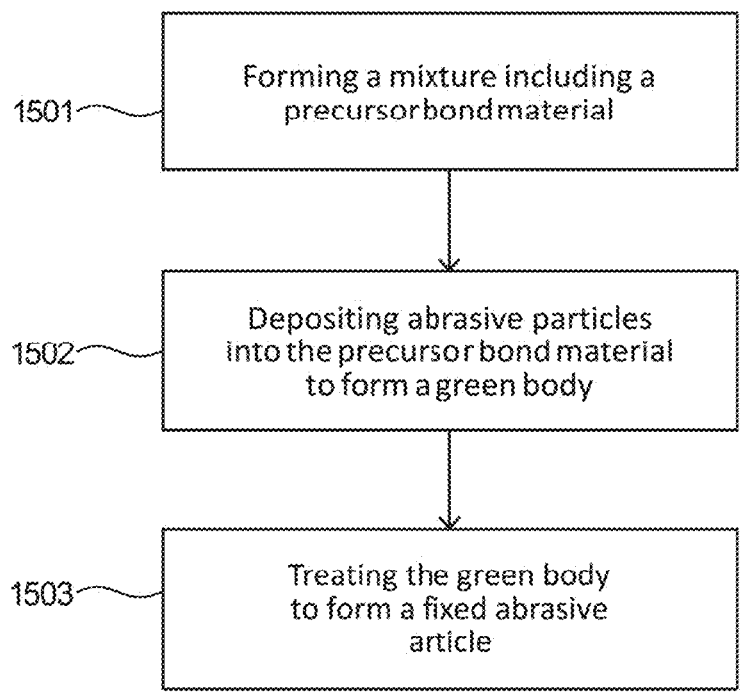
FIG. 15 includes a flowchart illustrating a method of forming a fixed abrasive article in accordance with an embodiment.

FIG. 15 includes a flowchart providing a method of forming a fixed abrasive article according to an embodiment. As illustrated, the process can be initiated at step 1501 by forming a mixture including a precursor bond material. The precursor bond material can include those materials as noted in embodiments herein.

The process can continue with step 1502 by depositing abrasive particles into the precursor bond material to form a green body. As will be appreciated, the abrasive particles can include shaped abrasive particles and/or elongated abrasive particles as described in embodiments herein.

In accordance with at least one embodiment, the process of depositing the abrasive particles can include forming the abrasive particles. That is, the abrasive particles can be formed during the process of forming the fixed abrasive article. In one particular embodiment, the abrasive particles can be formed in situ during the process of forming the entire fixed abrasive article. For example, in one instance, the process can include forming a first portion of abrasive particles, depositing a first portion of the precursor material on the first portion abrasive particles, and thereafter forming a second portion of abrasive particles, distinct from the first portion of abrasive particles, on the first portion of the precursor bond material. As will be appreciated, the first and second portions of abrasive particles can include a first group in a radial plane, first and second groups in different radial planes, a first radial set, first and second radial sets, a first axial collection, first and second axial collections, a first axial set, first and second axial sets, and a combination thereof. As will be appreciated, the process of forming the first portion of abrasive articles can include forming a first portion including shaped abrasive particles and/or elongated abrasive particles having a predetermined position and/or predetermined rotational orientation relative to a side surface of the production tool that may define the side surface of the finally-formed fixed abrasive article.

Figure 16:
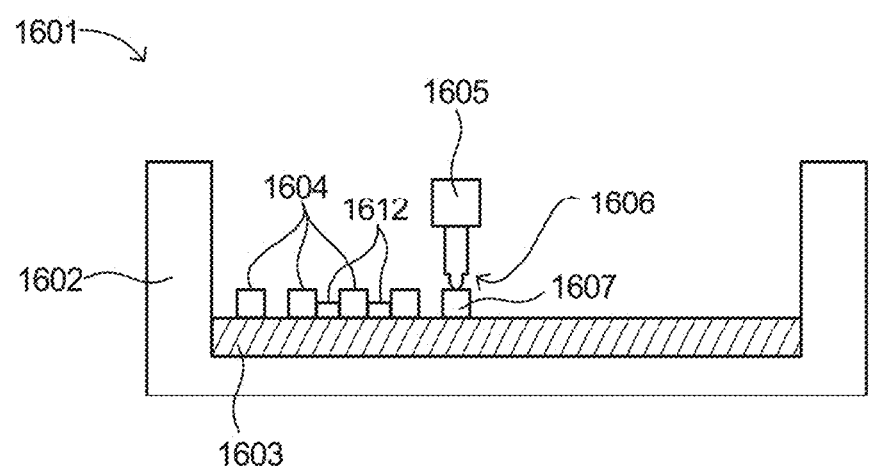
FIG. 16 includes an illustration of a system for forming a fixed abrasive article in accordance with an embodiment.

Certain suitable forming processes to form the abrasive particles can include an additive manufacturing process, printing, screen printing, shaping, casting, stamping, molding, scoring, fracturing, drying, and a combination thereof. In a particular embodiment, such as illustrated in FIG. 16, a system 1601 for forming a fixed abrasive article according to an embodiment can include a production tool 1602 and a precursor bond material 1603. The system 1601 further includes a deposition structure 1605 such as a deposition head 1606 configured to form the abrasive particles 1604 in situ on the precursor bond material 1603. For example, as illustrated in FIG. 16, discrete abrasive particles, including the abrasive particle 1607, can be formed on or within the precursor bond material 1603 by the deposition structure 1605. In one embodiment, the deposition structure 1605 can include a 3-D printing device such that the forming process includes 3-D printing of the abrasive particles during the forming of the fixed abrasive article. It will be appreciated that 3-D printing can include 3-D printing of shaped abrasive particles and/or elongated abrasive particles. Moreover, while a single deposition structure 1605 is illustrated, it is contemplated that a plurality of deposition structures or a single deposition structure with a plurality of deposition heads may be utilized to simultaneously form a plurality of abrasive particles.

The process of forming the fixed abrasive article can further include forming abrasive particles and creating a forming structure (e.g., an orientation structure) configured to be coupled to the abrasive particles. As such, the forming process can include formation of abrasive particles and one or more forming structures, which may have bridges 1612 coupling abrasive particles to each other. In certain instances, one or more groups of abrasive particles 1604 and bridges 1612 can be coupled to each other, wherein the bridges 1612 of the forming structure can facilitate holding the abrasive particles 1604 in a predetermined position and/or predetermined rotational orientation during the forming process and within the finally-formed fixed abrasive article. Notably, the forming structure including the bridges 1612 extending between the abrasive particles 1604 can be formed by 3-D printing or any of the other processes noted herein. For example, as further illustrated in FIG. 16, the deposition head 1605 can include a 3-D printing head configured to form the bridges 1612 of the forming structure that extend between at least a portion of the abrasive particles 1604. It will be appreciated that the process of forming the abrasive particles and the forming structure together is an alternative process and need not necessarily always occur.

Figure 17A:
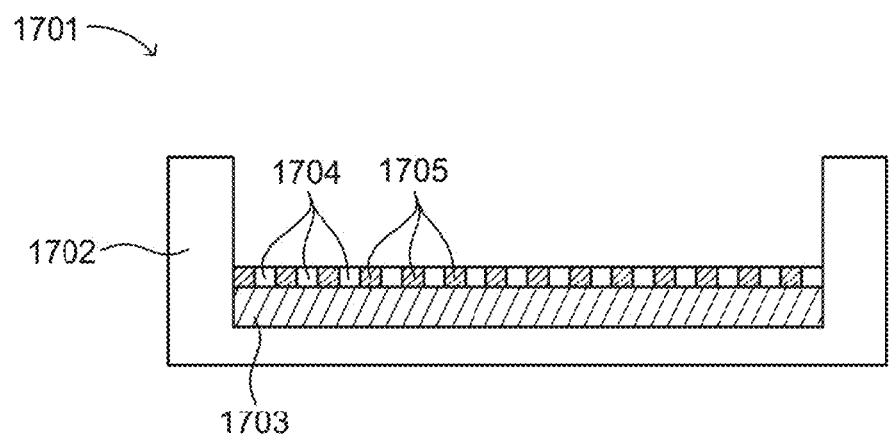
FIGS. 17A and 17B include illustrations of a system for forming a fixed abrasive article in accordance with an embodiment.
Figure 17B:
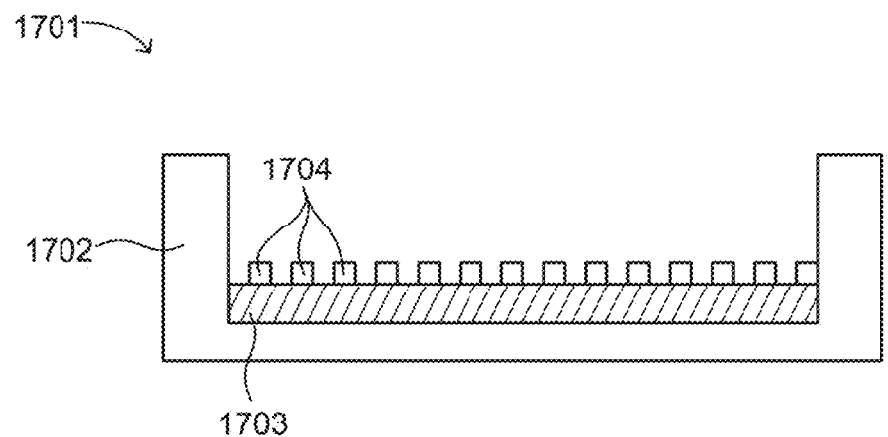

In yet another embodiment, the process of forming the abrasive particles during the process of forming the fixed abrasive article can include a screen printing process. That is, forming can include screen printing abrasive particles having a predetermined position and/or a predetermined rotational orientation on the precursor bond material. FIG. 17A includes a system of forming a fixed abrasive article according to an embodiment. The system 1701 can include a production tool 1702 including a precursor bond material 1703 and precursor abrasive particles 1704 being formed within openings of a screen 1705 during a screen printing process. As further illustrated in FIG. 17B, after forming the precursor abrasive particles 1704 in the process of FIG. 17A, the screen 1705 can be removed such that precursor abrasive particles 1704 are overlying the precursor bond material 1703.

The precursor abrasive particles that are formed during the process of forming the fixed abrasive article can undergo further processing to form finally-formed abrasive articles. Some suitable forming processes can include heating, curing, drying, doping, cooling, freezing, coating, sintering, and a combination thereof. In at least one embodiment, the process of treating the precursor shaped abrasive particles and formation of finally formed abrasive particles can be the same process that may be used to treat the precursor bond material and form a finally-formed bond material of the finally-formed fixed abrasive. Still, in alternative instances, the process of treating the precursor shaped abrasive particles to form final abrasive particles can be a different process than the process used to treat the precursor bond material to form a finally-formed bond material of the finally-formed fixed abrasive.

Figure 18:
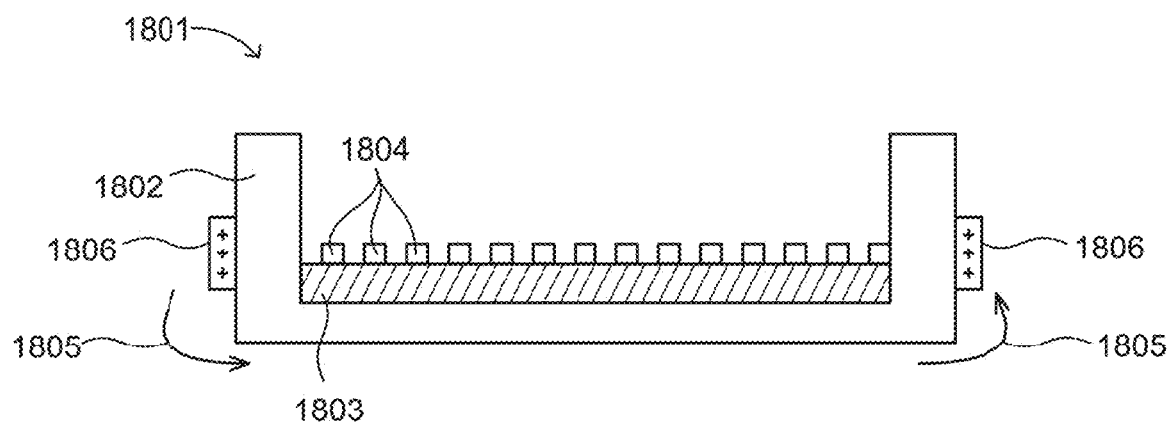
FIG. 18 includes an illustration of a system for forming a fixed abrasive article in accordance with an embodiment.

In accordance with another embodiment, the process of depositing the abrasive particles on or within the precursor bond material can further include rearranging at least a portion of the abrasive particles to have a predetermined position and/or predetermined rotational orientation. For example, as illustrated in the process of FIG. 18, a system 1801 can include a production tool 1802 and a precursor bond material 1803 formed according to an embodiment herein. As further illustrated, the abrasive particles 1804 can be deposited on the precursor bond material 1803. Thereafter, the abrasive particles 1804 may be rearranged to change the predetermined position and/or the predetermined rotational orientation of the abrasive particles. In certain instances, rearranging can include providing a force to the abrasive particles 1804, which force is configured to cause a change in the predetermined position and/or rotational orientation of the abrasive particles 1804. For example, in one embodiment, a rotational force 1805 and/or vibrational force 1805 may be applied to the production tool 1802 to facilitate a change in the predetermined position and/or predetermined rotational orientation of the abrasive particles 1804 on or within the precursor bond material 1803. Some suitable forces that may be utilized can include gravity, centripetal, centrifugal, uniaxial, biaxial, isometric, and a combination thereof.

Alternatively, the process of rearranging the abrasive particles can include providing energy to the abrasive particles configured to cause a change in the predetermined position and/or predetermined rotational orientation of the abrasive particles on or within the precursor bond material. For example, as illustrated in FIG. 18, in certain instances, an electromagnetic energy 1806 may be applied to the abrasive particles 1804 to facilitate rearranging the abrasive particles on or within the precursor bond material 1803. The abrasive particles may include a material or may be coated with a material (e.g., silane) that can facilitate their alignment by the application of electromagnetic energy. Other suitable forms of energy that may be supplied to the abrasive particles 1804 can include electrical, mechanical, vibratory, electromagnetic, magnetic, sonic, and a combination thereof. While reference has been made to deposition of the abrasive particles and rearrangement of the abrasive particles after deposition, it will be appreciated that the process of rearrangement may be conducted during the process of deposition, such as before the abrasive particles 1804 contact the precursor bond material 1803.

Figure 19:
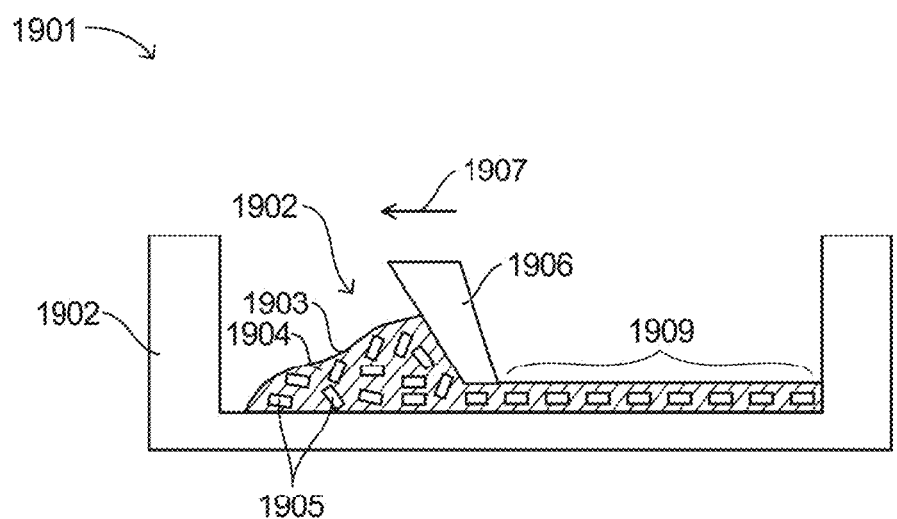
FIG. 19 includes an illustration of a system for forming a fixed abrasive article in accordance with an embodiment.

In yet another embodiment, the process of depositing the abrasive particles can include deposition of a mixture of the abrasive particles and precursor bond material into the production tool. FIG. 19 includes a system for forming a fixed abrasive article according to an embodiment. As illustrated, the system 1901 can include deposition of a mixture 1903 into a production tool 1902, where the mixture includes the precursor bond material 1904 and abrasive particles 1905. After deposition of the mixture 1902, one or more forces can be applied to the mixture 1902 to facilitate a change in the position and/or rotational orientation of the abrasive particles, such that the abrasive particles are urged to a predetermined position and/or predetermined rotational orientation of the abrasive particles. In one particular embodiment, the process of applying a force can include translating one or more structures 1906 (e.g., a doctor blade), such as in the direction 1907, over the surface of the mixture 1903 to facilitate the change in position and/or rotational orientation of the abrasive particles 1905 from those illustrated in the region 1908 to those illustrated in the region 1909.

Figure 20:
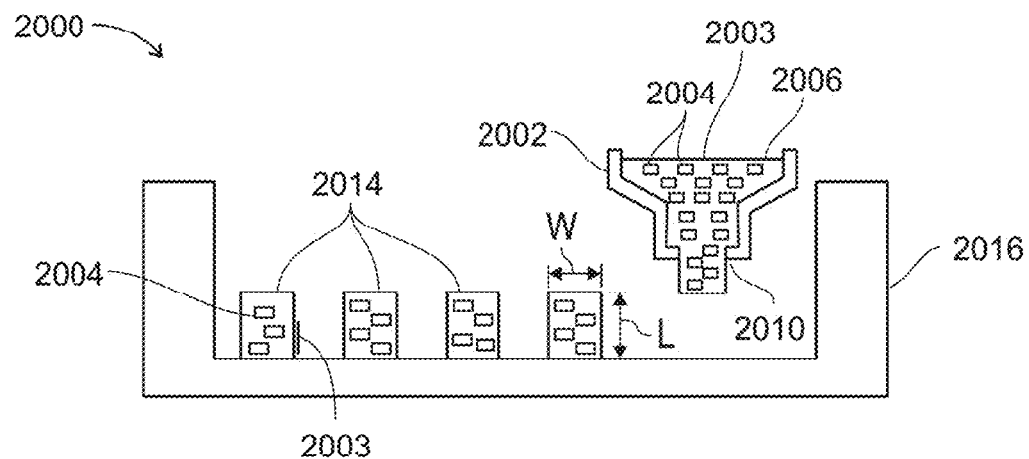
FIG. 20 includes an illustration of a system for forming a fixed abrasive article in accordance with an embodiment.

FIG. 20 includes an illustration of a system for forming a fixed abrasive article according to an embodiment. As illustrated, the system 2000 can include a production tool 2016 and a mixture 2006, including precursor bond material 2003 and abrasive particles 2004. The mixture 2006 is contained in and deposited by a deposition structure 2010 through a forming structure 2002.

In particular instances, deposition of the mixture 2006 can include one or more processes such as printing (e.g., screen-printing), molding, pressing, casting, sectioning, cutting, dicing, punching, pressing, drying, curing, coating, extruding, rolling, and a combination thereof. In a particular embodiment, deposition includes extruding the mixture 2006 through a forming structure 2002.

The forming structure 2002 can include one or more openings. The openings can be sized and shaped to allow the flow of the mixture 2006 therethrough and orientation of the abrasive particles 2004 therein. The size, shape, and distribution of the openings in the forming structure 2002 can be controlled to facilitate a deposition of the abrasive particles 2004 with a predetermined position, a controlled distribution, and/or a predetermined rotational orientation relative to a side surface of the production tool 2016 and, ultimately, a major surface of the finally-formed fixed abrasive article. While not illustrated, it is contemplated that more than one type of forming structure can be utilized to create different portions within the fixed abrasive article, where the different portions of the article include abrasive particles of different abrasive characteristics and/or orientation characteristics, including, but not limited to, predetermined position and/or predetermined rotational orientation.

In an embodiment, the openings in the forming structure 2002 may have a two-dimensional shape selected from the group consisting of a polygon, an ellipsoid, a numeral, a Greek alphabet character, a Latin alphabet character, a Russian alphabet character, a complex shape having a combination of polygonal shapes, and a combination thereof. In another embodiment, the openings in the forming structure 2002 may have a same two-dimensional shape as the two-dimensional shape of the abrasive particles 2004.

Deposition of the mixture 2006 can form a plurality of preformed bodies 2014, which bodies can include abrasive particles 2004 and precursor bond material 2003, and which bodies also can have different or similar shapes and sizes. In an embodiment, all of the preformed bodies 2014 may have any number of same, or similar, characteristics, such as for example, dimensions, shapes, homogeneity, or abrasive particle density.

In an embodiment, the preformed bodies 2014 may each include an elongated preformed structure. In a particular instance, each of the preformed bodies 2014 may be in the form of a pellet or another object having a predetermined shape.

The preformed bodies 2014 can each have a length (as shown by the dimension "L" in FIG. 20) and a maximum width, as measured in a direction perpendicular to the length and as shown by the dimension "W" in FIG. 20. In an embodiment, the maximum width of at least one of the preformed bodies 2014 may be a diameter of the at least one preformed body 2014. In a particular embodiment, the length may be at least 25% of the maximum width, such as at least 100% of the maximum width, at least 150% of the maximum width, at least 175% of the maximum width, at least 200% of the maximum width, at least 250% of the maximum width, or at least 500% of the maximum width. The preformed bodies 2014 also may have an aspect ratio, as measured by a ratio of the length to the width or maximum diameter, of at least 0.1, such as at least 0.2, at least 0.5, at least 1, at least 1.5, at least 2, at least 3, at least 4, at least 5, at least 6, at least 7, at least 8, at least 9, or at least 10. In another embodiment, the preformed bodies 2014 may have an aspect ratio of less than 100, such as less than 50, or less than 25.

In certain instances, at least one of the preformed bodies 2014 may be generally cylindrical. As used herein to describe the preformed bodies 2014, "generally cylindrical" refers to a condition wherein at least one of the preformed bodies 2014 may occupy at least 75% of a volume of a best fit cylinder, such as at least 80% of a volume of a best fit cylinder, such as at least 95% of a volume of a best fit cylinder, such as at least 90% of a volume of a best fit cylinder, such as at least 95% of a volume of a best fit cylinder, such as at least 96% of the volume of the best fit cylinder, at least 97% of the volume of the best fit cylinder, at least 98% of the volume of the best fit cylinder, or at least 99% of the volume of the best fit cylinder. In a further embodiment, a majority of the preformed bodies 2014 may be generally cylindrical. In another embodiment, all of the preformed bodies 2014 may be generally cylindrical. In other instances, at least one of the preformed bodies 2014 may be cylindrical. That is, at least one of the preformed bodies 2014 may have a first face, a second face parallel with respect to the first face, and a cylindrical sidewall disposed between the first and second faces. In a further embodiment, a majority of the preformed bodies 2014 may be cylindrical. In another embodiment, all of the preformed bodies 2014 may be cylindrical.

In another embodiment, at least one of the preformed bodies 2014 may have a two-dimensional shape selected from the group consisting of a polygon, an ellipsoid, a numeral, a Greek alphabet character, a Latin alphabet character, a Russian alphabet character, a complex shape having a combination of polygonal shapes, and a combination thereof.

The preformed bodies 2014 may have an abrasive particle density, as measured by a density of the abrasive particles 2004 relative to the overall body of the preformed bodies 2014. In an embodiment, the abrasive particle density of the preformed bodies 2014 may be higher than a conventional mixture of abrasive particles and precursor bond material formed using a non-extrusion method or technique.

In certain instances, the abrasive particles 2004 may be homogenously, or nearly homogenously, distributed within at least one of the preformed bodies 2014. In another embodiment, the abrasive particles 2004 may be randomly or non-homogenously distributed within the preformed bodies 2014.

In an embodiment, at least two of the abrasive particles 2004 disposed in at least one preformed body 2014 may have the same predetermined three-axis orientation with respect to one another. In another embodiment, at least two abrasive particles 2004 in each of the preformed bodies 2014 may have the same predetermined three-axis orientation with respect to one another. In a further embodiment, all abrasive particles 2004 disposed in at least one of the preformed bodies 2014 may have the same predetermined three-axis orientation with respect to one another. In yet another embodiment, all abrasive particles 2004 disposed in each of the preformed bodies 2014 may have the same predetermined three-axis orientation with respect to one another.

During or after deposition of the mixture 2006, the preformed bodies 2014 may be combined, or positioned relative to one another, and treated to form the fixed abrasive article. Additional precursor bond material may be applied prior to treating the preformed bodies 2014 and forming the fixed abrasive article.

In accordance with another embodiment, the process of depositing the mixture 2006 can further include rearranging at least a portion of the preformed bodies 2014 within the production tool 2016. In an embodiment, the preformed bodies 2014 can be rearranged to abut one another. In another embodiment, all of the preformed bodies 2014 may be deposited on a surface of the production tool 2016 with little or no spacing between the preformed bodies 2014. In a particular instance, at least two of the preformed bodies 2014 may be deposited by the forming structure 2002 so as to be in at least partial contact with one another. In another particular instance, a majority, such as all, of the preformed bodies 2014 may be deposited so that each preformed body 2014 is in at least partial contact with an adjacent preformed body 2014. Any of the foregoing methods of formation may be combined with any of the other methods to facilitate the formation of a fixed abrasive article including abrasive particles having the features of the embodiments herein. Notably, any portion of the foregoing methods can be combined with any of the features and steps of any of the other processes to facilitate formation of a fixed abrasive article having the features of the embodiments herein.

Some reference has been made in the embodiments herein to staggering of particles. In addition to controlling the placement and rotational orientation of each of the abrasive particles in the bonded abrasive body, it may also be advantageous to control the placement and rotational orientation of the abrasive particles relative to each other. For example, based upon some empirical data, it has been noted that certain arrangements of the abrasive particles may facilitate improved operations of the abrasive article. Notably, it may be advantageous to stagger the particles relative to each other and relative to one or more reference planes or axes within the body to avoid excessive wear and decreased abrasive capabilities of the abrasive article during use.

According to one embodiment, the abrasive particles within any plane, group, collection, or set can be arranged in a particular distribution relative to each other. The distribution can be a pattern having short range order and long range order, wherein the long range order is based on repetition of a smallest unit defining the short range order. The distribution may be a random distribution of abrasive particles having no discernable short range order or long range order. In other instances, the distribution may be a controlled, non-uniform distribution. A controlled "non-uniform distribution" means that the position of the abrasive particles has a controlled asymmetry (i.e., a controlled randomness), such that although the distribution of abrasive particles can be described by or predicted by, for example, a radial, spiral, or phyllotactic equation, the distribution of abrasive particles exhibits at least a partial asymmetry. The controlled non-uniform distribution can be partially, substantially, or fully asymmetric. The controlled non-uniform distribution can be utilized for a portion of abrasive particles within any plane, group, collection, and/or set. The distribution can cover multiple portions of the abrasive article or can cover only a portion of the abrasive article.

It is contemplated that the controlled non-random distributions according to the embodiments described herein can also include a distribution where only a portion of the total number of abrasive particles of the distribution possesses a controlled asymmetry. Such a situation can occur, for instance, by combining or substituting a portion of a uniformly distributed pattern or a completely random pattern with a portion of the controlled non-uniform distribution. Still, in at least one embodiment, the controlled non-random distribution can include a distribution where 100% of the particles having a controlled asymmetry.

The controlled asymmetry can be a controlled reflection asymmetry (also called mirror symmetry, line symmetry, and bilateral symmetry), a controlled rotational asymmetry, a controlled translational symmetry, controlled glide reflection symmetry, or combinations thereof. In at least one embodiment, the non-uniform distribution can be an arrangement described by a rotational asymmetry. For example, for a radial, spiral, or phyllotactic pattern having a rotational symmetry of an order of one, such a distribution has no rotational symmetry because the distribution repeats itself only once during a rotation of 360° about its center. In other words, if two copies of the same exact pattern are placed directly over each other and one copy is held constant while the second copy is rotated 360° about its center, all of the apertures of both copies will come into alignment only once during the 360° rotation.

In one embodiment, the distribution can be a phyllotactic pattern. As used herein, "a phyllotactic pattern" means a pattern related to phyllotaxis. Phyllotaxis is the arrangement of lateral organs such as leaves, flowers, scales, florets, and seeds in many kinds of plants. Many phyllotactic patterns are marked by the naturally occurring phenomenon of conspicuous patterns having arcs, spirals, and whorls. The pattern of seeds in the head of a sunflower is an example of this phenomenon. Multiple arcs or spirals, also called parastichy, can have their origin at a center point of the distribution and travel outward, while other spirals originate to fill in the gaps left by the inner spirals. See Jean's *Phyllotaxis A Systemic Study in Plant Morphogenesis* at p. 17. Frequently, the spiral-patterned arrangements can be viewed as radiating outward in both the clockwise and counterclockwise directions.

Figure 25A:
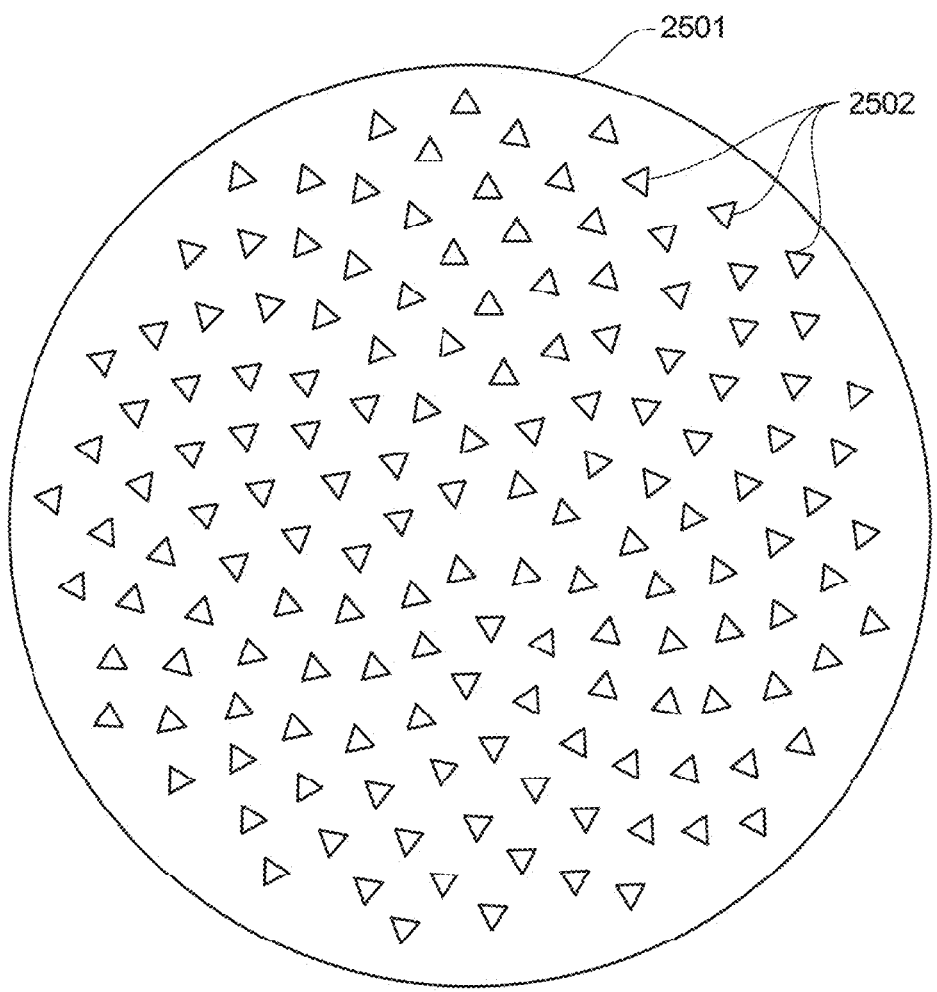
FIG. 25A provides a top-down illustration of a portion of an abrasive article in accordance with an embodiment.

FIG. 25A provides a top-down illustration of a portion of an abrasive article according to an embodiment. Notably, FIG. 25A includes an illustration of a radial plane 2501 within an abrasive article. The radial plane 2501 includes shaped abrasive particles 2502 each having a triangular two-dimensional shape as viewed in the plane of the radial plane 2501. As illustrated, each of the abrasive particles is substantially laying down within the radial plane 2501. FIG. 25A is an illustration of a distribution of abrasive particles having a controlled, non-random distribution in the form of a phyllotactic pattern.

Figure 25B:
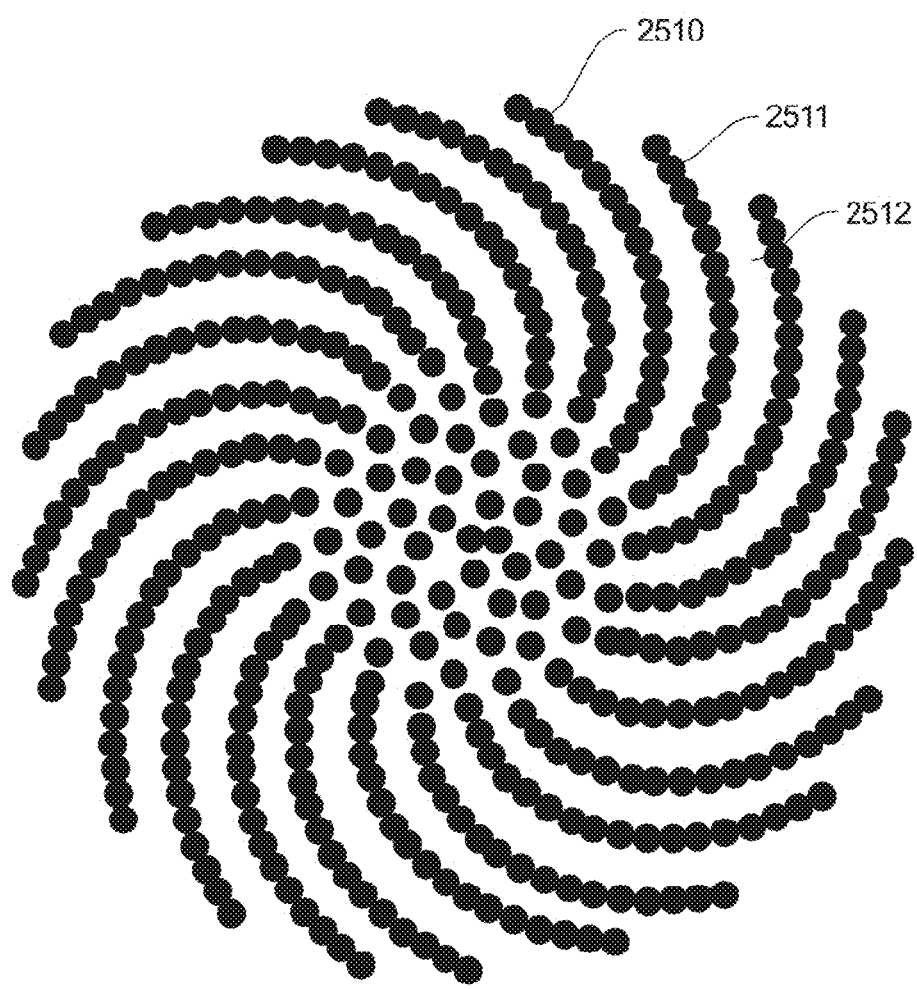
FIGS. 25B-D include illustrations of distributions in accordance with an embodiment.
Figure 25C:
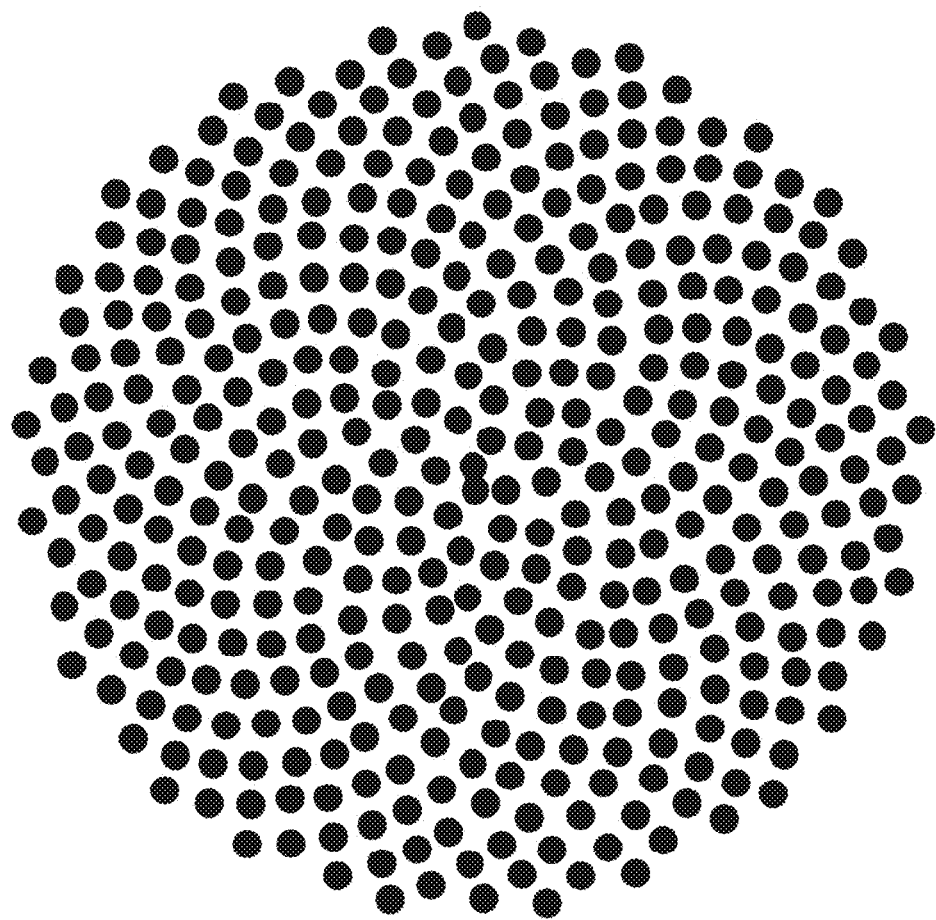
Figure 25D:
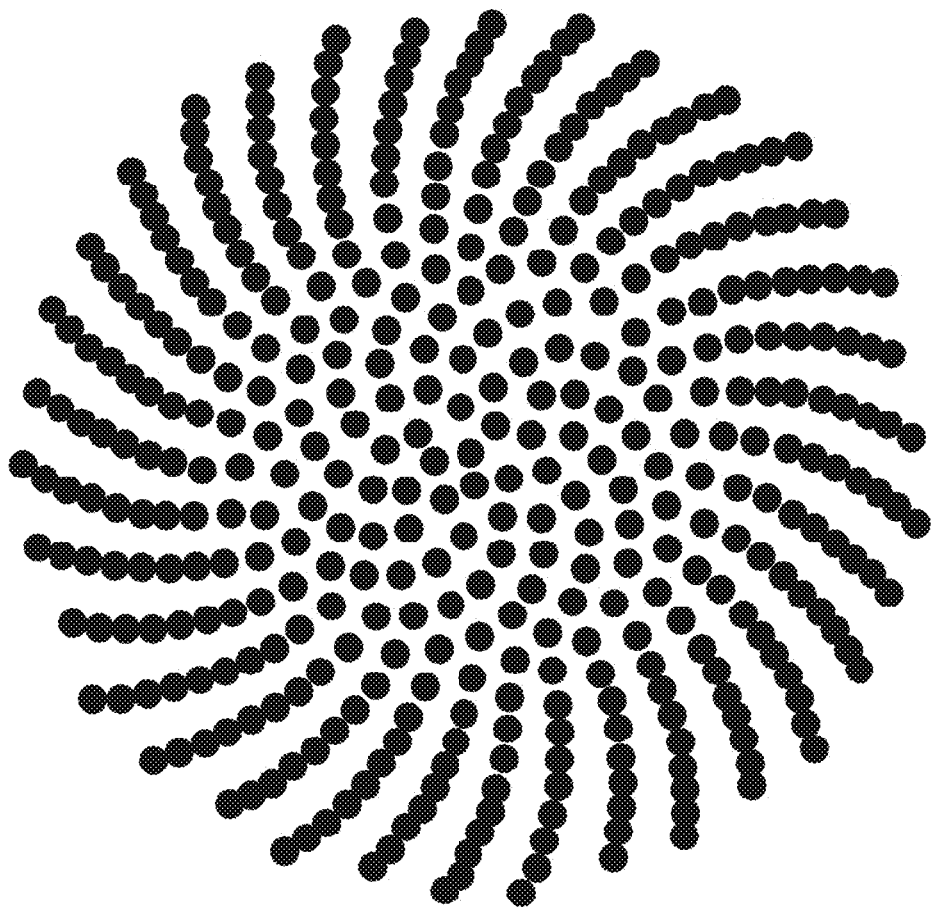

FIGS. 25B-D include images of other distributions that may be used to control placement and rotational orientation of the abrasive particles in a plane, group, set, or collection, such that the abrasive particles are arranged in a particular distribution within the body of the abrasive article. Each of the distributions illustrated in FIGS. 25B-D can represent distributions of abrasive particles that may occur in any plane, group, set, or collection within the embodiments herein. Each of the dots in the images of FIGS. 25B-D can represent the placement of an abrasive particle, such as a shaped abrasive particle and/or elongated abrasive particle. The distributions illustrated in FIGS. 25B-D may also represent a corresponding distribution of cavities for a form or production tool used to place the abrasive particles in the body of the abrasive article.

Moreover it will be appreciated that any of the distributions illustrated in the figures herein can be used together or separately. For example, in one embodiment, it may be advantageous to utilize a first type of distribution (e.g., the distribution of FIG. 25B) for a first portion of abrasive particles (e.g., shaped abrasive particles and/or elongated abrasive particles in a plane, group, collection, or set) and a second type of distribution (e.g., the distribution of FIG. 25C) for a second portion of abrasive particles (e.g., shaped abrasive particles and/or elongated abrasive particles in a plane, group, collection, sector, or set).

Additionally, any one of the distributions provided herein can utilize different groups of abrasive particles where the abrasive particles of one group have at least one abrasive characteristic that is different compared to abrasive particles of another group. For example, the abrasive article may include a distribution including a first group of abrasive particles and a second group of abrasive particles, wherein the first group and second group have at least one abrasive characteristic that is distinct from each other. Suitable examples of abrasive characteristics include hardness, composition, average particle size, average grain size, fracture toughness, two-dimensional shape, tip sharpness, tip angle, aspect ratio, or any combination thereof. For example, in one embodiment, a first portion of a distribution, such as the spiral portion 2510 of FIG. 25B, can include a first type of shaped abrasive particle having a first two-dimensional shape and a second portion of the distribution, such as the spiral portion 2511 of FIG. 25B can include a second type of abrasive particle, such as an elongated particle or a diluent particle (e.g., an unshaped abrasive particle). It will be appreciated that any portions of any distribution may utilize different groups of abrasive particles where the groups have at least one abrasive characteristic that is distinct from the abrasive particles in another group.

Moreover, it will be appreciated that any two portions of a distribution may utilize abrasive particles having a different orientation characteristic. Exemplary orientation characteristics can include a predetermined rotational orientation, a predetermined lateral axis rotational orientation, a predetermined vertical axis rotational orientation, or any combination thereof. For example, a first portion of a distribution (e.g., the spiral portion 2510) can include abrasive particles having a first predetermined rotational orientation and a second portion of the distribution (e.g., the spiral portion 2511) can include abrasive particles having a second predetermined rotational orientation that is different than the first predetermined rotational orientation. It will be appreciated that other controlled orientation characteristics may differ between different portions of the distribution. Controlling one or more orientation characteristics of abrasive particles between two different portions of a distribution may facilitate efficient grinding and limit the wear of the abrasive article that may affect grinding performance and life.

It will also be appreciated that one or more orientation characteristics may differ between particles within the same portion. As described in embodiments herein, any portion of a distribution including, for example, the spiral portion 2510, may include different groups of abrasive particles, which may have different abrasive characteristics and/or orientation characteristics with respect to each other.

It will also be appreciated that different regions of the abrasive article, such as different axial planes, radial planes, and the like, can utilize different distributions. For example, in one embodiment, a first radial plane of the body can include a first distribution, such as the distribution illustrated in FIG. 25B. And a second radial plane, which can be disposed under or over the first radial plane within the body of the abrasive article may utilize a second distribution that is different from the first distribution.

In still another embodiment, various regions within the abrasive body may utilize the same distribution. For example, a first radial plane and a second radial plane, which are separated from each other by some axial distance, can utilize the same distribution, such as the distribution illustrated in FIG. 25B. In yet a more particular embodiment, it is contemplated that the same distribution may be utilized in different regions (e.g., radial plane) within the body of the abrasive, but the distributions may be rotated relative to each other to facilitate suitable staggering of the particles. For example, a first radial plane may utilize the distribution illustrated in FIG. 25B and a second radial plane overlying the first radial plane may utilize the same distribution, but the distribution in the second radial plane can be rotated relative to the distribution in the first radial plane, such that abrasive particles in the same positions within the two distributions are not overlapping, but staggered relative to each other when viewing the radial planes top down.

In still another embodiment, a portion of the abrasive article (e.g., such as a group of abrasive particles in the same radial plane) may include a combination of abrasive particles arranged in a particular distribution combined with other particles having a random arrangement. For example, a first group of abrasive particles, such as shaped abrasive particles, may be present in a portion of the abrasive article including, for example, within the same radial plane and distributed in the manner as illustrated in FIG. 25B. A second group of abrasive particles, such as diluent particles, may then be deposited at positions between the positions occupied by the first group of abrasive particles, such as within the gap regions 2512 between the spiral portions 2510 and 2511 that are associated with the first group of abrasive particles. Filling gap regions that exist between the positions associated with a particular distribution may facilitate improved grinding efficiency and may further limit the wear of the abrasive article during operation of the abrasive article. It will be appreciated that such an article can be formed by first depositing the first group of abrasive particles in a controlled manner according to any of the techniques described herein, and later depositing one or more other groups of abrasive particles in the gap regions.

Figure 26:
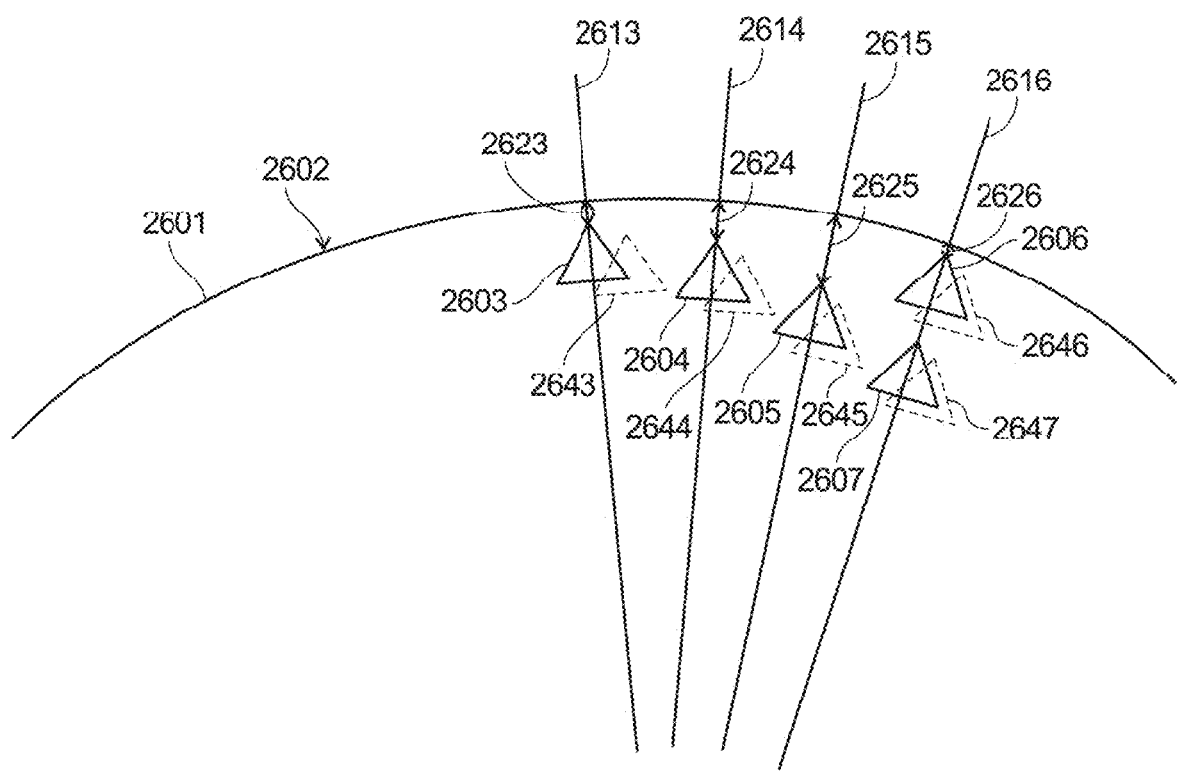
FIG. 26 includes a top-down illustration of a portion of an abrasive article in accordance with an embodiment.

FIG. 26 includes a top-down illustration of a portion of an abrasive article according to an embodiment. As illustrated, the abrasive article 2601 includes a side surface 2602 and abrasive particles 2603, 2604, 2605, 2606 and 2607 (2603-2607) contained within a first radial plane. The abrasive article further includes abrasive particles 2643, 2644, 2645, 2646 and 2647 contained in a second radial plane underlying the first radial plane. As further illustrated, the abrasive particle 2603 is spaced apart from the side surface 2602 by a spacing distance 2623, which is measured as the shortest distance along the radial axis 2613 between the side surface 2602 and a point on the abrasive particle 2603 closest to the side surface 2602 when viewed top down. The abrasive particle 2604 also includes a spacing distance 2624 along the radial axis 2614. The abrasive particle 2605 also includes a spacing distance 2625 along the radial axis 2615. The abrasive particle 2606 also includes a spacing distance 2626. This difference in spacing distances can define a staggered relationship between each of the adjacent abrasive particles 2603-2606 within the first radial plane, such that as the abrasive article 2601 wears along the side surface, fresh particles are constantly exposed, which may facilitate improved efficiency and life of the abrasive article.

The abrasive particles may also be staggered relative to each other in different radial planes. For example, as illustrated in FIG. 26, the abrasive particle 2643, which is underlying the abrasive particle 2603, can be staggered relative to the abrasive particle 2603, such that one particle is not completely underlying the other abrasive particle. As illustrated in FIG. 26, as viewed top down, at least a portion of the abrasive particle 2643 is offset from the abrasive particle 2603, such that the particles are not in perfect axial alignment relative to each other. Stated alternatively, as viewed top down and as shown, at least a portion of the abrasive particle 2643 is not underlying the abrasive particle 2603. Ensuring that at least a portion of the abrasive particles in different radial planes are not in alignment with one another and have an axially and radially staggered relationship with respect to each other may facilitate improved efficiency and life of the abrasive article. It will be appreciated that when evaluating the axial and/or radial staggering of abrasive particles in different radial planes, such staggering is to be measured between the closest two particles or two immediately adjacent particles that are separated from each other by the smallest axial distance. FIG. 26 further illustrates the same relationship of axial and radial staggering for each of the pairs of abrasive particles, including abrasive particles 2604 and 2644, abrasive particles 2605 and 2645, abrasive particles 2606 and 2646, and abrasive particles 2607 and 2647.

It will further be appreciated that the radial and/or axial staggering of abrasive particles may be controlled by controlling one or more rotational orientation characteristics of the abrasive particles. In yet another embodiment, the radial and/or axial staggering of abrasive particles may be controlled by controlling one or more placement angles of the abrasive particles.

Figure 27:
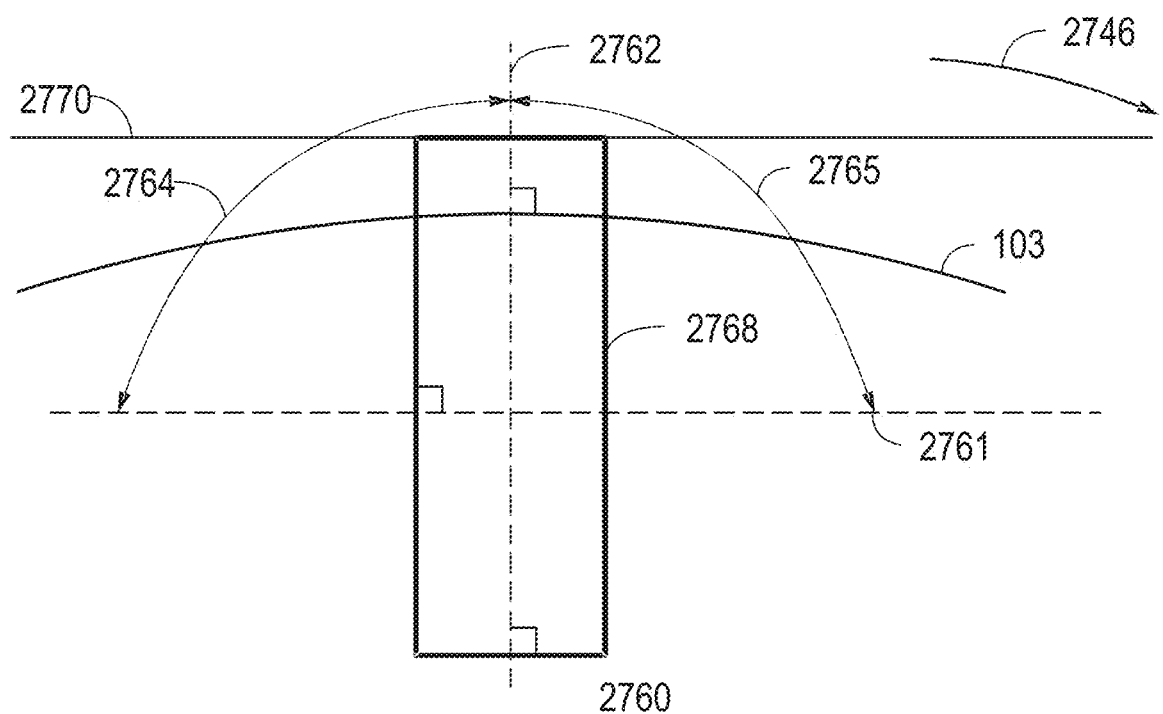
FIG. 27 includes a top-down illustration of a portion of an abrasive article including an abrasive particle according to an embodiment.

In one aspect, the placement angle and/or the rake angle can be controlled to improve performance FIG. 27 illustrates an abrasive particle 2760 located at a side surface 103. As illustrated, the abrasive particle 2760 has a placement angle (Ap) of 0 degrees because the longitudinal axis 2762 of the abrasive particle 2760, which is also a radial line of symmetry for this particular abrasive particle in this orientation, is parallel to the radial axis that extends through the abrasive particle 2760 and perpendicular to a tangent at the side surface 103. In this particular instance, the longitudinal axis is the same as the radial axis, and thus the angle between the two axes is zero degrees. The abrasive particle 2760 also has a rake angle of 0 degrees because the cutting surface 2768 is perpendicular to the workpiece surface 2770. Accordingly, the rake angle is the angle between the cutting surface of the abrasive particle and a line perpendicular to the workpiece surface. Moreover, a positive rake angle occurs where the cutting surface points toward the intended grinding direction, such as in the direction 2765, and a negative rake angle occurs where the cutting surface points away from the intended grinding direction, such as in the direction 2764. The abrasive particle 2760 is rod-shaped and has two lines of symmetry 2761 and 2762. Accordingly, the abrasive particle 2760 can have a placement angle of 0 degrees, a negative placement angle range 2764 less than 0 degrees to as low as −90 degrees, or a positive placement angle range 2765 greater than 0 degrees to as high as +90 degrees. Likewise, the abrasive particle 2760 can have a rake angle range of as low as −90 degrees to as high as +90 degrees.

Although the abrasive particle 2760 is rod-shaped, it will be appreciated that the abrasive particle 2760 can be shaped or elongated into other shapes. It will also be appreciated, as described in other embodiments herein, that the abrasive article can include multiple and different types of groups of abrasive particles that can differ from each other based on various features, properties, and orientation. For example, the abrasive article can be made such that it includes first group of abrasive particles having approximately the same first placement angle and/or rake angle. The abrasive article may further include a second group of abrasive particles having approximately the same second placement angle and/or rake angle. In one embodiment, the first placement angle and/or rake angle can be approximately the same as the second placement angle and/or rake angle. Still, in another embodiment, the first placement angle and/or rake angle can be different than the second placement angle and/or rake angle.

The first group of abrasive particles and/or the second group of abrasive particles can have a standard deviation of placement angle and/or rake angle of not greater than 20 degrees, not greater than 18 degrees, not greater than 16 degrees, not greater than 14 degrees, not greater than 12 degrees, not greater than 10 degrees, not greater than 9 degrees, not greater than 8 degrees, not greater than 7 degrees, or even not greater than 6 degrees. Further, the first group of abrasive particles and/or the second group of abrasive particles can have a standard deviation of placement angle and/or rake angle of at least 0.01 degrees, such as at least 0.1 degrees, or even at least 1 degree.

In another aspect, as described in other embodiments herein, any portion of the abrasive particles contained in the abrasive article can be radially and/or axially staggered. Notably, in at least one embodiment, the abrasive article can include at least a first group and second group of abrasive particles that can be radially and/or axially staggered relative to each other. In one aspect, the abrasive particles of the first group of abrasive particles can be arranged in a controlled distribution relative to each other, and the abrasive particles of the second group of abrasive particles can be arranged in a controlled distribution relative to each other.

As used herein, the term "not greater than" is used with respect to positive and negative angles to denote a maximum angle value, whether positive or negative, and the term "at least" is used with respect to positive and negative angles to denote a minimum angle value, whether positive or negative. For example, reference to a range of angles having one limit of not greater than −10 degrees is reference to an upper limit, such that it includes, for example, angles of −12 degrees, −15 degrees and the like. Correspondingly, a limit of not greater than −10 degrees excludes angles having a value of, for example, −2 degrees, 0 degrees, 10 degrees and the like.

In one aspect, the abrasive article can be formed such that at least a portion of the abrasive particles (e.g., a first group of abrasive particles) can have a particular placement angle that may facilitate improved performance of the abrasive article. For example, each abrasive particle can have a placement angle of not greater than +90 degrees or not greater than +85 degrees or not greater than +75 degrees or not greater than +65 degrees or not greater than +55 degrees or not greater than +45 degrees or not greater than +40 degrees or not greater than +35 degrees or not greater than +30 degrees or not greater than +25 degrees or not greater than +20 degrees or not greater than +15 degrees or not greater than +10 degrees or not greater than +5 degrees or not greater than +0 degrees or not greater than −5 degrees or not greater than −10 degrees or not greater than −15 degrees or not greater than −20 degrees or not greater than −25 degrees or not greater than −30 degrees or not greater than −35 degrees or not greater than −40 degrees or not greater than −45 degrees or not greater than −55 degrees or not greater than −65 degrees or not greater than −75 degrees or not greater than −85 degrees. In another not limiting embodiment, at least a portion of the abrasive particles of the abrasive article, such as abrasive particle of the first group of abrasive particles, can have a placement angle of at least −90 degrees or at least −85 degrees or at least −75 degrees or at least −65 degrees or at least −55 degrees or at least −45 degrees or at least −40 degrees or at least −35 degrees or at least −30 degrees or at least −25 degrees or at least −20 degrees or at least −15 degrees or at least −10 degrees or at least −5 degrees or at least +0 degrees or at least +5 degrees or at least +10 degrees or at least +15 degrees or at least +20 degrees or at least +25 degrees or at least +30 degrees or at least +35 degrees or at least +40 degrees or at least +45 degrees or at least +55 degrees or at least +65 degrees or at least +75 degrees or at least +85 degrees. It will be appreciated that the portion of abrasive particles can have any placement angle within a range including any of the minimum and maximum angles noted above.

According to one embodiment, at least a portion of the abrasive particles can have a placement angle within a range of −90 degrees to +90 degrees, such as within a range of −85 degrees to +85 degrees or within a range of −75 degrees to +75 degrees or within a range of −65 degrees to +65 degrees or within a range of −55 degrees to +55 degrees or within a range of −45 degrees to +45 degrees or within a range of −40 degrees to +40 degrees or within a range of −35 degrees to +35 degrees or within a range of −30 degrees to +30 degrees or within a range of −25 degrees to +25 degrees or within a range of −20 degrees to +20 degrees or within a range of −15 degrees to +15 degrees or within a range of −10 degrees to +10 degrees or within a range of −5 degrees to +5 degrees.

In another aspect, at least a portion of the abrasive particles of the abrasive article, such as a first group of abrasive particles, can have a particular rake angle that may facilitate improved performance. For example, the abrasive particles can have a rake angle of not greater than +90 degrees or not greater than +85 degrees or not greater than +75 degrees or not greater than +65 degrees or not greater than +55 degrees or not greater than +45 degrees or not greater than +40 degrees or not greater than +35 degrees or not greater than +30 degrees or not greater than +25 degrees or not greater than +20 degrees or not greater than +15 degrees or not greater than +10 degrees or not greater than +5 degrees or not greater than +0 degrees or not greater than −5 degrees or not greater than −10 degrees or not greater than −15 degrees or not greater than −20 degrees or not greater than −25 degrees or not greater than −30 degrees or not greater than −35 degrees or not greater than −40 degrees or not greater than −45 degrees or not greater than −55 degrees or not greater than −65 degrees or not greater than −75 degrees or not greater than −85 degrees with respect to a workpiece surface that is parallel to the edge of the body. In another non-limiting embodiment, at least a portion of the abrasive particles, such as a first group of abrasive particles can have a rake angle of at least −90 degrees or at least −85 degrees or at least −75 degrees or at least −65 degrees or at least −55 degrees or at least −45 degrees or at least −40 degrees or at least −35 degrees or at least −30 degrees or at least −25 degrees or at least −20 degrees or at least −15 degrees or at least −10 degrees or at least −5 degrees or at least +0 degrees or at least +5 degrees or at least +10 degrees or at least +15 degrees or at least +20 degrees or at least +25 degrees or at least +30 degrees or at least +35 degrees or at least +40 degrees or at least +45 degrees or at least +55 degrees or at least +65 degrees or at least +75 degrees or at least +85 degrees with respect to a workpiece surface that is parallel to the edge of the body. It will be appreciated that the portion of abrasive particles can have any rake angle within a range including any of the minimum and maximum angles noted above.

For example, in one aspect, each abrasive particle of the first group of abrasive particles can have a rake angle of within a range of −90 degrees to +90 degrees or within a range of −85 degrees to +85 degrees or within a range of −75 degrees to +75 degrees or within a range of −65 degrees to +65 degrees or within a range of −55 degrees to +55 degrees or within a range of −45 degrees to +45 degrees or within a range of −40 degrees to +40 degrees or within a range of −35 degrees to +35 degrees or within a range of −30 degrees to +30 degrees or within a range of −25 degrees to +25 degrees or within a range of −20 degrees to +20 degrees or within a range of −15 degrees to +15 degrees or within a range of −10 degrees to +10 degrees or within a range of −5 degrees to +5 degrees with respect to a workpiece surface that is parallel to the edge of the body.

Figure 28:
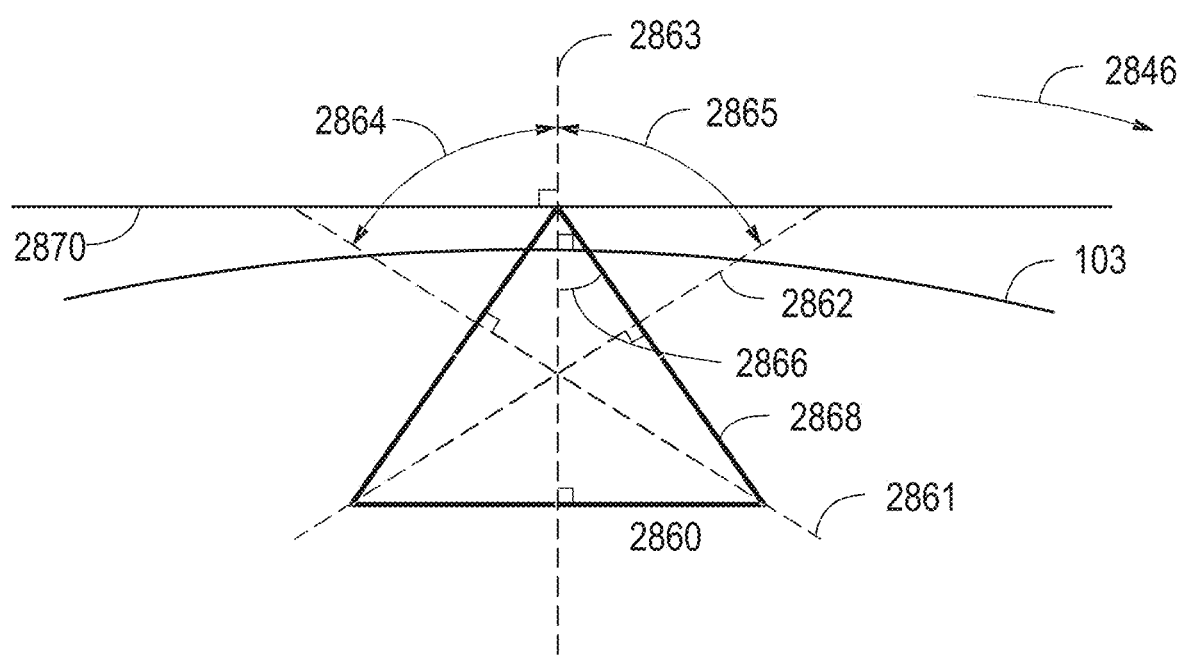
FIG. 28 includes a top-down illustration of a portion of an abrasive article including an abrasive particle according to an embodiment.

FIG. 28 illustrates an abrasive particle 2860 located at a side surface 103. As illustrated, the abrasive particle 2860 has a placement angle of 0 degrees because the longitudinal axis 2863, which is also a radial line of symmetry for this particular abrasive particle, is parallel to the radial axis that extends through the abrasive particle 2860 and perpendicular to a tangent at the side surface 103. In this particular instance, the longitudinal axis is the same as the radial axis, and thus the angle between the two axes is zero degrees. The abrasive particle 2860 is triangular and has three lines of symmetry 2861, 2862, and 2863. Accordingly, the abrasive particle 2860 may be considered to have three longitudinal axes, including longitudinal axis 2861, longitudinal axis 2862, or longitudinal axis 2863. When there are multiple longitudinal axes, the placement angle is determined using the longitudinal axis that forms the smallest angle relative to the radial axis. Longitudinal axis 2861 and longitudinal axis 2862 each form an angle of 120 degrees with the radial axis. Where the longitudinal axis extends to the right of the radial axis (based on the placement of the tip closest to the longitudinal axis relative to the radial axis), the placement angle is positive. Where the longitudinal axis extends to the left of the radial axis (based on the placement of the tip closest to the longitudinal axis relative to the radial axis), the placement angle is negative. Thus, longitudinal axis 2861 forms a placement angle of +120 degrees with the radial axis, because the tip of the triangle through which the longitudinal axis extends is to the right of the radial axis 2863. Correspondingly, the longitudinal axis 2862 forms a placement angle of −120 degrees with the radial axis. The smallest placement angle is formed by longitudinal axis 2863, having a value of 0 degrees. Notably, in the depicted orientation, the longitudinal axis 2863 of the abrasive particle 2860 is the same as the radial axis 2863. The abrasive particle 2860 can have a placement angle of 0 degrees, a negative placement angle of 0 degrees to −60 degrees, or a positive placement angle of 0 degrees to +60 degrees.

In the illustrated embodiment of FIG. 28, the abrasive particle 2860 has a rake angle 2866 of −30 degrees because the cutting surface 2868 is 30 degrees offset from an axis extending normal to the workpiece surface 2870 at the point of contact between the abrasive particle 2860 and the workpiece surface 2870. The axis extending normal to the workpiece surface 2870 is the same as the radial axis 2863 in the illustrated embodiment. The rake angle has a negative value, because the cutting surface 2868 is offset toward the intended grinding direction 2846 (i.e., it extends between the workpiece surface 2870 and the normal to the workpiece surface (i.e., the radial axis 2863). The cutting surface 2868 is the surface of the abrasive particle that is configured to first contact the workpiece based on the exposure of the particle and the grinding direction. The abrasive particle 2860 of the illustrated embodiment can be rotated to have various rake angles that extend over a range of as low as −90 degrees to as high as +30 degrees.

Figure 29:
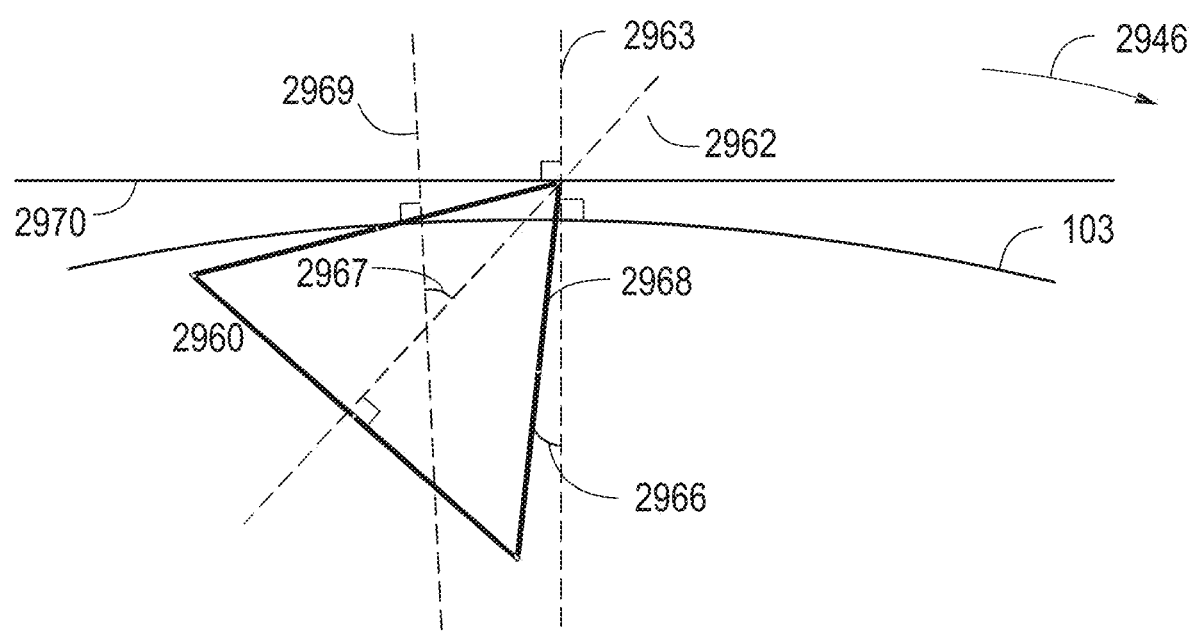
FIG. 29 includes a top-down illustration of a portion of an abrasive article including an abrasive particle according to an embodiment.

For example, FIG. 29 shows an abrasive particle 2960 located at a side surface 103. As illustrated, the abrasive particle 2960 has a placement angle 2967 of +42 degrees because the longitudinal axis 2962 forms a 42-degree angle with a radial axis 2969 that extends through the midpoint of the major surface of the abrasive particle 2960 and is perpendicular to a tangent at the side surface 103. As illustrated, the placement angle is positive for the reasons noted above.

According to the illustrated embodiment, the abrasive particle 2960 can has a rake angle 2966 of +12 degrees because the cutting surface 2968 is 12 degrees offset from the axis 2963 (i.e., rake angle axis), which extends perpendicular to the workpiece surface 2970 and is offset toward the intended grinding direction 2946. Although the abrasive particles 2860 and 2960 are triangular, it will be appreciated that other shapes may also be used.

A first group of abrasive particles can have approximately the same first placement angle and/or rake angle. For example, FIG. 5A illustrates a first group of abrasive particles 501 including abrasive particles 502, 503, 504, 505, and 506. The first group of abrasive particles 501 can have approximately the same first placement angle and/or rake angle. There can also be a second group of abrasive particles 521 including abrasive particles 522, 523, 524, 525, and 526. The second group of abrasive particles 521 can have approximately the same second placement angle and/or rake angle. The first placement angle and/or rake angle can be approximately the same as the second placement angle and/or rake angle, or the first placement angle and/or rake angle can be different than the second placement angle and/or rake angle. The first group of abrasive particles 501 and/or the second group of abrasive particles 502 can have a standard deviation of placement angle and/or rake angle of not greater than 20 degrees, not greater than 18 degrees, not greater than 16 degrees, not greater than 14 degrees, not greater than 12 degrees, not greater than 10 degrees, not greater than 9 degrees, not greater than 8 degrees, not greater than 7 degrees, or even not greater than 6 degrees. Further, the first group of abrasive particles 501 and/or the second group of abrasive particles 502 can have a standard deviation of placement angle and/or rake angle of at least 0.01 degrees, such as at least 0.1 degrees, or even at least 1 degree. It will be appreciated that the standard deviation of the placement angle and/or rake angle can be within a range including any of the minimum maximum values noted above. The first group of abrasive particles 501 can be located in the same or different axial planes and at the same or different radial distances as the second group of abrasive particles 521. Although the first group of abrasive particles 501 and the second group of abrasive particles 521 are triangular, it will be appreciated that other shapes may also be used. In another aspect, an abrasive particle of the first group of abrasive particles can be radially and/or axially staggered relative to an abrasive particle of the second group of abrasive particles. In another aspect, the abrasive particles of the first group of abrasive particles can be arranged in a controlled distribution relative to each other, and the abrasive particles of the second group of abrasive particles can be arranged in a controlled distribution relative to each other.

In one aspect, at least a portion of the abrasive particles having a generally triangular two-dimensional shape may have a particular placement angle, that can facilitate improved performance. For example, the abrasive particles can have a placement angle of not greater than +40 degrees or not greater than +35 degrees or not greater than +30 degrees or not greater than +25 degrees or not greater than +20 degrees or not greater than +15 degrees or not greater than +10 degrees or not greater than +5 degrees or not greater than +4 degrees or not greater than +3 degrees or not greater than +2 degrees or not greater than +1 degree or not greater than +0 degrees or not greater than −1 degree or not greater than −2 degrees or not greater than −3 degrees or not greater than −4 degrees or not greater than −5 degrees or not greater than −10 degrees or not greater than −15 degrees or not greater than −20 degrees or not greater than −25 degrees or not greater than −30 degrees or not greater than −35 degrees or not greater than −40 degrees or not greater than −45 degrees or not greater than −50 degrees or not greater than −55 degrees. In yet another non-limiting embodiment, at least a portion of the abrasive particles can have a placement angle of at least −60 degrees or at least −55 degrees or at least −50 degrees or at least −45 degrees or at least −40 degrees or at least −35 degrees or at least −30 degrees or at least −25 degrees or at least −20 degrees or at least −15 degrees or at least −10 degrees or at least −5 degrees or at least −4 degrees or at least −3 degrees or at least −2 degrees or at least −1 degree or at least +0 degrees or at least +1 degree or at least +2 degrees or at least +3 degrees or at least +4 degrees or at least +5 degrees or at least +10 degrees or at least +15 degrees or at least +20 degrees or at least +25 degrees or at least +30 degrees or at least +35 degrees. It will be appreciated that the portion of abrasive particles can have any placement angle within a range including any of the minimum and maximum angles noted above.

In another aspect, at least a portion of abrasive particles having a triangular two-dimensional shape, such as a first group of abrasive particles, can have a placement angle of within a range of −60 degrees to +40 degrees or within a range of −50 degrees to +35 degrees or within a range of −40 degrees to +30 degrees or within a range of −30 degrees to +25 degrees or within a range of −20 degrees to +20 degrees or within a range of −15 degrees to +15 degrees or within a range of −10 degrees to +10 degrees or within a range of −5 degrees to +5 degrees or within a range of −4 degrees to +4 degrees or within a range of −3 degrees to +3 degrees or within a range of −2 degrees to +2 degrees or within a range of −1 degree to +1 degree.

In one non-limiting embodiment, at least a portion of the abrasive particles, such as abrasive particles of a first group, can have a placement angle of not greater than +60 degrees or not greater than +58 degrees or not greater than +56 degrees or not greater than +54 degrees or not greater than +52 degrees or not greater than +50 degrees or not greater than +48 degrees or not greater than +46 degrees. In one non-limiting embodiment, at least a portion of the abrasive particles, such as abrasive particles of a first group, can have a placement angle of at least +44 degrees or at least +46 degrees or at least +48 degrees or at least +50 degrees or at least +52 degrees or at least +54 degrees or at least +56 degrees or at least +58 degrees. It will be appreciated that the portion of abrasive particles can have any placement angle within a range including any of the minimum and maximum angles noted above.

In another aspect, at least a portion of abrasive particles, such as abrasive particles of a first group, can have a placement angle of within a range of +44 degrees to +60 degrees or within a range of +46 degrees to +58 degrees or within a range of +48 degrees to +56 degrees or within a range of +50 degrees to +54 degrees.

In another aspect, at least a portion of abrasive particles having a triangular two-dimensional shape can have a rake angle of not greater than +10 degrees or not greater than +5 degrees or not greater than +0 degrees or not greater than −5 degrees or not greater than −10 degrees or not greater than −15 degrees or not greater than −20 degrees or not greater than −25 degrees or not greater than −26 degrees or not greater than −27 degrees or not greater than −28 degrees or not greater than −29 degrees or not greater than −30 degrees or not greater than −31 degrees or not greater than −32 degrees or not greater than −33 degrees or not greater than −34 degrees or not greater than −35 degrees or not greater than −40 degrees or not greater than −45 degrees or not greater than −50 degrees or not greater than −55 degrees or not greater than −60 degrees or not greater than −65 degrees or not greater than −70 degrees or not greater than −75 degrees or not greater than −80 degrees or not greater than −85 degrees. In another non-limiting embodiment, at least a portion of the abrasive particles can have a rake angle of at least −90 degrees or at least −85 degrees or at least −80 degrees or at least −75 degrees or at least −70 degrees or at least −65 degrees or at least −60 degrees or at least −55 degrees or at least −50 degrees or at least −45 degrees or at least −40 degrees or at least −35 degrees or at least −34 degrees or at least −33 degrees or at least −32 degrees or at least −31 degrees or at least −30 degrees or at least −29 degrees or at least −28 degrees or at least −27 degrees or at least −26 degrees or at least −25 degrees or at least −20 degrees or at least −15 degrees or at least −10 degrees or at least −5 degrees or at least +0 degrees or at least +5 degrees with respect to a workpiece surface that is parallel to the edge of the body. It will be appreciated that the portion of abrasive particles can have a rake angle within a range including any of the minimum and maximum values noted above.

In another aspect, at least a portion of the abrasive particles, such as a first group of abrasive particles, can have a rake angle of within a range of −90 degrees to +10 degrees or within a range of −80 degrees to +5 degrees or within a range of −70 degrees to +0 degrees or within a range of −60 degrees to −5 degrees or within a range of −50 degrees to −10 degrees or within a range of −45 degrees to −15 degrees or within a range of −40 degrees to −20 degrees or within a range of −35 degrees to −25 degrees or within a range of −34 degrees to −26 degrees or within a range of −33 degrees to −27 degrees or within a range of −32 degrees to −28 degrees or within a range of −31 degrees to −29 degrees with respect to a workpiece surface that is parallel to the edge of the body.

In another aspect, abrasive particles can be incorporated into a fixed abrasive article and used to grind a workpiece. According to this method, a workpiece is provided, and a fixed abrasive article is provided. The fixed abrasive article can have a body having abrasive particles contained within a bond material. The abrasive particles can include shaped abrasive particles or elongated abrasive particles having an aspect ratio of length:width of at least 1.1:1. Each of the shaped abrasive particles or elongated abrasive particles can have a placement angle within a range of +90 to −90 degrees and/or a rake angle within a range of +90 to −90 degrees. The fixed abrasive article can be used to grind the workpiece.

Figure 31:
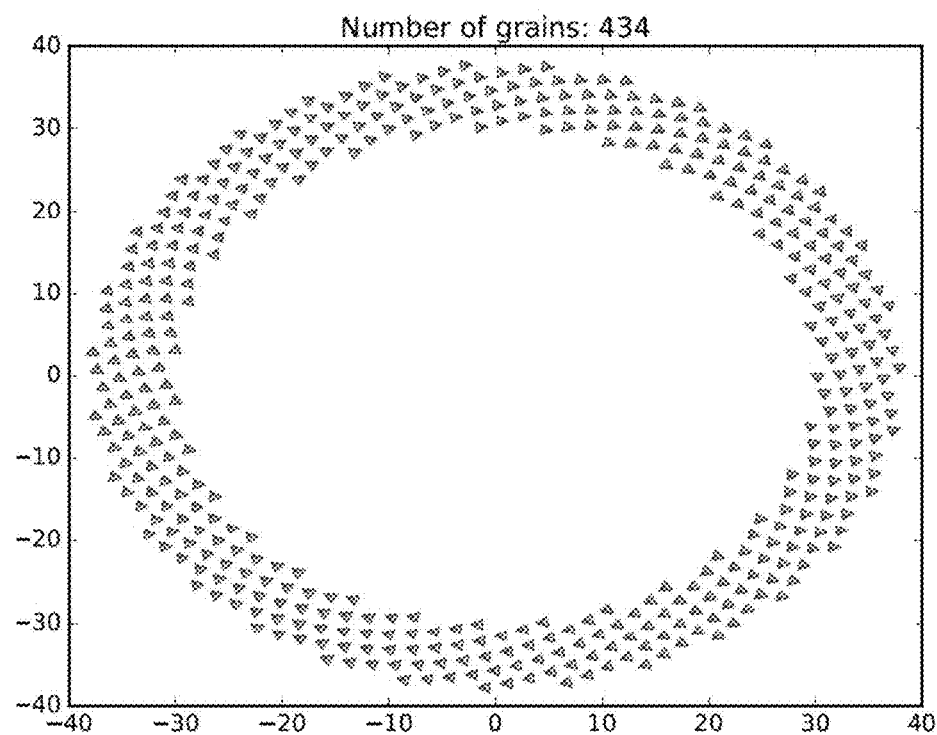
FIG. 31 is an illustration of a schematic of a distribution of shaped abrasive particles (434 particles, zero degree (0°) rake angle) in accordance with an embodiment.
Figure 32:
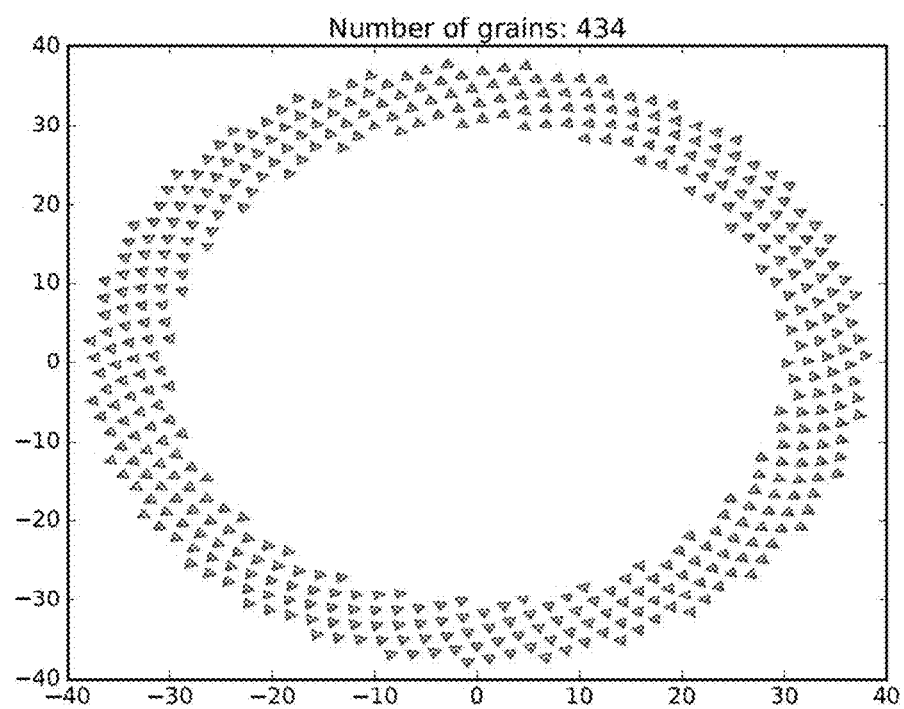
FIG. 32 is an illustration of a schematic of a distribution of shaped abrasive particles (434 particles, minus thirty degree (−30°) rake angle) in accordance with an embodiment.
Figure 33:
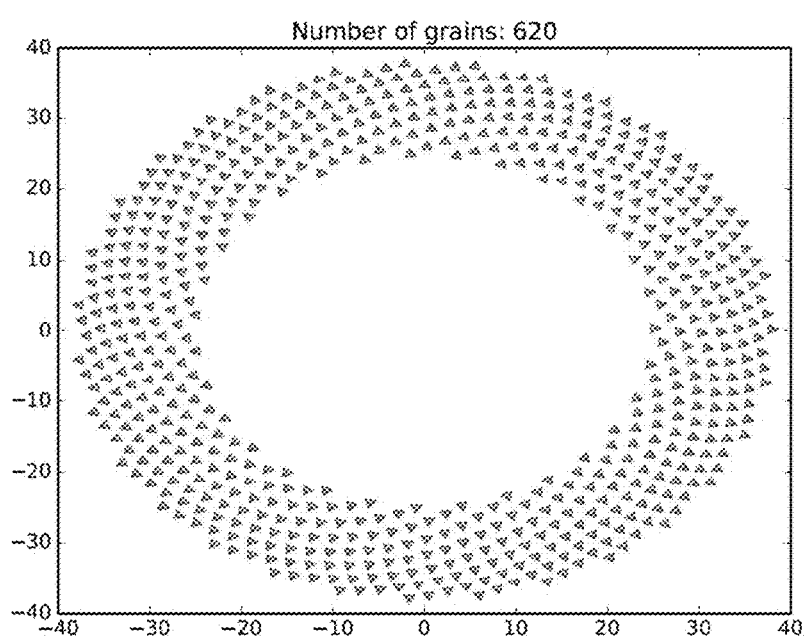
FIG. 33 is an illustration of a schematic of a distribution of shaped abrasive particles (620 particles, minus thirty degree (−30°) rake angle) in accordance with an embodiment.

FIG. 31 is an illustration of a schematic of a distribution of shaped abrasive particles (434 particles, zero degree (0°) rake angle) in accordance with an embodiment. FIG. 32 is an illustration of a schematic of a distribution of shaped abrasive particles (434 particles, minus thirty degree (−30°) rake angle) in accordance with an embodiment. FIG. 33 is an illustration of a schematic of a distribution of shaped abrasive particles (620 particles, minus thirty degree (−30°) rake angle) in accordance with an embodiment. The distributions are illustrative of a single layer of abrasive grains, such as for a single layer abrasive disc, or a single layer of an abrasive thin wheel. The number of abrasive grains per layer can vary and typically can be in a range of 100 to 5000 abrasive grains, such as 200 to 2000 abrasive grains, such as 300 to 1000 per layer. The rake angle of the abrasive grains can vary. In particular embodiments, the number of abrasive grains per layer can be from 300 to 1000 per layer, such as 400 to 700 abrasive grains per layer. In particular embodiments, the rake angle of the abrasive grains can vary from minus thirty degrees)(−30° to plus thirty degrees)(+30°.

Figure 34:
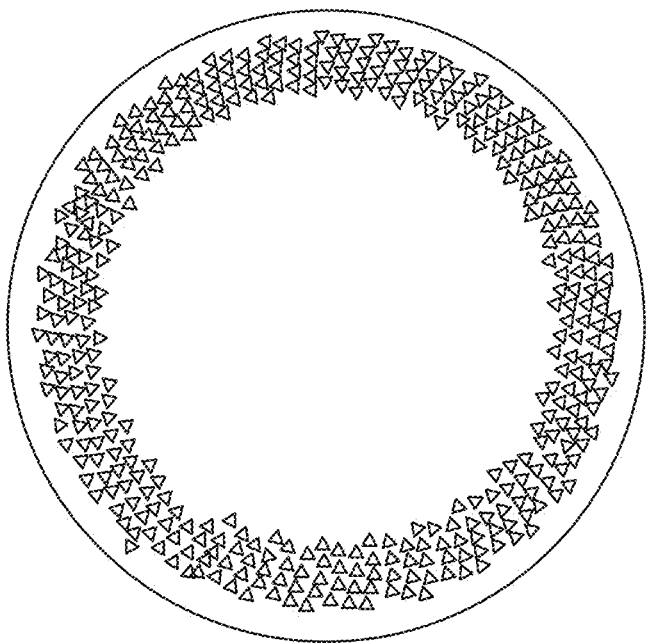
FIG. 34 is photograph of a single layer abrasive disc that includes a distribution of shaped abrasive particles (434 particles, zero degree (0°) rake angle) in a bond material in accordance with an embodiment.
Figure 35:
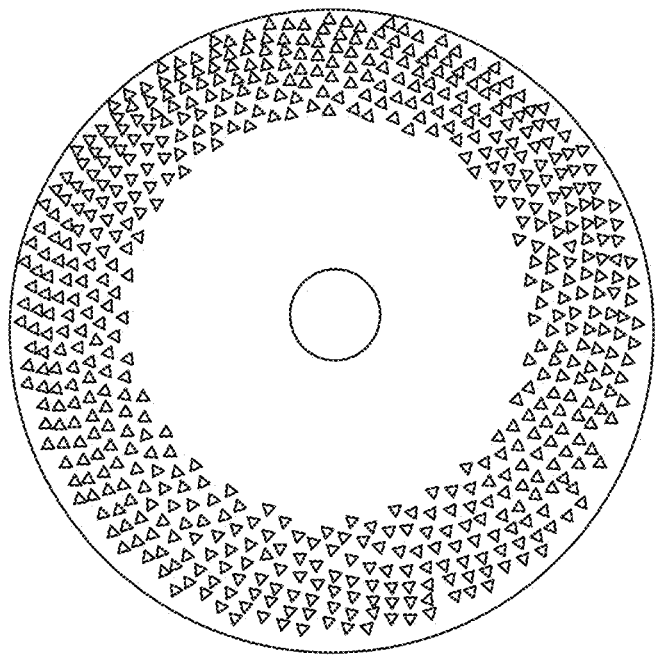
FIG. 35 is photograph of a single layer abrasive disc with punched hole that includes a distribution of shaped abrasive particles (620 particles, minus thirty degree (−30°) rake angle) in a bond material in accordance with an embodiment.

FIG. 34 is photograph of a single layer abrasive disc that includes a distribution of shaped abrasive particles (434 particles, zero degree (0°) rake angle) in a bond material in accordance with an embodiment. FIG. 35 is photograph of a single layer abrasive disc with punched hole that includes a distribution of shaped abrasive particles (620 particles, minus thirty degree (−30°) rake angle) in a bond material in accordance with an embodiment. An abrasive thin wheel can be comprised of multiple single layer abrasive discs, which can be the same or different, to form a thin wheel having a desired thickness.

Figure 36:
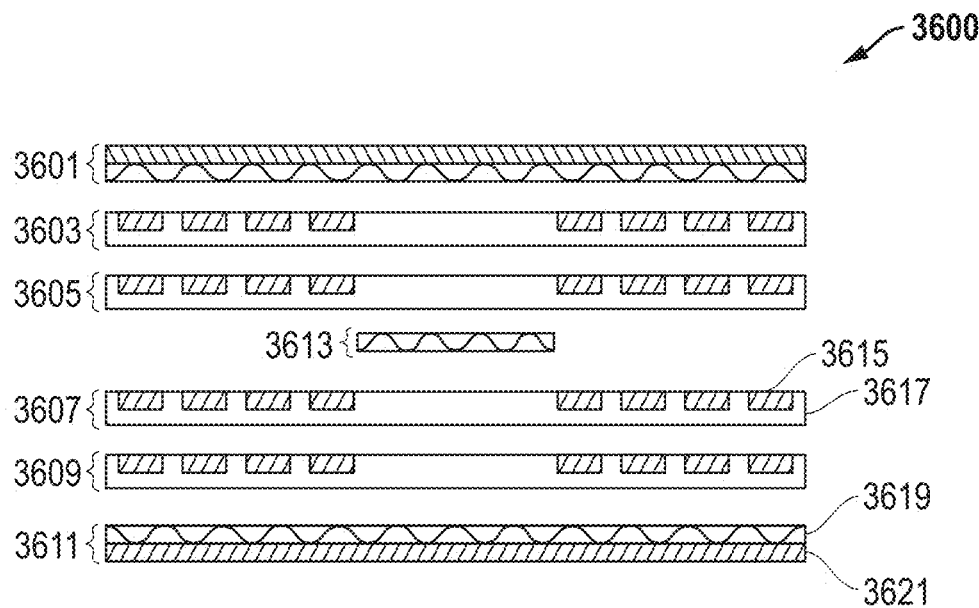
FIG. 36 is an illustration of a cross-sectional, exploded view of an abrasive article (thin wheel) comprising multiple single layer abrasive discs and reinforcing web layers, where the single layer discs include abrasive particles disposed in a bond material and are arranged in a distribution in accordance with an embodiment.

FIG. 36 is 36 is an illustration of a cross-sectional, exploded view of an abrasive article (thin wheel) comprising multiple single layer abrasive discs (3603, 3605, 3607, and 3609) and reinforcing web layers (3601, 3611, and 3613). The single layer abrasive discs include abrasive particles 3615 (also called herein abrasive grains), which can be shaped abrasive particles, disposed in a bond material 3617 and are arranged in a distribution (which can comprise a specific pattern or combination of patterns) in accordance with an embodiment. The abrasive particles of each layer can be arranged so that the abrasive particles are aligned on top of each other, also called herein a "stacked" configuration.

Figure 37:
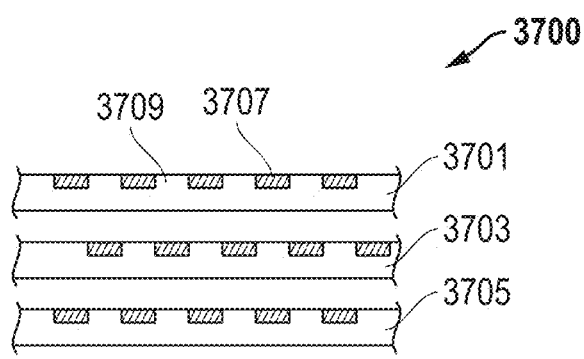
FIG. 37 is an illustration of a cross-sectional, exploded view of multiple single layer abrasive discs arranged in a "staggered" orientation in accordance with an embodiment.

FIG. 37 is an illustration of a cross-sectional, exploded view of multiple single layer abrasive discs (3701, 3703, 3705) arranged in a "staggered" orientation in accordance with an embodiment. Each disc comprises abrasive particles 3707 disposed in a bond material 3709. The abrasive particles 3707 of each layer can be arranged so that the abrasive particles are no aligned on top of each other, but are instead in a "staggered" configuration.

It will be appreciated that reference herein to any materials of the articles of the embodiments includes forming the article essentially from any of the materials mentioned. Moreover, it will be appreciated that the foregoing description also contemplates that any of the articles of the embodiments herein may be essentially free of any materials that are described as well as those materials that are not described with any of the articles. For those particular embodiments referencing the rake angle and/or placement angle of the abrasive particles, it will be appreciated that the abrasive particles may include any of the materials described herein, including for example alumina, and an alumina material having a particular average grain size.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

EMBODIMENTS

Embodiment 1

A fixed abrasive article comprising:
a body having abrasive particles contained within a bond material, the abrasive particles including a plurality of shaped abrasive particles or elongated abrasive particles having an aspect ratio of length:width of at least 1.1:1, and each of the shaped abrasive particles or elongated abrasive particles having a placement angle within a range of +90 to −90 degrees.

Embodiment 2

The fixed abrasive article of embodiment 1, wherein each of the shaped abrasive particles or elongated abrasive particles has a placement angle of not greater than +85 degrees or not greater than +75 degrees or not greater than +65 degrees or not greater than +55 degrees or not greater than +45 degrees or not greater than +40 degrees or not greater than +35 degrees or not greater than +30 degrees or not greater than +25 degrees or not greater than +20 degrees or not greater than +15 degrees or not greater than +10 degrees or not greater than +5 degrees or not greater than +0 degrees or not greater than −5 degrees or not greater than −10 degrees or not greater than −15 degrees or not greater than −20 degrees or not greater than −25 degrees or not greater than −30 degrees or not greater than −35 degrees or not greater than −40 degrees or not greater than −45 degrees or not greater than −55 degrees or not greater than −65 degrees or not greater than −75 degrees or not greater than −85 degrees.

Embodiment 3

The fixed abrasive article of embodiment 1, wherein each of the shaped abrasive particles or elongated abrasive particles has a placement angle of at least −85 degrees or at least −75 degrees or at least −65 degrees or at least −55 degrees or at least −45 degrees or at least −40 degrees or at least −35 degrees or at least −30 degrees or at least −25 degrees or at least −20 degrees or at least −15 degrees or at least −10 degrees or at least −5 degrees or at least +0 degrees or at least +5 degrees or at least +10 degrees or at least +15 degrees or at least +20 degrees or at least +25 degrees or at least +30 degrees or at least +35 degrees or at least +40 degrees or at least +45 degrees or at least +55 degrees or at least +65 degrees or at least +75 degrees or at least +85 degrees.

Embodiment 4

The fixed abrasive article of embodiment 1, wherein each of the shaped abrasive particles or elongated abrasive particles has a placement angle of within a range of −85 degrees to +85 degrees or within a range of −75 degrees to +75 degrees or within a range of −65 degrees to +65 degrees or within a range of −55 degrees to +55 degrees or within a range of −45 degrees to +45 degrees or within a range of −40 degrees to +40 degrees or within a range of −35 degrees to +35 degrees or within a range of −30 degrees to +30 degrees or within a range of −25 degrees to +25 degrees or within a range of −20 degrees to +20 degrees or within a range of −15 degrees to +15 degrees or within a range of −10 degrees to +10 degrees or within a range of −5 degrees to +5 degrees.

Embodiment 5

The fixed abrasive article of embodiment 1, wherein each of the shaped abrasive particles or elongated abrasive particles have a predetermined position and a predetermined three-axis orientation.

Embodiment 6

The fixed abrasive article of embodiment 1, wherein the body comprises a first group of abrasive particles positioned within a first radial plane within the body, and wherein the body comprises a second group of abrasive particles within a second radial plane within the body.

Embodiment 7

The fixed abrasive article of embodiment 6, wherein the abrasive particles of the first group of abrasive particles are arranged in a controlled distribution relative to each other and wherein the abrasive particles of the second group of abrasive particles are arranged in a controlled distribution relative to each other.

Embodiment 8

The fixed abrasive article of embodiment 7, wherein the controlled distribution of at least one of the first group of abrasive particles and the second group of abrasive particles comprises a phyllotactic pattern.

Embodiment 9

The fixed abrasive article of embodiment 7, wherein an abrasive particle of the first group of abrasive particles is radially and axially staggered relative to an abrasive particle of the second group of abrasive particles.

Embodiment 10

The fixed abrasive article of embodiment 6, wherein the abrasive particles within the first group have a predetermined position having substantially the same axial position within the first radial plane with respect to each other and wherein the abrasive particles within the second group have a predetermined position having substantially the same axial position within the second radial plane with respect to each other.

Embodiment 11

The fixed abrasive article of embodiment 10, wherein the abrasive particles of the first group comprise a different radial position with respect to each other and wherein the abrasive particles of the second group comprise a different radial position with respect to each other.

Embodiment 12

The fixed abrasive article of embodiment 6, wherein the first radial plane and second radial plane are axially spaced apart from each other within the body.

Embodiment 13

The fixed abrasive article of embodiment 6, wherein the first group of abrasive particles have a first placement angle and the second group of abrasive particles have a second placement angle different than the first placement angle.

Embodiment 14

The fixed abrasive article of embodiment 6, wherein the abrasive particles of the first group and the second group have at least one abrasive characteristic that is different.

Embodiment 15

The fixed abrasive article of embodiment 1, wherein the body comprises a plurality of groups of abrasive particles associated with a plurality of different radial planes within the body, and wherein each group of the plurality of groups of abrasive particles includes a plurality of radial sets of abrasive particles, wherein each of the radial sets are spaced at a different radial distance from a center of the body relative to each other.

Embodiment 16

The fixed abrasive article of embodiment 1, wherein the body comprises a first axial collection of abrasive particles within a first axial plane within the body, each of the abrasive particles of the first axial collection having a first placement angle, and wherein the body further comprises a second axial collection of abrasive particles within a second axial plane within the body that is different than the first axial plane, each of the abrasive particles of the second axial collection having a second placement angle.

Embodiment 17

The fixed abrasive article of embodiment 16, wherein the abrasive particles of the first axial collection of abrasive particles are arranged in a controlled distribution relative to each other and wherein the abrasive particles of the second axial collection of abrasive particles are arranged in a controlled distribution relative to each other.

Embodiment 18

The fixed abrasive article of embodiment 16, wherein the abrasive particles of the first axial collection have at least one abrasive characteristic different than the abrasive particles of the second axial collection.

Embodiment 19

The fixed abrasive article of embodiment 1, wherein each of the shaped abrasive particles have a body that is essentially free of a binder, or wherein the body is essentially free of an organic material, or wherein the body is essentially free of rare earth elements, or wherein the body is essentially free of iron, or wherein the body is formed from a seeded sol gel.

Embodiment 20

The fixed abrasive article of embodiment 1, wherein the plurality of shaped abrasive particles comprises a first group of shaped abrasive particles, and wherein each shaped abrasive particle of the first group of shaped abrasive particles has three lines of symmetry within a plane defined by a length and a width of the shaped abrasive particle.

Embodiment 21

The fixed abrasive article of embodiment 1, wherein the plurality of shaped abrasive particles comprises a first group of shaped abrasive particles, and wherein each of the shaped abrasive particles of the first group of shaped abrasive particles has a triangular shape.

Embodiment 22

The fixed abrasive article of embodiment 1, wherein each of the shaped abrasive particles of the plurality of shaped abrasive particles has a placement angle of not greater than +40 degrees or not greater than +35 degrees or not greater than +30 degrees or not greater than +25 degrees or not greater than +20 degrees or not greater than +15 degrees or not greater than +10 degrees or not greater than +5 degrees or not greater than +4 degrees or not greater than +3 degrees or not greater than +2 degrees or not greater than +1 degree or not greater than +0 degrees or not greater than −1 degree or not greater than −2 degrees or not greater than −3 degrees or not greater than −4 degrees or not greater than −5 degrees or not greater than −10 degrees or not greater than −15 degrees or not greater than −20 degrees or not greater than −25 degrees or not greater than −30 degrees or not greater than −35 degrees or not greater than −40 degrees or not greater than −45 degrees or not greater than −50 degrees or not greater than −55 degrees.

Embodiment 23

The fixed abrasive article of embodiment 1, wherein each of the shaped abrasive particles of the plurality of shaped abrasive particles has a placement angle of at least −60 degrees or at least −55 degrees or at least −50 degrees or at least −45 degrees or at least −40 degrees or at least −35 degrees or at least −30 degrees or at least −25 degrees or at least −20 degrees or at least −15 degrees or at least −10 degrees or at least −5 degrees or at least −4 degrees or at least −3 degrees or at least −2 degrees or at least −1 degree or at least +0 degrees or at least +1 degree or at least +2 degrees or at least +3 degrees or at least +4 degrees or at least +5 degrees or at least +10 degrees or at least +15 degrees or at least +20 degrees or at least +25 degrees or at least +30 degrees or at least +35 degrees.

Embodiment 24

The fixed abrasive article of embodiment 1, wherein each of the shaped abrasive particles of the plurality of shaped abrasive particles has a placement angle of within a range of −60 degrees to +40 degrees or within a range of −50 degrees to +35 degrees or within a range of −40 degrees to +30 degrees or within a range of −30 degrees to +25 degrees or within a range of −20 degrees to +20 degrees or within a range of −15 degrees to +15 degrees or within a range of −10 degrees to +10 degrees or within a range of −5 degrees to +5 degrees or within a range of −4 degrees to +4 degrees or within a range of −3 degrees to +3 degrees or within a range of −2 degrees to +2 degrees or within a range of −1 degree to +1 degree.

Embodiment 25

The fixed abrasive article of embodiment 20 or 21, wherein the plurality of shaped abrasive particles further comprises a second group of shaped abrasive particles, and wherein the second group of shaped abrasive particles has a different two-dimensional shape than the first group of shaped abrasive particles.

Embodiment 26

The fixed abrasive article of embodiment 1, wherein each of the shaped abrasive particles of the plurality of shaped abrasive particles has a placement angle of not greater than +60 degrees or not greater than +58 degrees or not greater than +56 degrees or not greater than +54 degrees or not greater than +52 degrees or not greater than +50 degrees or not greater than +48 degrees or not greater than +46 degrees.

Embodiment 27

The fixed abrasive article of embodiment 1, wherein each of the shaped abrasive particles of the plurality of shaped abrasive particles has a placement angle of at least +44 degrees or at least +46 degrees or at least +48 degrees or at least +50 degrees or at least +52 degrees or at least +54 degrees or at least +56 degrees or at least +58 degrees.

Embodiment 28

The fixed abrasive article of embodiment 1, wherein each of the shaped abrasive particles of the plurality of shaped abrasive particles has a placement angle of within a range of +44 degrees to +60 degrees or within a range of +46 degrees to +58 degrees or within a range of +48 degrees to +56 degrees or within a range of +50 degrees to +54 degrees.

Embodiment 29

The fixed abrasive article of embodiment 20 or 21, wherein the plurality of shaped abrasive particles further comprises a second group of shaped abrasive particles, and wherein an abrasive particle of the first group of abrasive particles is radially and axially staggered relative to an abrasive particle of the second group of shaped abrasive particles.

Embodiment 30

The fixed abrasive article of embodiment 20 or 21, wherein the plurality of shaped abrasive particles further comprises a second group of shaped abrasive particles, and wherein the abrasive particles of the first group of abrasive particles are arranged in a controlled distribution relative to each other and wherein the abrasive particles of the second group of abrasive particles are arranged in a controlled distribution relative to each other.

Embodiment 31

A method of grinding a workpiece, wherein the method comprises:
providing a workpiece;
providing a fixed abrasive article; and
grinding the workpiece with the fixed abrasive article;
wherein the fixed abrasive article comprises a body having abrasive particles contained within a bond material, the abrasive particles including a plurality of shaped abrasive particles or elongated abrasive particles having an aspect ratio of length:width of at least 1.1:1, and each of the shaped abrasive particles or elongated abrasive particles having a placement angle within a range of +90 to −90 degrees.

Embodiment 32

A fixed abrasive article comprising:
a body having abrasive particles contained within a bond material, the abrasive particles including a plurality of shaped abrasive particles or elongated abrasive particles having an aspect ratio of length:width of at least 1.1:1, and each of the shaped abrasive particles or elongated abrasive particles having a rake angle within a range of +90 to −90 degrees with respect to a workpiece surface that is parallel to the edge of the body.

Embodiment 33

The fixed abrasive article of embodiment 32, wherein each of the shaped abrasive particles or elongated abrasive particles has a rake angle of not greater than +85 degrees or not greater than +75 degrees or not greater than +65 degrees or not greater than +55 degrees or not greater than +45 degrees or not greater than +40 degrees or not greater than +35 degrees or not greater than +30 degrees or not greater than +25 degrees or not greater than +20 degrees or not greater than +15 degrees or not greater than +10 degrees or not greater than +5 degrees or not greater than +0 degrees or not greater than −5 degrees or not greater than −10 degrees or not greater than −15 degrees or not greater than −20 degrees or not greater than −25 degrees or not greater than −30 degrees or not greater than −35 degrees or not greater than −40 degrees or not greater than −45 degrees or not greater than −55 degrees or not greater than −65 degrees or not greater than −75 degrees or not greater than −85 degrees with respect to a workpiece surface that is parallel to the edge of the body.

Embodiment 34

The fixed abrasive article of embodiment 32, wherein each of the shaped abrasive particles or elongated abrasive particles has a rake angle of at least −85 degrees or at least −75 degrees or at least −65 degrees or at least −55 degrees or at least −45 degrees or at least −40 degrees or at least −35 degrees or at least −30 degrees or at least −25 degrees or at least −20 degrees or at least −15 degrees or at least −10 degrees or at least −5 degrees or at least +0 degrees or at least +5 degrees or at least +10 degrees or at least +15 degrees or at least +20 degrees or at least +25 degrees or at least +30 degrees or at least +35 degrees or at least +40 degrees or at least +45 degrees or at least +55 degrees or at least +65 degrees or at least +75 degrees or at least +85 degrees with respect to a workpiece surface that is parallel to the edge of the body.

Embodiment 35

The fixed abrasive article of embodiment 32, wherein each of the shaped abrasive particles or elongated abrasive particles has a rake angle of within a range of −85 degrees to +85 degrees or within a range of −75 degrees to +75 degrees or within a range of −65 degrees to +65 degrees or within a range of −55 degrees to +55 degrees or within a range of −45 degrees to +45 degrees or within a range of −40 degrees to +40 degrees or within a range of −35 degrees to +35 degrees or within a range of −30 degrees to +30 degrees or within a range of −25 degrees to +25 degrees or within a range of −20 degrees to +20 degrees or within a range of −15 degrees to +15 degrees or within a range of −10 degrees to +10 degrees or within a range of −5 degrees to +5 degrees with respect to a workpiece surface that is parallel to the edge of the body.

Embodiment 36

The fixed abrasive article of embodiment 32, wherein each of the shaped abrasive particles or elongated abrasive particles have a predetermined position and a predetermined three-axis orientation.

Embodiment 37

The fixed abrasive article of embodiment 32, wherein the body comprises a first group of abrasive particles positioned within a first radial plane within the body, and wherein the body comprises a second group of abrasive particles within a second radial plane within the body.

Embodiment 38

The fixed abrasive article of embodiment 37, wherein the abrasive particles of the first group of abrasive particles are arranged in a controlled distribution relative to each other and wherein the abrasive particles of the second group of abrasive particles are arranged in a controlled distribution relative to each other.

Embodiment 39

The fixed abrasive article of embodiment 38, wherein the controlled distribution of at least one of the first group of abrasive particles and the second group of abrasive particles comprises a phyllotactic pattern.

Embodiment 40

The fixed abrasive article of embodiment 38, wherein an abrasive particle of the first group of abrasive particles is radially and axially staggered relative to an abrasive particle of the second group of abrasive particles.

Embodiment 41

The fixed abrasive article of embodiment 37, wherein the abrasive particles within the first group have a predetermined position having substantially the same axial position within the first radial plane with respect to each other and wherein the abrasive particles within the second group have a predetermined position having substantially the same axial position within the second radial plane with respect to each other.

Embodiment 42

The fixed abrasive article of embodiment 41, wherein the abrasive particles of the first group comprise a different radial position with respect to each other and wherein the abrasive particles of the second group comprise a different radial position with respect to each other.

Embodiment 43

The fixed abrasive article of embodiment 37, wherein the first radial plane and second radial plane are axially spaced apart from each other within the body.

Embodiment 44

The fixed abrasive article of embodiment 37, wherein the first group of abrasive particles have a first rake angle with respect to a workpiece surface that is parallel to the edge of the body and the second group of abrasive particles have a second rake angle with respect to a workpiece surface that is parallel to the edge of the body, and the second rake angle is different than the first rake angle.

Embodiment 45

The fixed abrasive article of embodiment 37, wherein the abrasive particles of the first group and the second group have at least one abrasive characteristic that is different.

Embodiment 46

The fixed abrasive article of embodiment 32, wherein the body comprises a plurality of groups of abrasive particles associated with a plurality of different radial planes within the body, and wherein each group of the plurality of groups of abrasive particles includes a plurality of radial sets of abrasive particles, wherein each of the radial sets are spaced at a different radial distance from a center of the body relative to each other.

Embodiment 47

The fixed abrasive article of embodiment 32, wherein the body comprises a first axial collection of abrasive particles within a first axial plane within the body, each of the abrasive particles of the first axial collection having a first rake angle with respect to a workpiece surface that is parallel to the edge of the body, and wherein the body further comprises a second axial collection of abrasive particles within a second axial plane within the body that is different than the first axial plane, each of the abrasive particles of the second axial collection having a second rake angle with respect to a workpiece surface that is parallel to the edge of the body.

Embodiment 48

The fixed abrasive article of embodiment 47, wherein the abrasive particles of the first axial collection of abrasive particles are arranged in a controlled distribution relative to each other and wherein the abrasive particles of the second axial collection of abrasive particles are arranged in a controlled distribution relative to each other.

Embodiment 49

The fixed abrasive article of embodiment 47, wherein the abrasive particles of the first axial collection have at least one abrasive characteristic different than the abrasive particles of the second axial collection.

Embodiment 50

The fixed abrasive article of embodiment 32, wherein each of the shaped abrasive particles have a body that is essentially free of a binder, or wherein the body is essentially free of an organic material, or wherein the body is essentially free of rare earth elements, or wherein the body is essentially free of iron, or wherein the body is formed from a seeded sol gel.

Embodiment 51

The fixed abrasive article of embodiment 32, wherein the plurality of shaped abrasive particles comprises a first group of shaped abrasive particles, and wherein each shaped abrasive particle of the first group of shaped abrasive particles has three lines of symmetry within a plane defined by a length and a width of the shaped abrasive particle.

Embodiment 52

The fixed abrasive article of embodiment 32, wherein the plurality of shaped abrasive particles comprises a first group of shaped abrasive particles, and wherein each of the shaped abrasive particles of the first group of shaped abrasive particles has a triangular shape.

Embodiment 53

The fixed abrasive article of embodiment 32, wherein each of the shaped abrasive particles of the plurality of shaped abrasive particles has a rake angle of not greater than +10 degrees or not greater than +5 degrees or not greater than +0 degrees or not greater than −5 degrees or not greater than −10 degrees or not greater than −15 degrees or not greater than −20 degrees or not greater than −25 degrees or not greater than −26 degrees or not greater than −27 degrees or not greater than −28 degrees or not greater than −29 degrees or not greater than −30 degrees or not greater than −31 degrees or not greater than −32 degrees or not greater than −33 degrees or not greater than −34 degrees or not greater than −35 degrees or not greater than −40 degrees or not greater than −45 degrees or not greater than −50 degrees or not greater than −55 degrees or not greater than −60 degrees or not greater than −65 degrees or not greater than −70 degrees or not greater than −75 degrees or not greater than −80 degrees or not greater than −85 degrees with respect to a workpiece surface that is parallel to the edge of the body.

Embodiment 54

The fixed abrasive article of embodiment 32, wherein each of the shaped abrasive particles of the plurality of shaped abrasive particles has a rake angle of at least −90 degrees or at least −85 degrees or at least −80 degrees or at least −75 degrees or at least −70 degrees or at least −65 degrees or at least −60 degrees or at least −55 degrees or at least −50 degrees or at least −45 degrees or at least −40 degrees or at least −35 degrees or at least −34 degrees or at least −33 degrees or at least −32 degrees or at least −31 degrees or at least −30 degrees or at least −29 degrees or at least −28 degrees or at least −27 degrees or at least −26 degrees or at least −25 degrees or at least −20 degrees or at least −15 degrees or at least −10 degrees or at least −5 degrees or at least +0 degrees or at least +5 degrees with respect to a workpiece surface that is parallel to the edge of the body.

Embodiment 55

The fixed abrasive article of embodiment 32, wherein each of the shaped abrasive particles of the plurality of shaped abrasive particles has a rake angle of within a range of −90 degrees to +10 degrees or within a range of −80 degrees to +5 degrees or within a range of −70 degrees to +0 degrees or within a range of −60 degrees to −5 degrees or within a range of −50 degrees to −10 degrees or within a range of −45 degrees to −15 degrees or within a range of −40 degrees to −20 degrees or within a range of −35 degrees to −25 degrees or within a range of −34 degrees to −26 degrees or within a range of −33 degrees to −27 degrees or within a range of −32 degrees to −28 degrees or within a range of −31 degrees to −29 degrees with respect to a workpiece surface that is parallel to the edge of the body.

Embodiment 56

The fixed abrasive article of embodiment 32, wherein each of the shaped abrasive particles of the plurality of shaped abrasive particles has a rake angle of not greater than +30 degrees or not greater than +28 degrees or not greater than +26 degrees or not greater than +24 degrees or not greater than +22 degrees or not greater than +20 degrees or not greater than +18 degrees or not greater than +16 degrees with respect to a workpiece surface that is parallel to the edge of the body.

Embodiment 57

The fixed abrasive article of embodiment 32, wherein each of the shaped abrasive particles of the plurality of shaped abrasive particles has a rake angle of at least +14 degrees or at least +16 degrees or at least +18 degrees or at least +20 degrees or at least +22 degrees or at least +24 degrees or at least +26 degrees or at least +28 degrees with respect to a workpiece surface that is parallel to the edge of the body.

Embodiment 58

The fixed abrasive article of embodiment 32, wherein each of the shaped abrasive particles of the plurality of shaped abrasive particles has a rake angle of within a range of +14 degrees to +30 degrees or within a range of +16 degrees to +28 degrees or within a range of +18 degrees to +26 degrees or within a range of +20 degrees to +24 degrees with respect to a workpiece surface that is parallel to the edge of the body.

Embodiment 59

The fixed abrasive article of embodiment 51 or 52, wherein the plurality of shaped abrasive particles further comprises a second group of shaped abrasive particles, and wherein an abrasive particle of the first group of abrasive particles is radially and axially staggered relative to an abrasive particle of the second group of shaped abrasive particles.

Embodiment 60

The fixed abrasive article of embodiment 51 or 52, wherein the plurality of shaped abrasive particles further comprises a second group of shaped abrasive particles, and wherein the abrasive particles of the first group of abrasive particles are arranged in a controlled distribution relative to each other and wherein the abrasive particles of the second group of abrasive particles are arranged in a controlled distribution relative to each other.

Embodiment 61

The fixed abrasive article of embodiment 51 or 52, wherein the plurality of shaped abrasive particles further comprises a second group of shaped abrasive particles, and wherein the second group of shaped abrasive particles has a different two-dimensional shape than the first group of shaped abrasive particles.

Embodiment 62

A method of grinding a workpiece, wherein the method comprises:
providing a workpiece;
providing a fixed abrasive article; and
grinding the workpiece with the fixed abrasive article;
wherein the fixed abrasive article comprises a body having abrasive particles contained within a bond material, the abrasive particles including a plurality of shaped abrasive particles or elongated abrasive particles having an aspect ratio of length:width of at least 1.1:1, and each of the shaped abrasive particles or elongated abrasive particles having a placement angle within a range of +90 to −90 degrees.

Embodiment 63

A method of grinding a workpiece, wherein the method comprises:
providing a workpiece;
providing a fixed abrasive article; and
grinding the workpiece with the fixed abrasive article;
wherein the fixed abrasive article comprises a body having abrasive particles contained within a bond material, the abrasive particles including a plurality of shaped abrasive particles or elongated abrasive particles having an aspect ratio of length:width of at least 1.1:1, and each of the shaped abrasive particles or elongated abrasive particles having a rake angle within a range of +90 to −90 degrees with respect to a workpiece surface that is parallel to the edge of the body.

Embodiment 64

The fixed abrasive article of embodiment 1 or 32, wherein the plurality of shaped abrasive particles or elongated abrasive particles are arranged according to a phyllotactic pattern.

Embodiment 65

The fixed abrasive article of embodiment 1 or 32, wherein the bond material comprises a phenolic resin.

Embodiment 66

The fixed abrasive article of embodiment 1 or 32, wherein the bond material comprises a filler, and wherein the filler comprises iron pyrite.

Embodiment 67

The fixed abrasive article of embodiment 1 or 32, wherein the bond material comprises a filler, and wherein the filler comprises potassium aluminum fluoride.

Embodiment 68

The fixed abrasive article of embodiment 1 or 32, wherein the bond material comprises a filler, and wherein the filler comprises mineral wool.

Embodiment 69

The fixed abrasive article of embodiment 1 or 32, wherein the bond material comprises a filler, wherein the filler comprises not greater than 44% or not greater than 42% or not greater than 40% or not greater than 38% or not greater than 36% or not greater than 34% or not greater than 32%, or not greater than 30% or not greater than 28% or not greater than 26% or not greater than 24% or not greater than 22% or not greater than 20% or not greater than 18% or not greater than 16% or not greater than 14% by weight of the bond material.

Embodiment 70

The fixed abrasive article of embodiment 1 or 32, wherein the bond material comprises a filler, wherein the filler comprises at least 12% or at least 14% or at least 16% or at least 18% or at least 20% or at least 22% or at least 24% or at least 26% or at least 28% or at least 30% or at least 32% or at least 34% or at least 36% or at least 38% or at least 40% or at least 42% by weight of the bond material.

Embodiment 71

The fixed abrasive article of embodiment 1 or 32, wherein the bond material comprises a filler, wherein the filler is present within a range of 12% to 44% or within a range of 14% to 42% or within a range of 16% to 40% or within a range of 18% to 38% or within a range of 20% to 36% or within a range of 22% to 34% or within a range of 24% to 32% or within a range of 26% to 30% by weight of the bond material.

Embodiment 72

The fixed abrasive article of embodiment 1 or 32, wherein the bond material comprises iron pyrite, wherein the iron pyrite is present in an amount of not greater than 60%, such as not greater than 55% or not greater than 50% or not greater than 48% or not greater than 46% or not greater than 44% or not greater than 42% or not greater than 40% or not greater than 38% or not greater than 36% or not greater than 34% or not greater than 32% or not greater than 30% or not greater than 28% or not greater than 26% or not greater than 24% or not greater than 22% or not greater than 20% or not greater than 18% of iron pyrite by weight of bond material.

Embodiment 73

The fixed abrasive article of embodiment 1 or 32, wherein the bond material comprises iron pyrite, wherein the iron pyrite is present in an amount of at least 16% or at least 18% or at least 20% or at least 22% or at least 24% or at least 26% or at least 28% or at least 30% or at least 32% or at least 34% or at least 36% or at least 38% or at least 40% or at least 42% or at least 44% or at least 46% of iron pyrite by weight of bond material.

Embodiment 74

The fixed abrasive article of embodiment 1 or 32, wherein the bond material comprises iron pyrite, wherein the iron pyrite is present in an amount within a range of 16% to 75% or within a range of 16% to 70%, or within a range of 16% to 65%, or within a range of 16% to 55%, or within a range of 20% to 75% or within a range of 25% to 70%, or within a range of 30% to 65%, or within a range of 35% to 55% of iron pyrite by weight of the bond material.

Embodiment 75

The fixed abrasive article of embodiment 1 or 32, wherein the bond material comprises potassium aluminum fluoride, wherein the potassium aluminum fluoride is present in an amount of not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% of potassium aluminum fluoride by weight of the bond material.

Embodiment 76

The fixed abrasive article of embodiment 1 or 32, wherein the bond material comprises potassium aluminum fluoride present in an amount of at least 0.25%, or at least 0.5%, or at least 1% or at least 1.5% or at least 2% of potassium aluminum fluoride by weight of bond material.

Embodiment 77

The fixed abrasive article of embodiment 1 or 32, wherein the bond material comprises potassium aluminum fluoride present in an amount within a range of 0.25% to 15% or within a range of 0.5% to 14% or within a range of 1% to 13% or within a range of 1.5% to 12% or within a range of 2% to 10% of potassium aluminum fluoride by weight of bond material.

Embodiment 78

The fixed abrasive article of embodiment 1 or 32, wherein the bond material comprises mineral wool present in a content of not greater than 10% or not greater than 10% or not greater than 9% or not greater than 9% or not greater than 8% or not greater than 8% or not greater than 7% or not greater than 7% or not greater than 6% or not greater than 6% or not greater than 5% or not greater than 5% or not greater than 4% or not greater than 4% or not greater than 3% or not greater than 3% or not greater than 2% or not greater than 2% or not greater than 1% of mineral wool by weight of the bond material.

Embodiment 79

The fixed abrasive article of embodiment 1 or 32, wherein the bond material comprises mineral wool present in a content of at least 0.25% or at least 0.5%, or at least 1% or at least 1.5% or at least 2% or at least 3% or at least 3% or at least 4% or at least 4% or at least 5% or at least 5% or at least 6% or at least 6% or at least 7% or at least 7% or at least 8% or at least 8% or at least 9% or at least 9% or at least 10% of mineral wool by weight of the bond material.

Embodiment 80

The fixed abrasive article of embodiment 1 or 32, wherein the bond material comprises mineral wool present in a content within a range of 0.5% to 10% or within a range of 1% to 10% or within a range of 2% to 9% or within a range of 3% to 8% of mineral wool by weight of the bond material.

Embodiment 81

A fixed abrasive article comprising: a body having abrasive particles contained within a bond material, the abrasive particles including a plurality of shaped abrasive particles, elongated abrasive particles, or a combination thereof, each of the shaped abrasive particles or elongated abrasive particles having an aspect ratio of length:width of at least 1.1:1, and each of the shaped abrasive particles or elongated abrasive particles having a placement angle ranging from +90 degrees to −90 degrees.

Embodiment 82

The fixed abrasive article of embodiment 81, wherein each of the shaped abrasive particles or elongated abrasive particles has a placement angle ranging from +45 degrees to −45 degrees.

Embodiment 83

The fixed abrasive article of embodiment 82, wherein the each of the shaped abrasive particles or elongated abrasive particles further comprise a rake angle within a range of +90 to −90 degrees with respect to a workpiece surface that is parallel to the edge of the body.

Embodiment 84

The fixed abrasive article of embodiment 83, wherein the rake angle is within a range of +45 to −45 degrees with respect to a workpiece surface that is parallel to the edge of the body.

Embodiment 85

The fixed abrasive article of embodiment 84, wherein each of the shaped abrasive particles or elongated abrasive particles have a predetermined position and a predetermined three-axis orientation.

Embodiment 86

The fixed abrasive article of embodiment 84, wherein the body comprises a first group of abrasive particles positioned within a first radial plane within the body, and wherein the body comprises a second group of abrasive particles within a second radial plane within the body.

Embodiment 87

The fixed abrasive article of embodiment 86, wherein the abrasive particles of the first group of abrasive particles are arranged in a controlled distribution relative to each other and wherein the abrasive particles of the second group of abrasive particles are arranged in a controlled distribution relative to each other.

Embodiment 88

The fixed abrasive article of embodiment 87, wherein the controlled distribution of at least one of the first group of abrasive particles and the second group of abrasive particles comprises a phyllotactic pattern.

Embodiment 89

The fixed abrasive article of embodiment 87, wherein an abrasive particle of the first group of abrasive particles is radially and axially staggered relative to an abrasive particle of the second group of abrasive particles.

Embodiment 90

The fixed abrasive article of embodiment 86, wherein the abrasive particles within the first group have a predetermined position having substantially the same axial position within the first radial plane with respect to each other and wherein the abrasive particles within the second group have a predetermined position having substantially the same axial position within the second radial plane with respect to each other.

Embodiment 91

The fixed abrasive article of embodiment 90, wherein the abrasive particles of the first group comprise a different radial position with respect to each other and wherein the abrasive particles of the second group comprise a different radial position with respect to each other.

Embodiment 92

The fixed abrasive article of embodiment 86, wherein the first radial plane and second radial plane are axially spaced apart from each other within the body.

Embodiment 93

The fixed abrasive article of embodiment 86, wherein the first group of abrasive particles have a first placement angle and the second group of abrasive particles have a second placement angle different than the first placement angle.

Embodiment 94

The fixed abrasive article of embodiment 86, wherein the abrasive particles of the first group and the second group have at least one abrasive characteristic that is different.

Embodiment 95

The fixed abrasive article of embodiment 84, wherein the body comprises a first axial collection of abrasive particles within a first axial plane within the body, each of the abrasive particles of the first axial collection having a first placement angle, and wherein the body further comprises a second axial collection of abrasive particles within a second axial plane within the body that is different than the first axial plane, each of the abrasive particles of the second axial collection having a second placement angle.

Embodiment 96

The fixed abrasive article of embodiment 95, wherein the abrasive particles of the first axial collection of abrasive particles are arranged in a controlled distribution relative to each other and wherein the abrasive particles of the second axial collection of abrasive particles are arranged in a controlled distribution relative to each other.

Embodiment 97

A fixed abrasive article comprising:
a body having abrasive particles contained within a bond material, the abrasive particles including a plurality of shaped abrasive particles or elongated abrasive particles having an aspect ratio of length:width of at least 1.1:1, and each of the shaped abrasive particles or elongated abrasive particles having a rake angle ranging from +90 to −90 degrees with respect to a workpiece surface that is parallel to the edge of the body.

Embodiment 98

The fixed abrasive article of embodiment 84, wherein the bond material comprises a phenolic resin and iron pyrite.

Embodiment 99

The fixed abrasive article of embodiments 98, wherein the bond material further comprises potassium aluminum fluoride, mineral wool, or a combination thereof.

Embodiment 100

The fixed abrasive article of embodiment 99, wherein the bond material comprises: 10 wt % to 40 wt % phenolic resin; 16 wt % to 60 wt % iron pyrite, 0.5 wt % to 15 wt % potassium aluminum fluoride, and 0.5 wt % to 10 wt % mineral wool by weight of the bond material.

EXAMPLES

Example 1

Sample wheels were formed to analyze how the use of a formation structure affects (a) the placement of abrasive particles in a predetermined position and/or predetermined rotational orientation; and (b) the grinding performance of the sample wheel.

A comparative wheel sample was made containing commercially available rod-shaped sintered bauxite abrasive particles (CS1). An image of the rod-shaped sintered bauxite abrasive particles, used in both the comparative sample CS1 and the sample S1 discussed herein, are shown in FIG. 21A. The comparative sample CS1 was formed using a conventional process, namely by pouring a mixture of precursor bond material and the rod-shaped particles into a mold to form a green body. Then the green body was treated (e.g., cured) to form the fixed abrasive article CS1 with a diameter of approximately 16".

A first wheel sample, S1, was formed in accordance with the embodiments described herein. The same mixture of precursor bond material and rod-shaped sintered bauxite abrasive particles used to make the conventional wheel sample CS1 was also used to make the sample S1. The mixture was deposited into a production tool having a forming structure. An illustration of the forming structure is shown in FIG. 21B. It will be appreciated that the forming structure 2100 depicted in FIG. 21B can be employed in any of the processes or embodiments described herein, or used with any of the shaped abrasive particles or elongated abrasive particles described herein, to assist with placing shaped or elongated abrasive particles in predetermined positions and/or predetermined rotational orientations within a fixed abrasive article.

The first wheel sample S1 was made using the forming structure 2100 depicted in FIG. 21B, including the "radial" configuration of slots 2150 as shown in FIG. 21B. After the mixture was deposited into the production tool, a green body was formed. Then the green body was treated (e.g., cured) to form the fixed abrasive article sample S1 with a diameter of approximately 16".

Figure 22A:
FIGS. 22A-22B includes images of fixed abrasive articles in accordance with an embodiment.
Figure 22B:
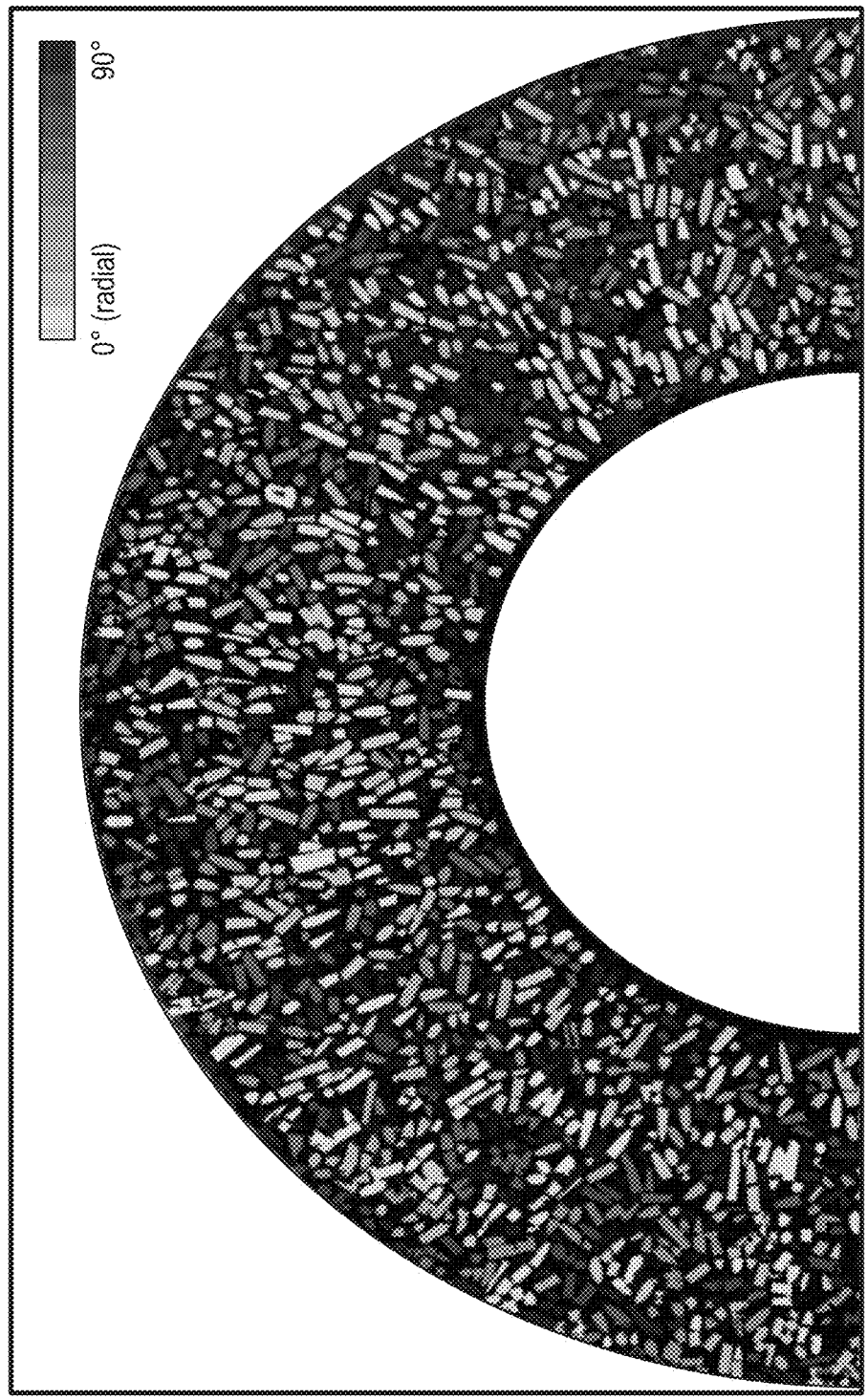

FIGS. 22A and 22B depict cross-sectional images of the comparative wheel sample CS1 and first sample S1, respectively. The cross-sectional images were both taken in a plane parallel to the major surfaces of the samples. An analysis was performed on these images to assess the orientation of the abrasive particles within the sample wheels. Those abrasive particles whose orientation was substantially "radial," or whose longest dimension was parallel to a radial axis of the wheel and perpendicular to a side surface of the wheel, were denoted in a lighter color. Those abrasive particles whose orientation was substantially "90°," or whose longest dimension was perpendicular to a radial axis of the wheel and parallel to a side surface of the wheel, were denoted in a dark color.

FIG. 22C depicts a bar graph of the results of the image analysis on the wheels depicted in FIGS. 22A and 22B. The largest percentage of the abrasive particles in the sample CS1 were oriented in a "tangential direction," where a longest dimension of the particle was substantially perpendicular to a radial axis of the wheel and substantially parallel to the side surface or a tangent to the side surface. By contrast, the largest percentage of the abrasive particles in the sample S1 were oriented in a "radial direction," where a longest dimension of the particle was substantially parallel to a radial axis of the wheel and substantially perpendicular to the side surface or a tangent to the side surface. Clearly, then, the use of a forming structure, including the forming structure 2100 with the slots 2150, can facilitate the formation of a fixed abrasive article having shaped abrasive particles or elongated abrasive particles in predetermined positions and/or predetermined rotational orientations.

In addition to sample S1, a further wheel sample S2 was made in accordance with embodiments described herein, notably using the forming structure 2100 depicted in FIG. 21C with the "45°" configuration of the slots 2150. The sample S2 included the same precursor bond material and abrasive particles as the CS1 and S1 sample wheels. After the mixture was deposited into the production tool (an exemplary image of which is depicted in FIG. 21D), a green body was formed. Then the green body was treated (e.g., cured) to form the fixed abrasive article sample S2 with a diameter of approximately 16".

Samples S1 and S2 were used in a grinding test on a workpiece of cold 304 stainless steel at a constant speed. The samples S1-S2 were tested at two different depths of cut ("DoC"), namely at 0.075" and 0.1". The grinding performance of the samples S1-S2, and particularly the cumulative Q-ratio (lb/lb) of each sample for each of the two DoC, was measured and summarized in the bar graph depicted in FIG. 23.

As FIG. 23 shows, sample S1 had a better Q-ratio for a DoC of 0.075" than for a DoC of 0.1". Sample S2 was tested in both a positive placement angle direction and a negative placement angle direction. That is, sample S2 was tested in a grinding direction that corresponds to the 45° inclination of the abrasive particles in the sample S2 wheel (a positive placement angle direction). Sample S2 also was tested in a grinding direction that was opposite to the 45° inclination of the abrasive particles in the sample S2 wheel (a negative placement angle direction). In the negative placement angle direction, sample S2 had a better Q-ratio for a DoC of 0.1" than for a DoC of 0.075". In the positive placement angle direction, sample S2 had a better Q-ratio for a DoC of 0.075" than for a DoC of 0.1". In particular, for the 0.075" DoC, sample S2 had an 18% separation in Q-ratio between the negative and positive placement angle directions. Clearly, then, the use of a forming structure that facilitates the positioning of shaped abrasive particles or elongated abrasive particles in predetermined positions and/or predetermined rotational orientations also can affect the grinding performance of the resulting fixed abrasive article.

Example 2

Thin wheels were formed to analyze how the use of a formation structure affects the placement of abrasive particles in a predetermined position and/or predetermined rotational orientation.

Figure 24A:
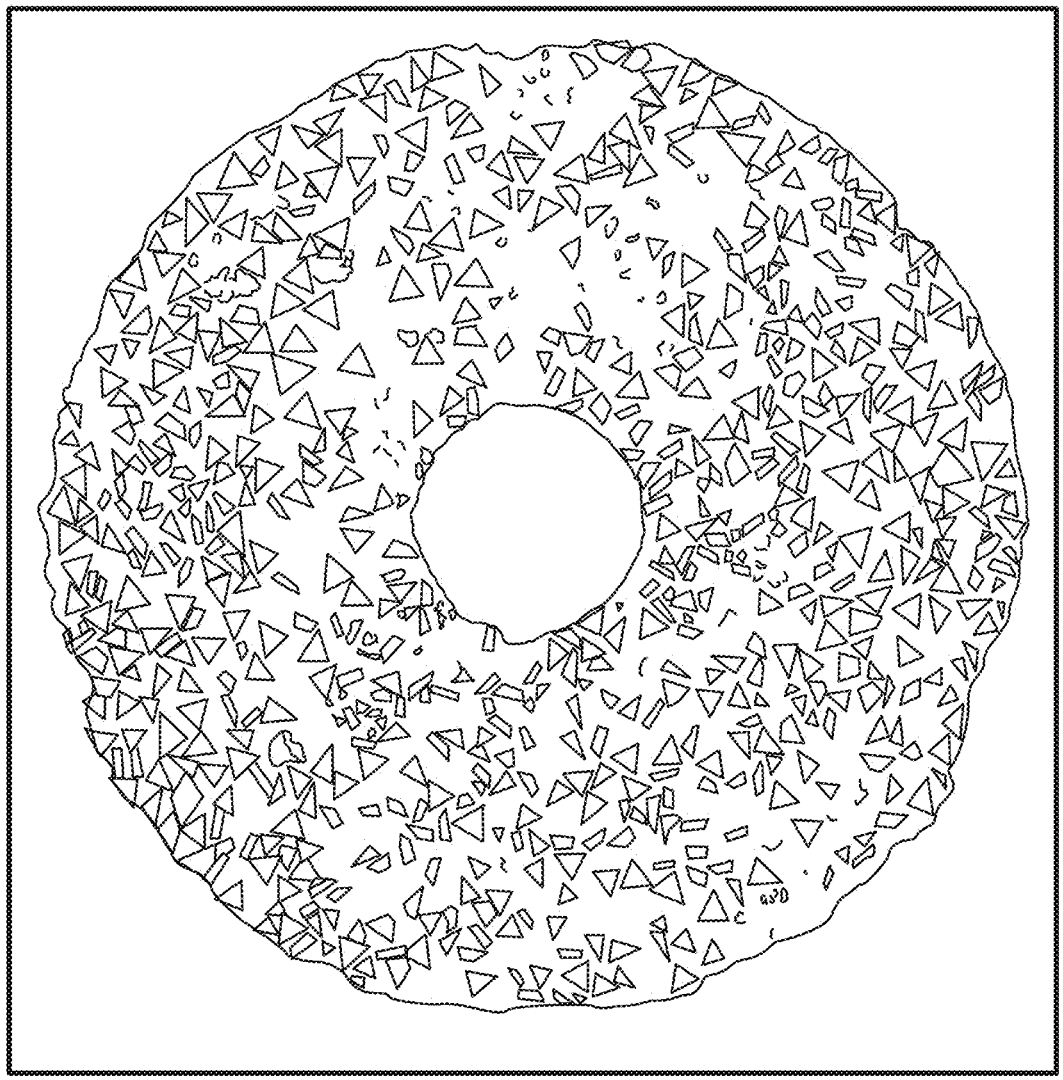
FIG. 24A includes an image of a fixed abrasive article in accordance with an embodiment.

A first wheel sample, S3, was formed according to a conventional process. The sample wheel S3 was a 3"×1/16" Type 41 wheel (e.g., a flat cutting wheel) with a target weight of 19.2 grams. A precursor bond material was formed in an Erlich mixer by blending 184 grams of dry phenolic resin (Durez 29346) with 893.8 grams of finely chopped bulk molding compound ("BMC"). For the abrasive particles, 1006.9 grams of triangular shaped abrasive particles (as described in accordance with embodiments herein) were mixed with 254.6 grams of Nephaline syenite (a type of weak grain). To this, 54.5 grams of liquid resin (Durez LPRS %) was added to wet the abrasive particles. This wet particle mix was added to the dry precursor bond material blend while stirring. The wheel was then formed in a production tool (e.g., a mold cavity) by placing a first layer of reinforcing material in the bottom of the mold cavity. The reinforcing material was IPAC style 3321 phenolic-coated fiberglass with paper on one face. Each of these fiberglass webs, with the paper, weighs approximately 0.94 grams. The IPAC layer was placed into the mold cavity with the paper facing the bottom of the mold cavity, so that the paper faced to the outside of the final wheel. Approximately 18.5 grams of the mixture that contained both the precursor bond material and shaped abrasive particles was deposited on top of the IPAC layer. The mixture of precursor bond material and shaped abrasive particles was deposited into the mold cavity such that the shaped abrasive particles were randomly distributed and oriented throughout the mixture. A second IPAC layer was placed on top of the mixture, again with the paper facing to the outside of what would become the final wheel. This green body configuration was cold pressed in the mold cavity at a pressure of 100 bar with a 4 second dwell. The compressed wheel was cured under a force of approximately 200 pounds using the following cycle: (a) a ramp temperature over 5 hours from approximately room temperature to 195° C.; (b) a hold at 195° C. for 3 hours and 20 minutes; and (c) a ramp temperature over 1.5 hours from 195° C. to 60° C. A CT scan of the sample S3 was performed and a cross-sectional image of sample S3, as viewed in a plane parallel to the major surfaces of the sample wheel S3, is shown in FIG. 24A. As FIG. 24A shows, the triangular shaped abrasive particles are randomly distributed or positioned within the wheel S3. The particles also have random rotational orientations relative to, for example, a side surface of the wheel S3.

A second wheel sample, S4, was formed in accordance with the embodiments described herein. The sample wheel S4 was a 3"×1/16" Type 41 wheel (e.g., a flat cutting wheel) with a target weight of 19.2 grams. The sample wheel S4 was a layered structure featuring two IPAC layers on the outer major surfaces of the wheel, and an alternating structure of 8 grains sheets interspersed with a precursor bond material. The precursor bond material, which included 1.1 grams of dry phenolic resin powder (Durez 29346), 1.78 grams of Nepheline Syenite, and 0.6 grams of liquid phenolic resin (Durez LPRS %) was mixed by hand in a small bowl with a spatula.

Figure 24B:
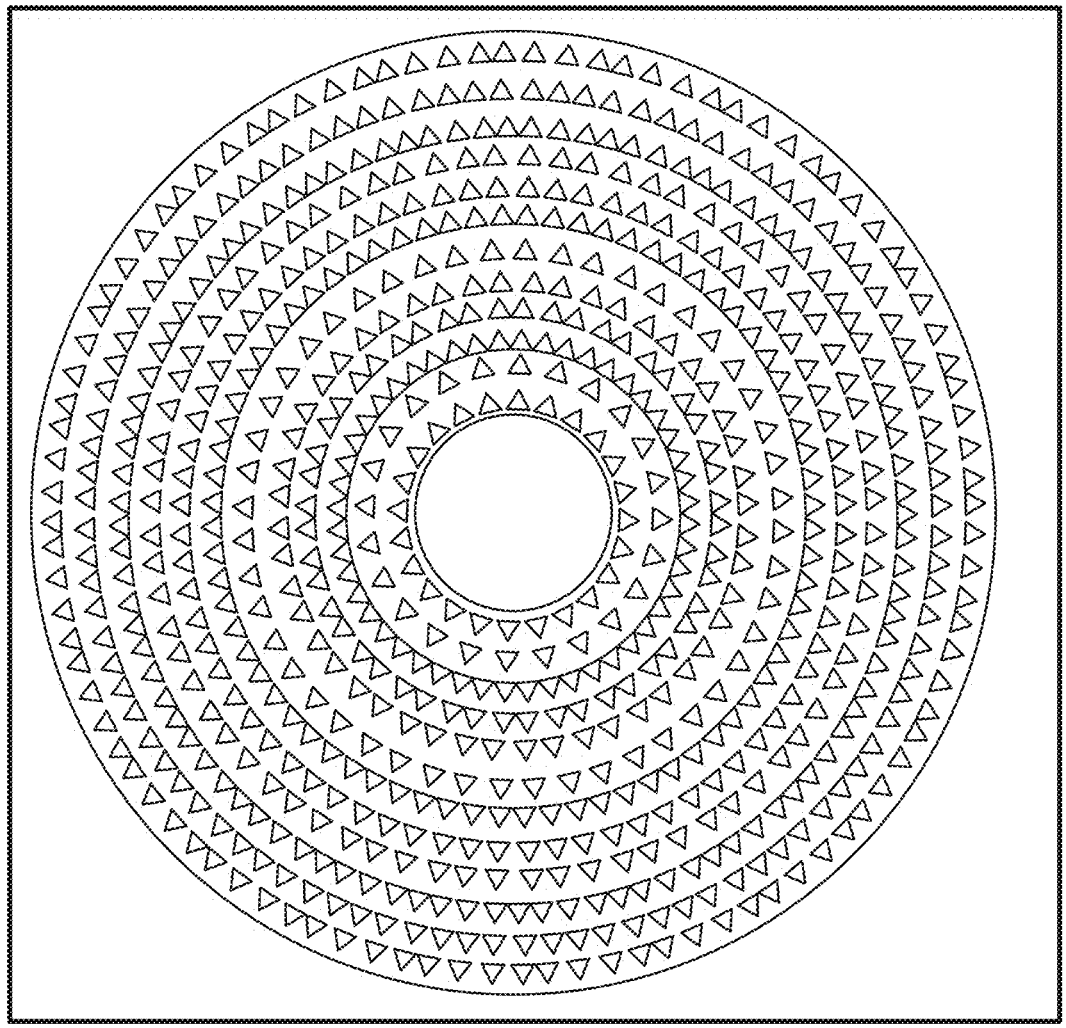
FIG. 24B includes an image of a forming structure in accordance with an embodiment.

Each grain sheet, which weighed approximately 1.68 grams (including 0.89 grams of grain and 0.79 grams of BMC), was formed in accordance with embodiments described herein. A forming structure, namely a template, included openings that were pockets. An image of the template used to make each grain sheet is shown in FIG. 24B. That is, the openings were pockets that defined a space within the body of the template and did not extend completely through the thickness of the template. Notably, the pockets were radially staggered from one concentric ring to the next, such that when the sample S4 wheel was viewed from the top down, the shaped abrasive particles of one ring were staggered in their radial position as compared to adjacent concentric rings of shaped abrasive particles. For each grain sheet, approximately 1 gram of shaped abrasive particles (e.g., the same triangular shaped abrasive particles used in sample wheel S3) was spread around the template while the template was rotated and gently shaken from side to side. This rotation and vibration step assisted in filling most of the pockets in the template with shaped abrasive particles. The particle placement was completed by using tweezers to place a particle in any open pocket, replace any broken particles in pockets with whole or unbroken particles, and remove any excess particles from the non-pocket areas of the template. A circular layer of BMC having an outer diameter of 3" was then placed on top of the particles in the template. The BMC was pressed into the particles. Then the BMC and template in combination were turned over, after which the template was removed from the BMC. The shaped abrasive particles remained on the BMC layer. The grain sheet was refrigerated between layers of wax paper until all of the grain sheets were completed and the wheel was ready for assembly.

The wheel was formed in a production tool (e.g., a mold cavity) by placing a first layer of IPAC reinforcing material in the bottom of the mold cavity with the paper facing toward the eventual outer surface of the wheel. One grain sheet was placed on top of the IPAC layer. Then 0.5 grams of the precursor bond material was sprinkled onto the surface of the grain sheet. A second grain sheet was placed into the mold cavity, and a further 0.5 grams of the precursor bond material was sprinkled onto the surface of the second grain sheet. This process continued until 8 total grain sheets, with seven layers of precursor bond material sprinkled in between, were deposited in the mold cavity. A final layer of IPAC reinforcing material was deposited in the mold cavity with the paper facing toward the eventual outer surface of the wheel. Then the wheel was pressed, stacked, and cured under the same conditions described above with respect to sample S3.

Figure 24C:
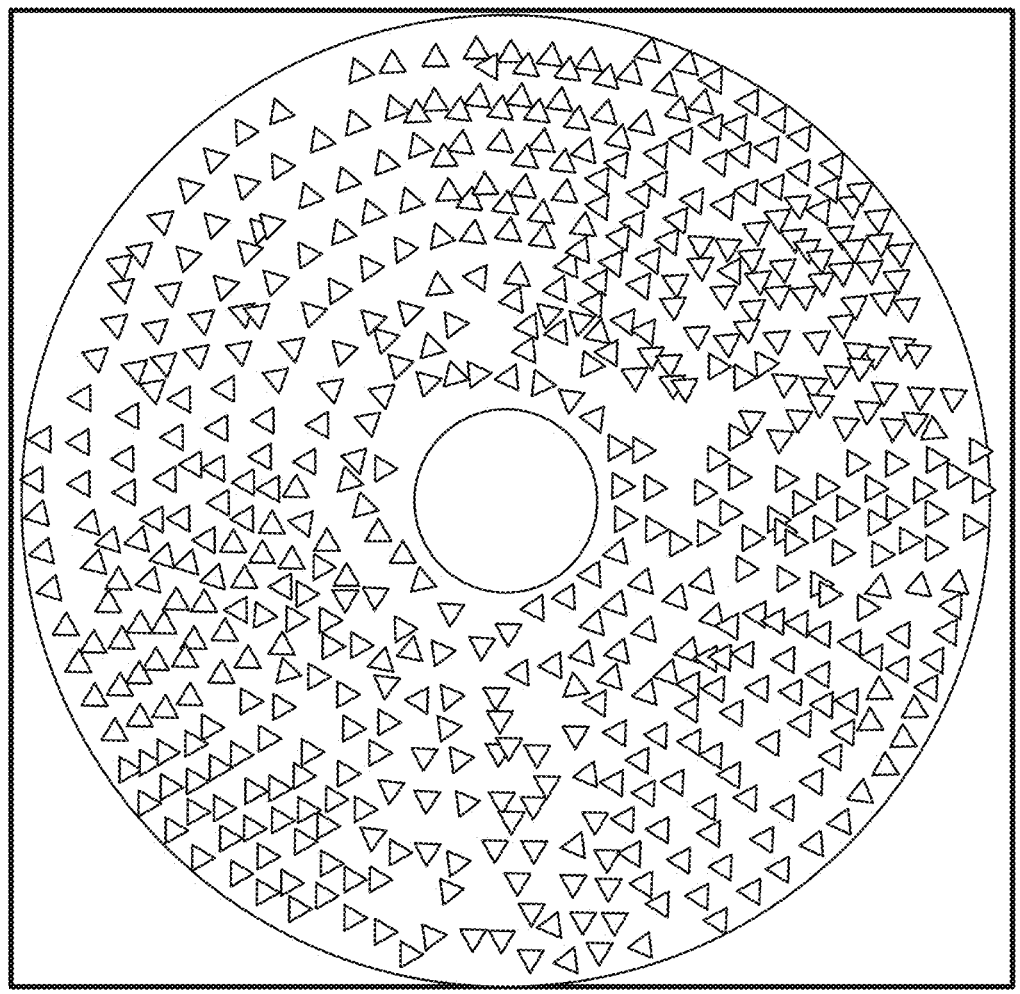
FIGS. 24C-24D include images of fixed abrasive articles in accordance with an embodiment.
Figure 24D:
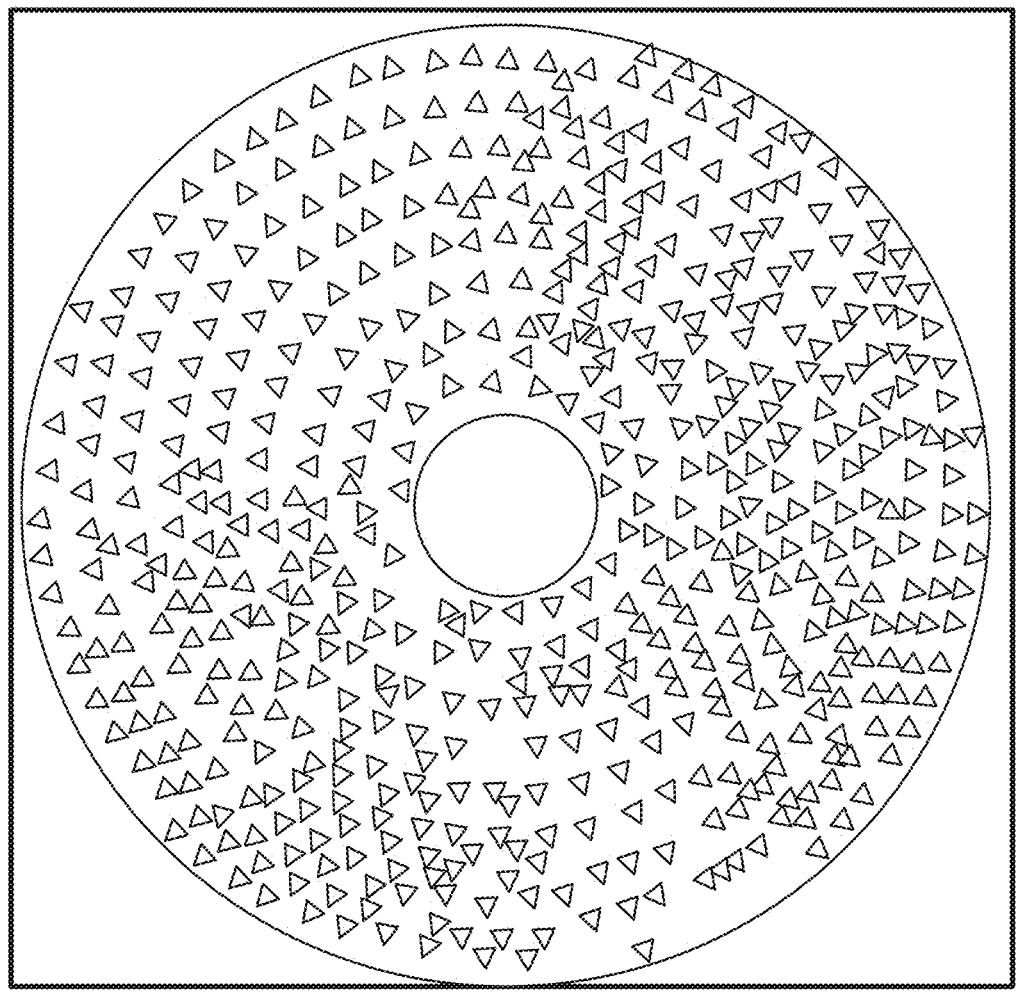

A CT scan of the sample S4 was performed and two cross-sectional images of sample S4, as viewed in a plane parallel to the major surfaces of the sample wheel S4, are shown in FIGS. 24C-24D. As FIGS. 24C-24D show, the triangular shaped abrasive particles occupy predetermined positions within the wheel S4. First, the triangular shaped abrasive particles are positioned in a pattern of concentric rings. Second, the triangular shaped abrasive particles are positioned in a predetermined rotational orientation relative to a side surface of the wheel S4. Their predetermined rotational orientation is akin to that orientation shown and discussed in relation to particles 502-506 in FIG. 5A. More particularly, a significant portion of the particles in the wheel S4 exhibit a predetermined rotational orientation angle of approximately 0° because the longitudinal axes of the particles align with radial axes of the wheel. Many of the particles also have a major surface or face aligned with a major surface of the wheel S4. Clearly, the Sample S4 demonstrates control of both the positioning of shaped abrasive particles or elongated abrasive particles in predetermined positions and predetermined rotational orientations within a finally-formed fixed abrasive article.

Example 3

Thin wheels were formed to analyze the impact of the orientation of abrasive particles within an abrasive particle.

Sample wheels were formed as follows. A precursor bond material was formed in an Erlich mixer by first blending 96 grams of dry phenolic resin (Durez 29318), 114 grams of iron pyrite, 25.65 grams of potassium aluminum fluoride, and 16.5 grams of mineral wool for about 5 minutes. The mixture was transferred to a resealable polyethylene bag. Then 45 grams of liquid resole was added to the bag and kneaded until fully incorporated into the dry ingredients. Then 55 grams of acetone was added to the bag and kneaded until fully incorporated into the mixture, thereby forming a bond material. The bond material was then stored overnight at approximately 3 degrees Celsius. Then the bond was heated back to approximately 22 degrees Celsius before use. A polytetrafluoroethylene (PTFE) film was taped to a flat surface. A draw down apparatus with a gap of 15 mils (approximately 0.38 mm) was used to draw the bond material into sheets on top of the PTFE film. The sheets of bond material were dried overnight at approximately 22 degrees Celsius and then for 10 minutes at approximately 75 degrees Celsius. The sheets of bond material were allowed to cool to approximately 22 degrees Celsius, after which a second PTFE film was placed on top of the sheets. The sheets were cut into discs having a diameter of 3.125 inches (approximately 7.9 cm). The discs had an average weight of 1.40 grams and an average thickness of 0.19 mm. The discs were stored at approximately 3 degrees Celsius.

Reinforcement layers consisted of phenolic-resin-coated fiberglass cloth from IPAC having a coated weight of approximately 170 grams per square meter and having a fleece layer on one face. The reinforcement layers had an outer diameter of 74.5 mm and an inner diameter of 10.5 mm. The reinforcement layer was placed with the fleece layer facing toward the outside of the wheel. The fleece was removed from an additional reinforcing layer, and the reinforcing layer was trimmed to have an outer diameter of 44 mm. The reinforcing layer without fleece was set aside to later be placed in the middle of the wheel.

Figure 30A:
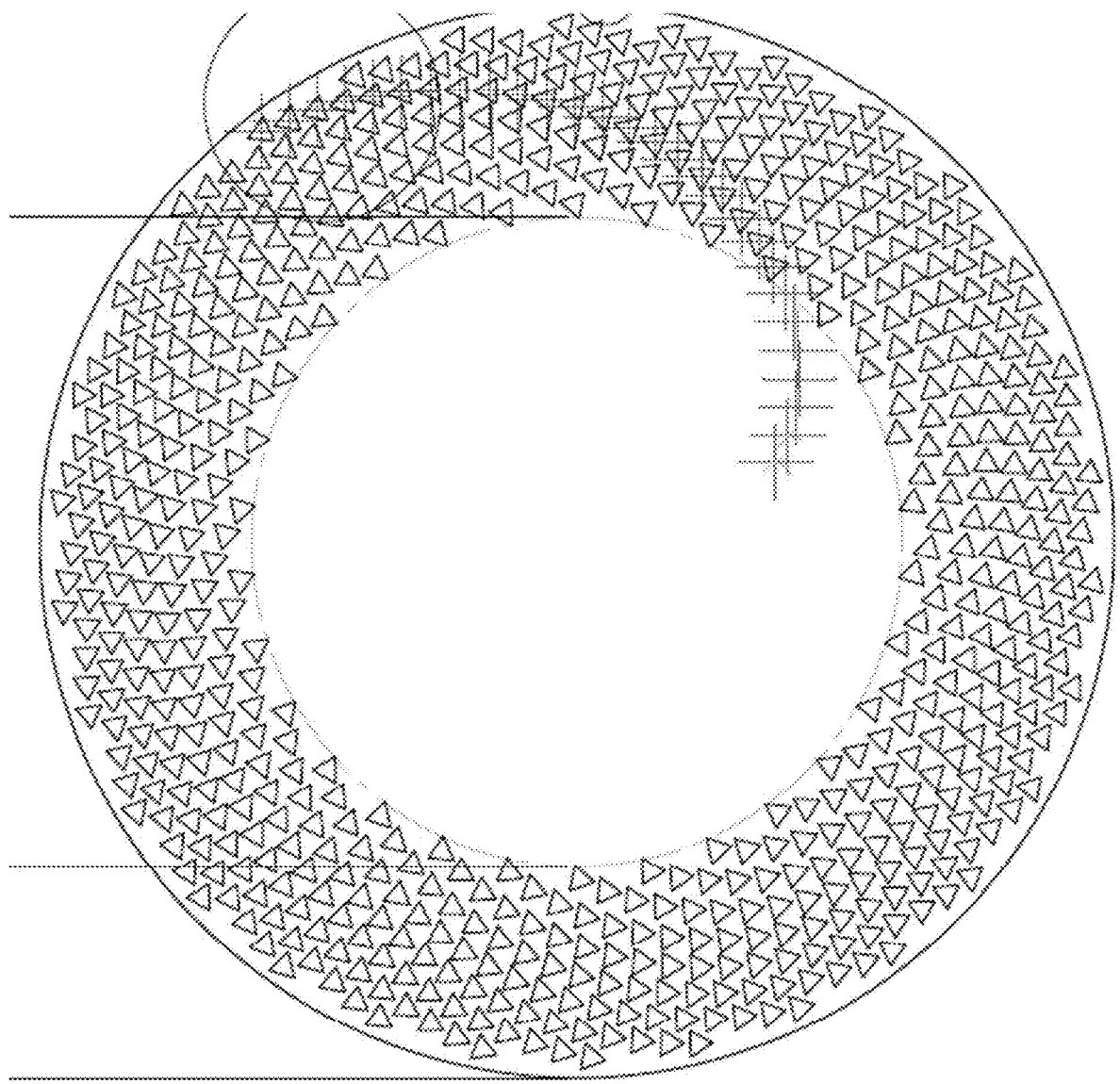
FIG. 30A includes an image of a forming structure in accordance with an embodiment.
Figure 30B:
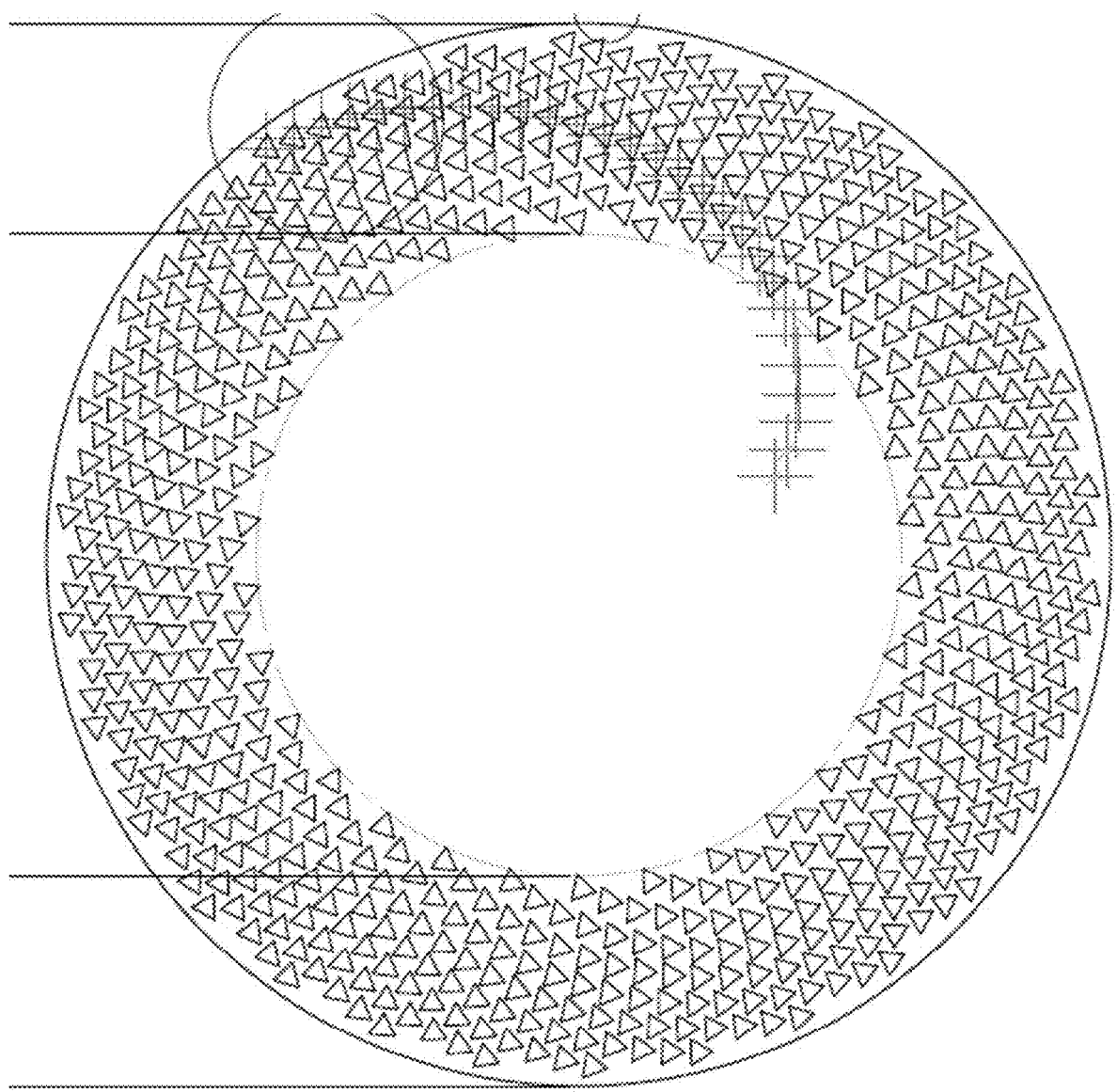
FIG. 30B includes an image of a forming structure in accordance with an embodiment.

A first sample wheel, S5, a second sample wheel, S6, a third sample wheel, S7, and a fourth sample wheel, S8, were formed in accordance with the embodiments described herein. Shaped abrasive particles (e.g., lot DB2795) having the shape of equilateral triangles with an average thickness of 0.3 mm and average side length of 1.4 mm were used. Forming structures, namely templates, were used and included openings that were pockets. The openings were pockets that defined a space within the body of the template and did not extend completely through the thickness of the template. An image of the template used to make each grain disc of sample wheels S5 and S6 is shown in FIG. 30A. An image of the template used to make each grain disc of sample wheels S7 and S8 is shown in FIG. 30B. The pockets were arranged according to a phyllotactic pattern, resulting in radial staggering of the particles on each resin/grain disc within a layer. Those samples identified as staggered had axial staggering as well as the radial staggering, such that abrasive particles in separate layers were not overlapping or stacked. Those samples having stacked configuration had a substantially overlapping axial configuration relative to each other, such that the abrasive particles in different radial planes or layers were aligned with each other in an axial direction. The pockets of the template shown in FIG. 30A were oriented to allow the placement of shaped abrasive particles each having a placement angle of +42 degrees, which, in this application, resulted in a rake angle of +12 degrees. The pockets of the template shown in FIG. 30B were oriented to allow the placement of shaped abrasive particles each having a placement angle of 0 degrees, which, in this application, resulted in a rake angle of −30 degrees.

For each grain disc, approximately 0.945 grams of shaped abrasive particles was spread around the appropriate template while the template was rotated and gently shaken from side to side. This rotation and vibration step assisted in filling the pockets in the template with shaped abrasive particles. One PTFE film was peeled from a resin disc and then the resin disc was placed on top of the particles in the template. The resin disc was pressed into the particles. Then the resin disc and template in combination were turned over, after which the template was removed from the resin disc. The shaped abrasive particles remained on the resin disc layer. The PTFE film was replaced on the grain face of the resin/grain disc. Resin/grain discs were trimmed to a final outer diameter of 76 mm, and an inner diameter of 10.5 mm was punched into the discs. Resin/grain discs were refrigerated until all of the resin/grain discs were completed and the wheels were ready for assembly. All samples used the same type and shape of shaped abrasive particles, which are primarily alpha alumina-based materials having an equilateral triangular two-dimensional shape.

A reinforcing layer was placed into the mold with the fleece side down. The two PTFE films were removed from the appropriate resin/grain disc, and the resin/grain disc was placed as the second layer. A second resin/grain disc was peeled and placed as the third layer. Sample wheels S5 and S7 used a staggered configuration, and sample wheels S6 and S8 used a stacked configuration. The reinforcing layer without fleece having a 44 mm diameter was placed in the mold on top of the second resin/grain disc. The wheel then received two more resin/grain discs using the same procedure as the first two resin/grain discs. Then another reinforcing layer was placed in the mold with the fleece side up. The wheels were then cold pressed in the mold cavity at a pressure of 100 bar with a 4 second dwell. The compressed wheels were cured under a force of approximately 200 pounds (13.8 bar) using the following cycle: (a) 10 hour ramp from approximately room temperature to 130° C.; (b) hold 1 hour at 130° C.; (c) ramp 1 hour to 185° C.; (d) hold 1 hour at 185° C.; (e) ramp 1 hour to 215° C.; (f) hold 15 hours at 215° C.

Comparative sample wheel CS2 was formed according to the following process. A reinforcing layer was placed into the mold with the fleece side down. The two PTFE films were removed from a resin disc without shaped abrasive particles and it was placed as the second layer. A reuseable mask was made from cardboard cut to form a disc with an outer diameter of 44 mm and an inner diameter of 10.5 mm. The reuseable mask was placed in the mold and 0.945 gram of shaped abrasive particles (e.g., lot DB2795) was evenly sprinkled on the exposed section of the resin disc in the mold. The shaped abrasive particles were moved using a stippling action so that the shaped abrasive particles were flat on the resin disc and so that they lay primarily in a single un-oriented layer. The reuseable mask was removed. The two PTFE films were removed from a second resin disc without shaped abrasive particles and it was placed as the third layer. The reuseable mask was placed in the mold and 0.945 gram of shaped abrasive particles was evenly sprinkled on the exposed section of the resin disc in the mold and stippled as described above. The reuseable mask was removed. The reinforcing layer without fleece having a 44 mm diameter was placed over the third layer. Two more resin discs were added with grain randomly distributed using the same procedure as was used for the first two resin discs. Then another reinforcing layer was placed in the mold with the fleece side up. The wheel was then cold pressed in the mold cavity at a pressure of 100 bar with a 4 second dwell. The compressed wheel was cured under a force of approximately 200 pounds (13.8 bar) using the following cycle: cured under a force of approximately 200 pounds (13.8 bar) using the following cycle: (a) 10 hour ramp from approximately room temperature to 130° C.; (b) hold 1 hour at 130° C.; (c) ramp 1 hour to 185° C.; (d) hold 1 hour at 185° C.; (e) ramp 1 hour to 215° C.; (f) hold 15 hours at 215° C.

The following procedure was followed to measure grinding performance for each of sample wheels CS2, S5, S6, S7, and S8. The weight and diameter of the wheel was measured and recorded. The wheel was loaded into a 3" (76 mm) diameter pneumatic grinder, Model No. 18080 manufactured by Dynabrade. The workpiece consisted of high-strength low-alloy steel sheet metal having a width of 22 inches (approximately 56 cm), a length of 40 inches (approximately 102 cm), and a thickness of 0.05 inches (approximately 1 mm). The workpiece was clamped to a support table. The pneumatic grinder was operated at a pressure of 85 psig (approximately 590 kPa) for 5 minutes grinding the workpiece against the wheel rotation. Then the length of the cut, the diameter of the wheel, and the weight of the wheel were each measured and recorded.

Table 1 shows the performance results for CS2, S5, S6, S7, and S8. CS2 had an uncontrolled placement angle and rake angle, and CS2 did not have a placement pattern. S5 had a +42 placement angle and a +12 rake angle and a staggered pattern. S6 had a +42 placement angle and a +12 rake angle and a stacked pattern. S7 had a 0 placement angle and a −30 rake angle and a staggered pattern. S8 had a 0 placement angle and a −30 rake angle and a stacked pattern. The material removal rate (MRR) and the wheel wear rate (WWR) were calculated in inches per minute. The ratio of the MRR to the WWR, referred to as the grinding ratio G, is a measure of grinding wheel performance CS2, S5, and S6 had similar G values. S7 and S8, on the other hand, showed unexpected and remarkable results, with G values significantly higher than CS2, S5, and S6. The wheel wear rates of samples S7 and S8 were also remarkable compared to the other samples.

TABLE 1

Performance results for CS2, S5, S6, S7, and S8.

| Wheel | Placement Angle (degrees) | Rake Angle (degrees) | Pattern | Weight (grams) | Thickness (mm) | MRR (in/min) | WWR (in/min) | G |
| --- | --- | --- | --- | --- | --- | --- | --- | --- |
| CS2 | random | random | random | 12.810 | 1.376 | 21.8 | 0.065 | 343 |
| S5 | +42 | +12 | staggered | 12.510 | 1.369 | 23.9 | 0.081 | 297 |
| S6 | +42 | +12 | stacked | 13.110 | 1.384 | 20.8 | 0.059 | 356 |
| S7 | 0 | −30 | staggered | 12.810 | 1.376 | 32.7 | 0.018 | 1877 |
| S8 | 0 | −30 | stacked | 11.585 | 1.309 | 22.2 | 0.025 | 877 |

Example 4

Thin wheels were formed to analyze the impact of the orientation of abrasive particles within an abrasive particle.

Sample wheels were formed as follows.

Precursor Bond Material

First, a precursor bond material was prepared by thoroughly mixing the ingredients listed in Table 2 in a closed container (e.g., a plastic bag).

TABLE 2

Binder Precursor Composition

| Component | Weight Percent ("wet") | Weight Percent (Cured) |
| --- | --- | --- |
| Novolak resin (Durez 29333, Hexion Chemicals) | 26 | 31 |
| Liquid phenolic resole resin (70% solids) (Durite AL-132-LF, Hexion Chemicals) | 9 | 8 |
| Iron pyrite powder mixture (50% MHP 325, Maanshan Guanxu Mining Technology Co Ltd.) (50% Iron pyrite powder, fine, Prince Materials, Ltd.) | 45 | 55 |
| Potassium aluminium fluoride (KAlF4) (Veneta Mineral SpA) | 2 | 2 |
| Mineral wool (Roxul 1000 mineral fiber, Rockwool BV) | 3 | 4 |
| Solvent (e.g., acetone) | 15 | — |

The novolac resin, iron pyrite powder, potassium aluminum fluoride, and mineral wool were first thoroughly mixed together. The liquid phenolic resole resin was then added and mixed in until the mixture had an even consistency. The organic solvent was added to the mixture and kneaded through until consistent. The precursor bond material can then be used to form single layer bond discs or stored under refrigeration for later use.

Single Layer Bond Discs

The precursor bond material was poured onto the flat surface and spread into a 15 mil (381 micrometer) thick flat sheet using a metering blade. The sheet of precursor bond material was allowed to dry. The dried sheet of precursor bond material was cut and punched to form multiple discs having approximately 3.125 in. diameter. The discs can be used to form a thin wheel or stored between release sheets (e.g., wax paper or PTFE) under refrigeration for later use.

Single Layer Abrasive Discs

Shaped abrasive grains (flat equilateral triangles with an average thickness of 0.3 mm and average side length of 1.4 mm) were then pressed by a robot (Cobot) into the discs according to a desired abrasive grain distribution pattern, which also included a particular abrasive grain rake angle.

After the grain placement pattern for each disc was completed, a fixative composition (20 wt % liquid phenolic resin and 80 wt % Isopropanol) was sprayed over the disc and grains and allowed to dry. The single layer abrasive discs were then trimmed to each have a 3 in. outer diameter and punched with a center hole having a 10.5 mm diameter. The single layer abrasive discs can be used to form an abrasive thin wheel or stored between release sheets (e.g., wax paper or PTFE) for later use.

Wheel Formation

Abrasive thin wheels were constructed using the single layer abrasive discs as follows:

A first layer of reinforcing web 3611 (phenolic coated woven fiberglass fabric 3519 w/paper 3521 on one side) (style 3321, supplied by IPAC) was placed in a mold, paper side down. A first single layer abrasive disc 3609 was placed in the mold on the reinforcing web. A second single layer abrasive disc 3507 (abrasive grains 3615 in bond material 3617, exemplary of all discs) was placed in the mold on the first disc. The discs were placed so that the abrasive grains of each disc are aligned on top of each other, also called herein a "stacked" configuration (as shown in FIG. 36). Alternatively, the single layer discs can be placed so that the abrasive grains of each disc are not on top of each other, but are instead in a "staggered" configuration (as shown in FIG. 37). Also, the layering of additional single abrasive discs can be repeated as many times as desired, with the discs placed in a stacked or staggered orientation as desired.

A layer of reinforcing web (internal reinforcing web) 3613 that has no paper and that has been cut to have and outside diameter that fits just inside the inner diameter of the abrasive grain pattern is placed in the mold on the second single layer disc. Alternately, the internal reinforcing web can have the same diameter as the single layer discs if desired. A third single layer abrasive disc 3605 was placed in the mold on the internal reinforcing web. A fourth single layer abrasive disc 3603 was placed in the mold on the third single layer abrasive disc. A layer (final) of reinforcing web 3601 (paper side up) was placed in the mold on top of the fourth single layer abrasive disc. All layers were placed to preserve the alignment of the punched center holes and the stacked alignment of the abrasive grains with previous layers (or alternately staggered alignment if desired).

The mold cavity press plates were dusted lightly with a fumed silica to promote mold release. All the layers (reinforcing webs and single layer abrasive discs) were pressed in the mold at 90 Bar for 7 seconds to form a precursor thin wheel. The precursor thin wheel was then cured in a box oven using the following conditions: cured under a force of approximately 200 pounds (13.8 bar) using the following cycle: (a) 10 hour ramp from approximately room temperature to 130° C.; (b) hold 1 hour at 130° C.; (c) ramp 1 hour to 185° C.; (d) hold 1 hour at 185° C.; (e) ramp 1 hour to 215° C.; (f) hold 15 hours at 215° C.

Sample thin wheels (S9 and S10) were prepared according to the method above and had the properties described below in Table 3. It is noted that the Vol % values (Vol % abrasive, Vol %, Bond, and Vol % Pores) are specifically with respect to the "usable volume" of the thin wheel, not the entire body of the thin wheel. It will be understood that the "usable volume" of the thin wheel is the peripheral annular region of the wheel in which abrasive grains have been deposited, not the central region surrounding the center hole where there are no abrasive grains. In particular, it is noted that although the sample wheels have a different total number of abrasive grains, the volume percent of abrasive grains in the useable region for both wheels is identical. In other words, the amount of abrasive grains per volume of the useable volume of the sample wheels is the same.

TABLE 3

Sample Thin Wheel Properties

| Thin Wheel | Rake Angle | # of Abrasive Grains | Vol % Abrasive | Vol % Bond | Vol % Pores |
|---|---|---|---|---|---|
| S9 | Zero (0°) | 434 | 29 | 43 | 28 |
| S10 | minus thirty (−30°) | 620 | 29 | 37 | 33 |

Thin Wheel Abrasive Performance Testing

Multiple sample thin wheels were made (three S9 wheels and three S10 wheels) and tested against for abrasive performance, according to the testing conditions above for Example 3. The average performance values for the three S9 and three S10 wheels is shown in Table 4 below.

TABLE 4

Thin Wheel Abrasive Performance

| Thin Wheel | Rake Angle | Grain Alignment | Weight (grams) | Thickness (mm) | MRR (in/min) | WWR (in/min) | Grind Ratio |
|---|---|---|---|---|---|---|---|
| S9 (avg.) | zero (0°) | Stacked | 13.7 | 1.57 | 7.5 | 0.084 | 87.3 |
| S10 (avg.) | minus thirty (−30°) | Stacked | 12.4 | 1.50 | 3.75 | 0.116 | 32.3 |

Table 4 shows the performance results for the S9 wheels, which had a zero degree rake angle, to be superior to the S10 wheels, which had minus thirty degree (−30°) rake angle. The wheel wear rates of samples S7 and S8 were also remarkable compared to the other samples.

Without wanting to be held to any specific theory, it is believed that the relative difference in performance can be attributed to the difference in rake angle of the abrasive grains. It is suspected that when in a −30 degree orientation, although the tensile stress on the grain tip is much lower (compared with the zero degree orientation), the grain is probably plowing the forming swarf chip into the deforming metal of the work-piece. In other words, more energy is being spent plowing or pushing plastic deformation ahead of the gain tip and less energy goes into material chip separation from the work piece, thus the 0 degree rake angle gave the most favorable results.

These results were surprising, because it was not expected that cutting with a thin abrasive wheel would mimic what happens with respect to a machining or milling procedure. Abrasives typically work at much faster relative speeds with respect to tool and work piece, and there are many more 'grain/grit' tips compared with a machining tool tip. However, the results indicate that rake angle does impact the efficiency of the cutting operation for bonded abrasives, such a resin bonded wheels. Again, given the vast differences in material and kinetics between machining and resin bonded abrasive processes, it is surprising that the influence of rake angle impacts both processing techniques.

The above-disclosed subject matter is to be considered illustrative, and not restrictive, and the appended items are intended to cover all such modifications, enhancements, and other embodiments, which fall within the true scope of the present invention. Thus, to the maximum extent allowed by law, the scope of the present invention is to be determined by the broadest permissible interpretation of the following items and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A fixed abrasive article comprising:
a body having abrasive particles contained within a bond material, the abrasive particles including a plurality of shaped abrasive particles, elongated abrasive particles, or a combination thereof, each of the shaped abrasive particles or elongated abrasive particles having an aspect ratio of length:width of at least 1.1:1, each of the shaped abrasive particles or elongated abrasive particles having a longitudinal axis defining the longest dimension of a major surface and extending through the midpoint of the body and wherein at least a portion of the shaped abrasive particles or elongated abrasive particles have a predetermined rotational orientation relative to a side surface of the body and the longitudinal axis of the shaped abrasive particles or elongated abrasive particles including a placement angle ranging from +45 degrees to −45 degrees, and wherein the placement angle defines an angle between the longitudinal axis of the shaped abrasive particles or elongated abrasive particles and a radial axis extending through the midpoint of the major surface of the shaped abrasive particles or elongated abrasive particles, wherein the radial axis is perpendicular to a tangent at a side surface of the body and wherein the portion includes at least 50% of the total abrasive particles within the body.

2. The fixed abrasive article of claim 1, wherein the each of the shaped abrasive particles or elongated abrasive particles further comprise a rake angle within a range of +90 to −90 degrees with respect to a workpiece surface that is parallel to the edge of the body.

3. The fixed abrasive article of claim 2, wherein the rake angle is within a range of +45 to −45 degrees with respect to a workpiece surface that is parallel to the edge of the body.

4. The fixed abrasive article of claim 1, wherein the body includes a first major surface, a second major surface and a side surface extending between the first major surface and the second major surface, and wherein each of the shaped abrasive particles or elongated abrasive particles are in a lying flat configuration such that the longest dimension of the shaped abrasive particles or elongated abrasive particles is substantially parallel to a major surface of the body.

5. The fixed abrasive article of claim 3, wherein the body comprises a first group of abrasive particles positioned within a first radial plane within the body, and wherein the body comprises a second group of abrasive particles within a second radial plane within the body.

6. The fixed abrasive article of claim 5, wherein the abrasive particles of the first group of abrasive particles are arranged in a controlled distribution relative to each other and wherein the abrasive particles of the second group of abrasive particles are arranged in a controlled distribution relative to each other.

7. The fixed abrasive article of claim 1, wherein at least 15% of the total abrasive particles within the body have an orientation angle between 0 degrees and 20 degrees.

8. The fixed abrasive article of claim 6, wherein an abrasive particle of the first group of abrasive particles is radially and axially staggered relative to an abrasive particle of the second group of abrasive particles.

9. The fixed abrasive article of claim 5, wherein the abrasive particles within the first group have a predetermined position having substantially the same axial position within the first radial plane with respect to each other and wherein the abrasive particles within the second group have a predetermined position having substantially the same axial position within the second radial plane with respect to each other.

10. The fixed abrasive article of claim 9, wherein the abrasive particles of the first group comprise a different radial position with respect to each other and wherein the abrasive particles of the second group comprise a different radial position with respect to each other.

11. The fixed abrasive article of claim 5, wherein the first radial plane and second radial plane are axially spaced apart from each other within the body.

12. The fixed abrasive article of claim 5, wherein the first group of abrasive particles have a first placement angle and the second group of abrasive particles have a second placement angle different than the first placement angle.

13. The fixed abrasive article of claim 5, wherein the abrasive particles of the first group and the second group have at least one abrasive characteristic that is different.

14. The fixed abrasive article of claim 3, wherein the body comprises a first axial collection of abrasive particles within a first axial plane within the body, each of the abrasive particles of the first axial collection having a first placement angle, and wherein the body further comprises a second axial collection of abrasive particles within a second axial plane within the body that is different than the first axial plane, each of the abrasive particles of the second axial collection having a second placement angle.

15. The fixed abrasive article of claim 14, wherein the abrasive particles of the first axial collection of abrasive particles are arranged in a controlled distribution relative to each other and wherein the abrasive particles of the second axial collection of abrasive particles are arranged in a controlled distribution relative to each other.

16. A fixed abrasive article comprising: a body having abrasive particles contained within a bond material, the abrasive particles including a plurality of shaped abrasive particles or elongated abrasive particles having an aspect ratio of length:width of at least 1.1:1, wherein at least a portion of the shaped abrasive particles or elongated abrasive particles have a predetermined rotational orientation relative to a side surface of the body and the longitudinal axis of the shaped abrasive particles or elongated abrasive particles including a rake angle ranging from +45 to −45 degrees, and wherein the rake angle defines an angle between a cutting surface of the shaped abrasive particles or elongated abrasive particles and a line perpendicular to a workpiece surface, wherein the workpiece surface is parallel to the edge of the body and wherein the portion includes at least 50% of the total abrasive particles within the body.

17. The fixed abrasive article of claim 3, wherein at least 50% of the total abrasive particles within the body have a rake angle of 0 degrees.

18. The fixed abrasive article of claim 17, wherein the bond material further comprises potassium aluminum fluoride, mineral wool, or a combination thereof.

19. The fixed abrasive article of claim 18, wherein the bond material comprises: 10 wt % to 40 wt % phenolic resin; 16 wt % to 60 wt % iron pyrite, 0.5 wt % to 15 wt % potassium aluminum fluoride, and 0.5 wt % to 10 wt % mineral wool.

* * * * *

UNITED STATES PATENT AND TRADEMARK OFFICE
CERTIFICATE OF CORRECTION

| | |
|---|---|
| PATENT NO. | : 11,230,653 B2 |
| APPLICATION NO. | : 15/721649 |
| DATED | : January 25, 2022 |
| INVENTOR(S) | : Katherine M. Sahlin et al. |

It is certified that error appears in the above-identified patent and that said Letters Patent is hereby corrected as shown below:

On the Title Page

In Column 2, Item (56), OTHER PUBLICATIONS, Line 1, please delete "Irwntemational Search Report" and insert --International Search Report--

In Column 1, Item (56), U.S. PATENT DOCUMENTS, page 4, Line 5, please delete "6333360 B1 12/2001 Bessette et al." and insert --8333360 12/2012 RULE et al.--

In Column 2, Item (56), FOREIGN PATENT DOCUMENTS, page 6, Line 59, please delete "JP 1008474 B2" and insert --JP 7008474 B2--

Signed and Sealed this
Thirteenth Day of February, 2024

Katherine Kelly Vidal
*Director of the United States Patent and Trademark Office*